(12) United States Patent
Schuit et al.

(10) Patent No.: US 11,739,785 B2
(45) Date of Patent: Aug. 29, 2023

(54) TRIM ATTACHMENT ASSEMBLY FOR MOUNTING SOLAR PANEL EQUIPMENT

(71) Applicant: Unirac Inc., Albuquerque, NM (US)

(72) Inventors: Nathan Schuit, Edgewood, NM (US); Todd Ganshaw, Albuquerque, NM (US)

(73) Assignee: Unirac Inc., Albuquerque, NM (US)

( * ) Notice: Subject to any disclaimer, the term of this patent is extended or adjusted under 35 U.S.C. 154(b) by 450 days.

(21) Appl. No.: 16/837,911

(22) Filed: Apr. 1, 2020

(65) Prior Publication Data

US 2020/0309184 A1 Oct. 1, 2020

Related U.S. Application Data

(60) Provisional application No. 62/827,517, filed on Apr. 1, 2019.

(51) Int. Cl.
| F16B 37/00 | (2006.01) |
| F16B 37/04 | (2006.01) |
| H02S 20/30 | (2014.01) |

(52) U.S. Cl.
CPC ............ *F16B 37/045* (2013.01); *H02S 20/30* (2014.12); *F16B 2200/403* (2018.08); *Y10T 403/7067* (2015.01)

(58) Field of Classification Search
None
See application file for complete search history.

(56) References Cited

U.S. PATENT DOCUMENTS

| 2,345,650 | A | * | 4/1944 | Attwood | B62D 33/044 |
| | | | | | 411/105 |
| 5,154,385 | A | * | 10/1992 | Lindberg | A47B 57/562 |
| | | | | | 248/245 |
| 5,209,619 | A | * | 5/1993 | Rinderer | F16B 37/045 |
| | | | | | 411/85 |
| 7,070,374 | B2 | * | 7/2006 | Womack | B60P 7/0815 |
| | | | | | 410/104 |
| 7,866,099 | B2 | | 1/2011 | Komamine et al. | |
| 8,938,932 | B1 | | 1/2015 | Wentworth et al. | |
| 9,299,868 | B2 | * | 3/2016 | Thomas | H02S 30/10 |
| 9,825,581 | B2 | | 11/2017 | Wildes | |
| 10,256,766 | B2 | * | 4/2019 | Thomas | F24S 40/80 |
| 10,359,068 | B2 | * | 7/2019 | Martin | F16B 37/046 |
| 11,384,814 | B2 | * | 7/2022 | Rouleau | F16G 11/108 |
| 2003/0185643 | A1 | * | 10/2003 | Thompson | F16B 37/046 |
| | | | | | 411/85 |
| 2008/0095591 | A1 | * | 4/2008 | Wu | F16B 37/046 |
| | | | | | 411/161 |
| 2009/0129885 | A1 | * | 5/2009 | Csik | F16B 37/046 |
| | | | | | 248/220.21 |
| 2012/0073220 | A1 | | 3/2012 | Kobayashi et al. | |

FOREIGN PATENT DOCUMENTS

EP 375619 A * 6/1990 ........... B62D 33/044

* cited by examiner

*Primary Examiner* — Steven M Marsh
(74) *Attorney, Agent, or Firm* — Lee & Hayes, P.C.

(57) ABSTRACT

A channel having a base portion, an open central region, and an integral pair of sidewalls. The integral pair of sidewalls having an upper portion of each sidewall that includes an inward-facing downturned internal flange and an outward-facing upturned external flange.

20 Claims, 54 Drawing Sheets

TRIM ATTACHMENT ASSEMBLY FOR MOUNTING SOLAR PANEL EQUIPMENT

CROSS-REFERENCE TO RELATED PATENT APPLICATIONS

This application claims priority to and incorporates U.S. Provisional Patent Application 62/827,517, filed Apr. 1, 2019, entitled "Trim Attachment Assembly for Mounting Solar Panel Equipment," in its entirety by reference.

BACKGROUND

As the solar energy industry is growing, there is a growing need to be able to mount photovoltaic (PV) modules on various types of structures and/or locations. Typical PV module mounting assemblies may be designed with a specific use in mind and, as such, these mounting assemblies may lack variability to be implemented on the various structures and/or locations.

DETAILED DESCRIPTION

The present disclosure relates to structures and methods for mounting one or more photovoltaic modules (i.e., solar panels) to a roof of a house or building, or other structure, using components made of stainless steel and/or aluminum alloys (which may be anodized). In particular, the present disclosure describes a structural channel, channel nut, L-foot bracket, and grommet assembly for mounting solar panels to a roof.

The channel nut may slide onto one end of the channel, where it engages with downturned internal flanges. Horizontal, upper wings on the nut (which rest on a shoulder of the internal flanges) prevent the channel nut from falling off of the channel during installation. The channel nut may freely slide along the length of the channel until predetermined position is reached. The channel nut may include an Anti-Rotation feature that prevents the nut from rotating when a clamping bolt (which may be used to attach a L-foot bracket to the channel nut) is tightened. The distal ends of the channel's flange are turned down (peened) to provide a solid stop that prevents the channel nut from sliding off the distal ends of the channel during handling and installation. The channel nut has a pair of upper wings that rest on shoulders of downturned internal flanges of the channel, so that the channel nut doesn't fall off during installation. The design includes sufficient clearance between the L-foot bracket and channel in order to smoothly slide the L-foot bracket along the length of the channel. The angled nut remains free to slide along the channel's length during installation until an L-foot bracket (or other type of mounting bracket) is mounted and tightened. No special tools for spreading apart the channel walls, or installation processes (like "snapping"), are required to install the nut in the channel.

A coordinate system is assigned to the drawings, and the system's Z-axis is parallel to the longitudinal direction of the channel. The term "channel" and "slider" are used interchangeably herein.

Figure 1:
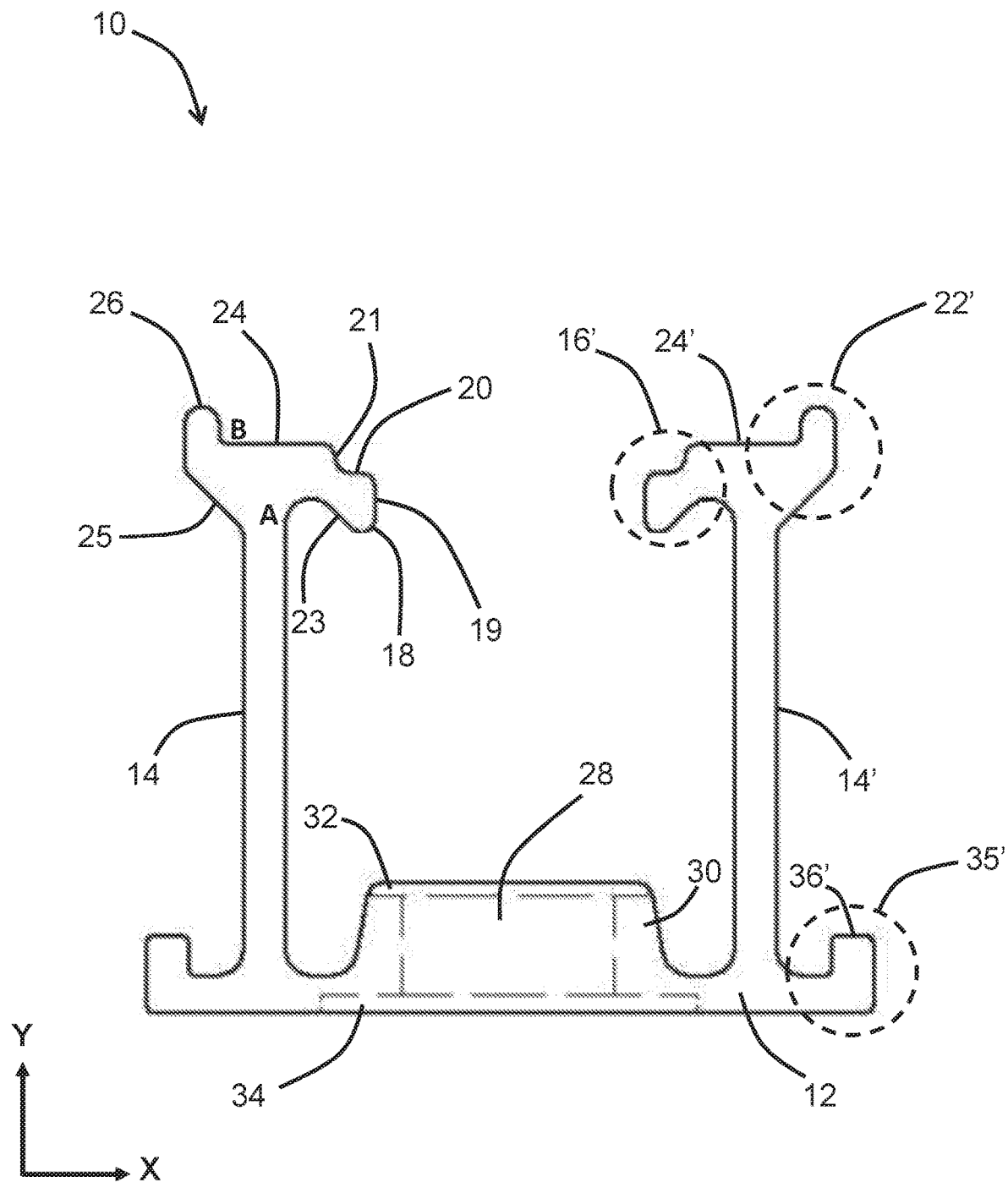
FIG. 1 shows an elevation view of the end of a channel, according to an embodiment.

FIG. 1 shows an elevation view of the end of a channel, according to an embodiment. Structural channel 10 is a generally U-shaped component, with a horizontal base portion 12 and left sidewall 14 and right sidewall 14', where the sidewalls 14 and 14' are generally (but not always) substantially perpendicular to base portion 12. Alternatively, sidewalls 14 and 14' may be oriented at an angle that is not perpendicular to base 12 (i.e., the sidewalls may be splayed outwards or inwards relative to base 12). Channel 10 may be an extruded product made of aluminum alloy or steel (e.g. stainless steel), or other suitable material. In an embodiment, the channel 10 may be made of an aluminum alloy, in which case the channel 10 may be anodized. Channel 10 may be generally longer than it is tall or wide, although the specific length is not critical. Channel 10 may also be symmetric across its midplane. Base 12 may comprise a raised boss 30, which may extend horizontally along the entire length of channel 10. Boss 10 has a vertical aperture 28 for receiving a lag screw (not shown) that is used to attach channel 10 to an underlying roof structure. Boss 30 may further include an upper circular recess 32 and a lower circular recess 34 for holding an elastomeric grommet (not shown). Base 12 may further include an upturned bottom flange 35, which includes an upturned lip 36, which extends longitudinally along the channel 10. Note that sidewalls 14 and 14' in this example may not include internal support bumps; they may be smooth surfaces. Note, also, that internal support bumps may not be needed because upper wings 60, 60' prevent nut 50 from falling off the channel during installation.

Referring still to FIG. 1, the upper portions of sidewalls 14 and 14' include downturned internal flanges 16 and 16', and upturned external flanges 22 and 22', respectively. Downturned internal flanges 16 and 16' serve as a pair of substantially parallel longitudinal guides that engage and guide an interlocking channel nut (see FIG. 2), which may freely slide along the length of channel 10 before the nut 50 is locked into place by a clamping bolt (not shown). See FIGS. 9-14 for details. Upturned external flanges 22 and 22' serve as a guide for centering and aligning the L-foot bracket (see FIG. 15), which rests upon horizontal support ledges 24 and 24', respectively. The Z-shaped curve of downturned internal flange 16 comprises a plurality of continuously-connected surfaces (line-segments) disposed from point 'A' to point 'B', comprising (starting at point 'A'): a downwardly-facing semi-circular segment, which is connected to angled ramp segment 23, which is connected to a rounded tip segment 18, which is connected to lower vertical segment 19, which is connected to horizontal shoulder segment 20, which is connected to upper vertical (or near-vertical) segment 21, which is connected to horizontal ledge segment 24 that ends at point 'B'. The angle of ramp 23 may be about 45°, although the exact angle may vary. The transitions between pairs of adjacent line-segments that define the Z-shaped curve from point 'A' to point 'B' may be rounded and/or chamfered.

Referring still to FIG. 1, upturned external flanges 22 and 22' include upward-facing, raised lips 26 and 26', respectively. The horizontal distance between the internal edges of lips 26 and 26' is slightly greater than the width of an L-foot-bracket, so that the L-foot bracket may contact and rest upon support ledges 24 and 24', when centered in-between lips 26 and 26'. External ramp 25 is angled at approximately a 45° angle (which angle may range from approximately 30° to approximately 90°), that provides for a transition in thickness (width) between the wider wall of upper external flange 22 down to the thinner wall of sidewall 14.

Figure 2:
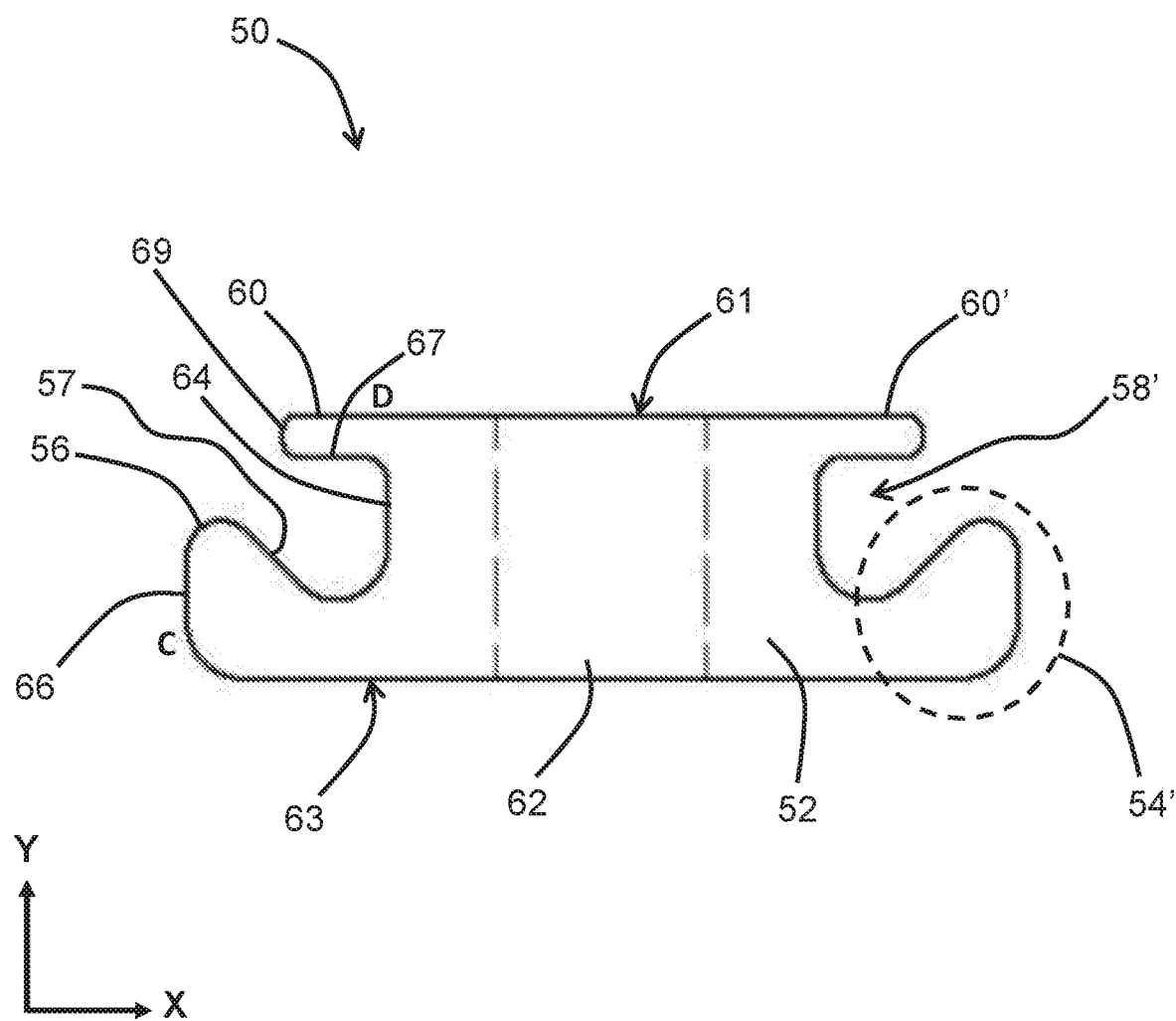
FIG. 2 shows an elevation view of the end of a channel nut, according to an embodiment.

FIG. 2 shows an elevation view of the end of a channel nut 50 (also referred to herein as a "nut"), according to an embodiment. Nut 50 is generally rectangular in this view, and has a horizontal top surface 61, horizontal bottom surface 63, and body 52. Aperture 62 extends vertically through nut 50, which may be a threaded aperture. Nut 50 has a pair of inwardly-facing (reentrant) grooves 58 and 58' on two sides of body 52 that extend along the entire length (depth) of nut 50 in the Z-direction (see FIG. 3). The shape of reentrant grooves 58 and 58' match the shape 54' of downturned internal flanges 16 and 16' (with a clearance gap disposed in-between the two different shapes), respectively, which allows channel 10 and nut 50 to slidingly interlock in the X-Y plane, and slidingly engage with each other when assembled (see FIGS. 5A and 5B). Reentrant groove 58 is defined by a Z-shaped set of continuously-connected surfaces (line-segments) from point 'C' to point 'D' that define, in part, the shape of outer flange 54'. This set of continuously-connected line-segments comprises the following when viewed end-on (starting at point 'C'): a vertical segment 66, which is connected to a rounded tip segment 56, which is connected to angled ramp segment 57, which is connected to lower vertical segment 64, which is connected to horizontal segment 67, which is connected to an upper vertical segment 69, which is connected to a top horizontal surface 61 of the nut that ends at point 'D'. Nut 50 further comprises a pair of horizontal, upper wings 60 and 60', which define the upper portion of the continuous-curve from point 'C' to 'D'. Upper wings 60 and 60' partially overhang over reentrant grooves 58 and 58', respectively. The transitions between the continuously-connected line-segments defining the Z-shaped curve from point 'C' to point 'D' may be rounded and/or chamfered.

Figure 3:
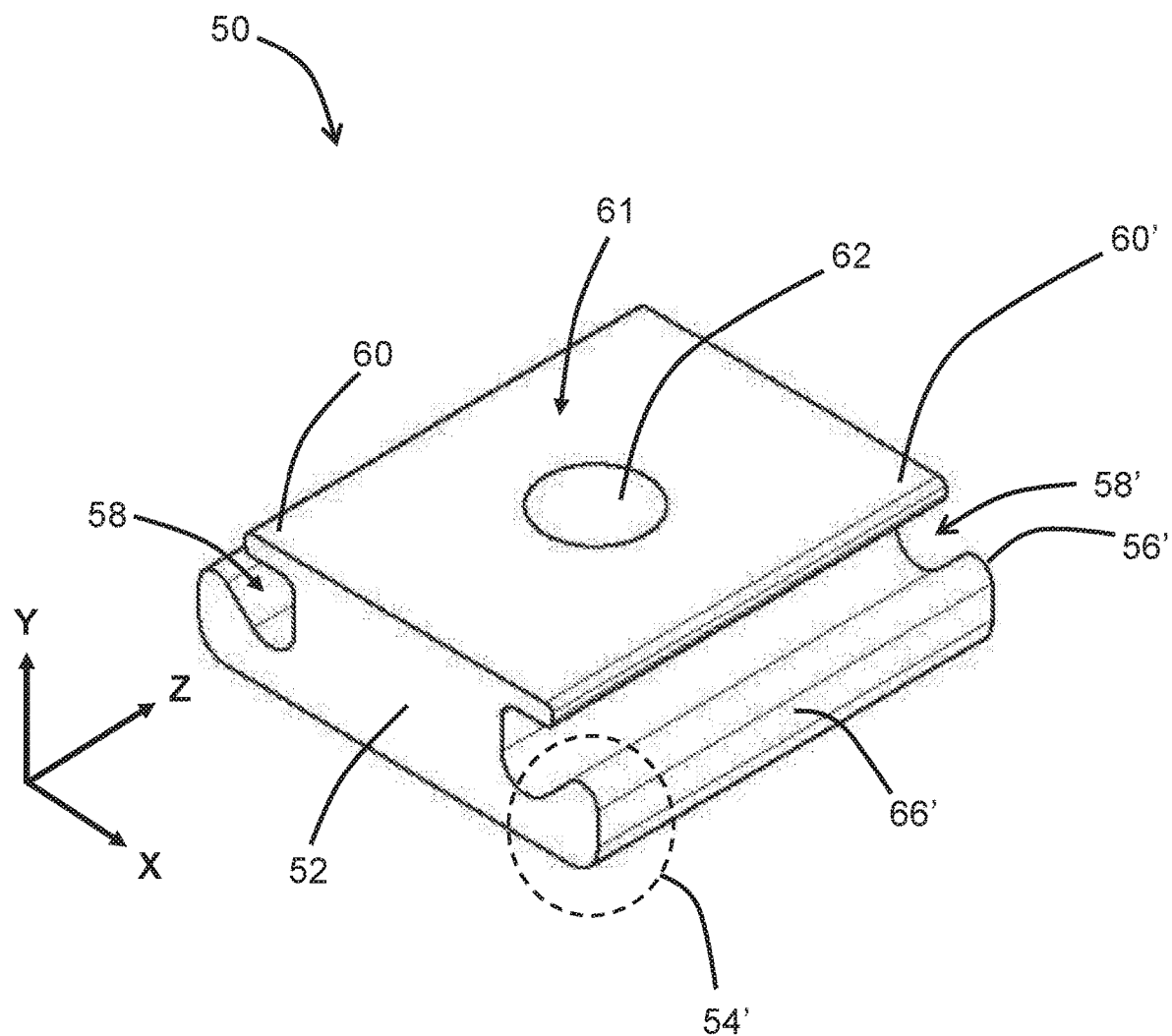
FIG. 3 shows an isometric view of a channel nut, according to an embodiment.

FIG. 3 shows an isometric view of a channel nut 50, according to an embodiment. Nut 50 is generally square when viewed from the top (which may also be rectangular). Nut 50 has a horizontal top surface 61, horizontal bottom surface 63, and body 52. Aperture 62 extends vertically through nut 50, which may be threaded. Nut 50 has a pair of inwardly-facing (reentrant) grooves 58 and 58' on two sides that extend along the entire length (depth) of nut 50 in the Z-direction. The shape of reentrant grooves 58 and 58' match the shape of downturned internal flanges 16 and 16' (with a clearance gap in-between the two different shapes), respectively, which allows channel 10 and nut 50 to slidingly interlock in the X-Y plane, and slidingly engage with each other when assembled (see FIGS. 5A and 5B). Grooves 58 and 58' extend along the length of the sides of nut 50, substantially parallel to the Z-axis. Groove 58' is defined, in part, by the shape of lip 56', vertical surface 66', and outer flange 54'. Wings 60 and 60' partially overhang reentrant grooves 58 and 58', respectively.

Figure 4:
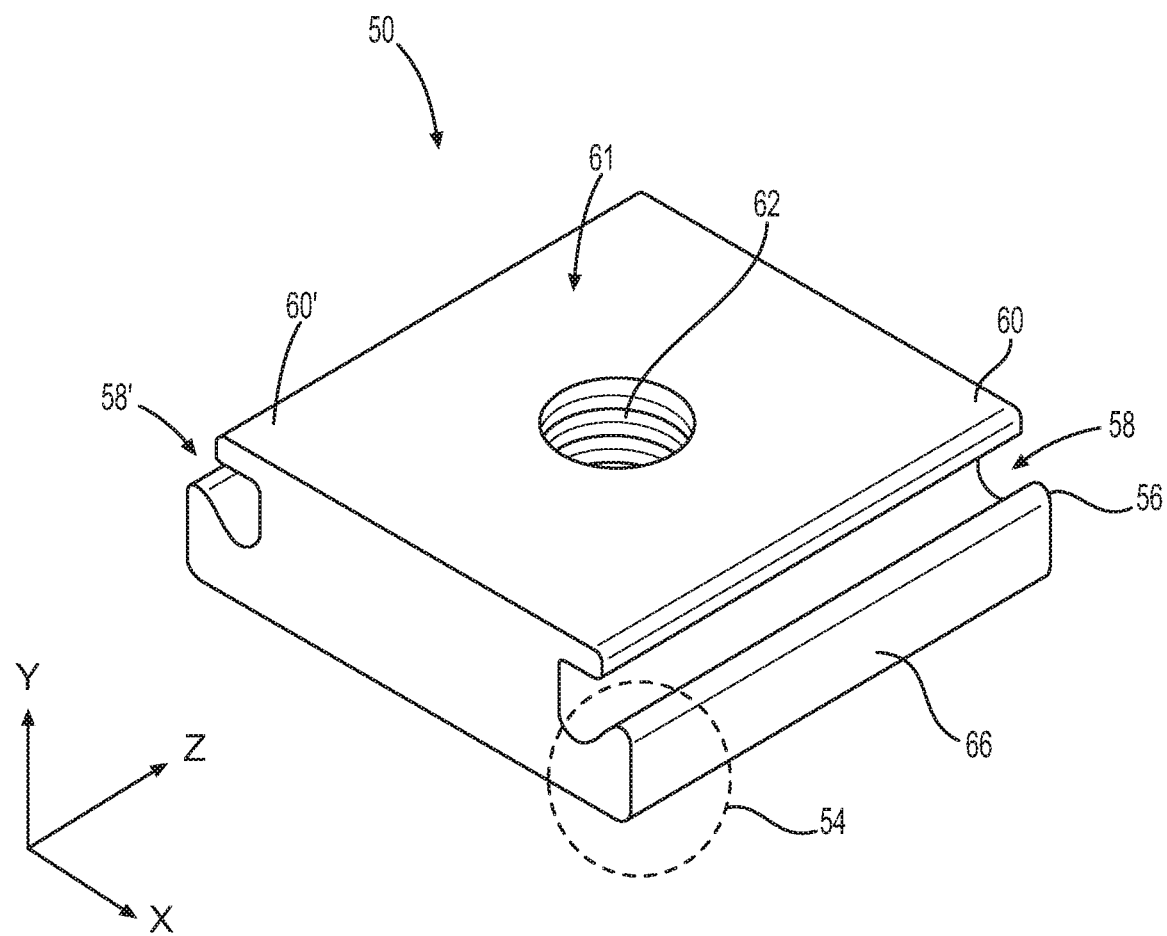
FIG. 4 shows a shaded, isometric view of a channel nut, according to an embodiment.

FIG. 4 shows a shaded isometric view of a channel nut, according to an embodiment. Nut 50 is generally square when viewed from the top (which may also be rectangular). Nut 50 has a horizontal top surface 61, horizontal bottom surface 63, and body 52. Aperture 62 extends vertically through nut 50, which may be threaded. Nut 50 has a pair of inwardly-facing (reentrant) grooves 58 and 58' on two sides that extend along the entire length (depth) of nut 50 in the Z-direction. The shape of reentrant grooves 58 and 58' match the shape of downturned internal flanges 16 and 16' (with a clearance gap in-between the two different shapes), respectively, which allows channel 10 and nut 50 to slidingly interlock in the X-Y plane, and slidingly engage with each other when assembled (see FIGS. 5A and 5B). Grooves 58 and 58' extend along the length of nut 50, substantially parallel to the Z-axis. Groove 58' is defined, in part, by the shape of lip 56', vertical surface 66', and outer flange 54'. Upper wings 60 and 60' overhang reentrant grooves 58 and 58', respectively.

Figure 5A:
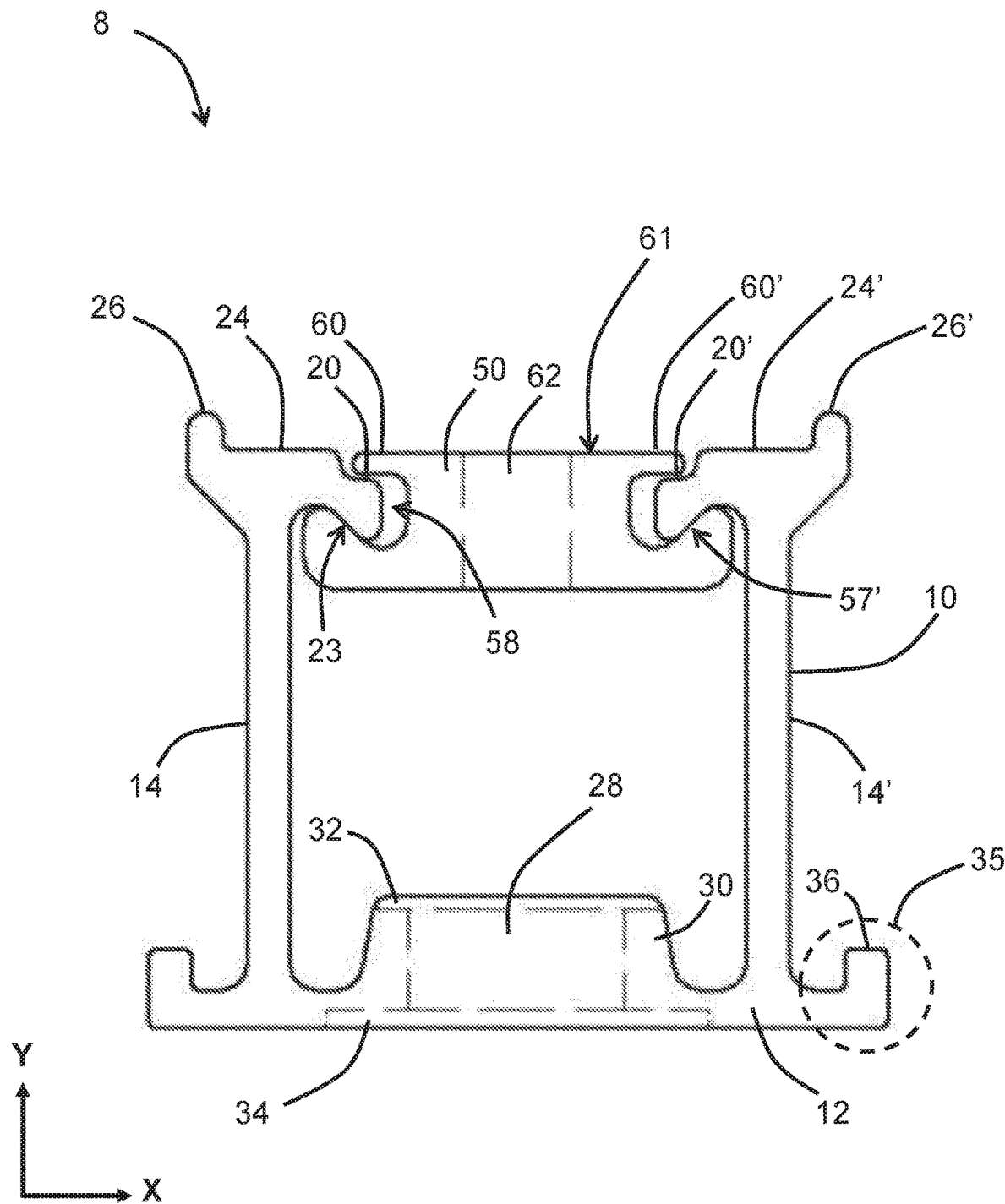
FIG. 5A shows an elevation view of the end of a channel and channel nut sub-assembly, according to an embodiment.

FIG. 5A shows an elevation view of the end of channel 10 and channel nut 50 (sub-assembly 8), according to an embodiment. Reentrant grooves 58 and 58' of nut 50 slidingly engage with downturned internal flanges 16 and 16', respectively, of channel 10. They slidingly interlock together in the X-Y plane (but with a small clearance gap between the two parts), which allows the nut 50 to freely slide along the length of channel 10 in the Z-direction. When the clamping bolt (not shown) is tightened and nut 50 is pulled up tight against downturned internal flanges 16 and 16' of channel 10, then angled ramps 23 and 23' of channel 10 contact the mating angled ramps 57 and 57', respectively, of nut 50. The engagement of nut 50 with channel 10 via angled mating ramps 57 and 23 strengthens the entire assembled structure, in particular strengthening and stiffening the vertical sidewalls 14 and 14' against side deflections (i.e., bending) caused by bending moments. The engagement of upper wings 60 and 60' of nut 50 with the upper shoulder 20 and 20,' respectively, of internal flanges 16 and 16' prevent nut 50 from falling off of channel 10 during installation when the clamping bolt is not installed (or the bolt is installed loosely). Angled ramps 23, 23' of channel 10 serves as an Anti-Rotation feature that prevents rotation of nut 50 when tightening the clamping bolt. The upper surface 61 of nut 50 remains at the same vertical height, or slightly below, the horizontal support surface defined by ledges 24, 24', so that the L-foot bracket (not shown) may contact the upper external flanges 22, 22' of channel 10.

Figure 5B:
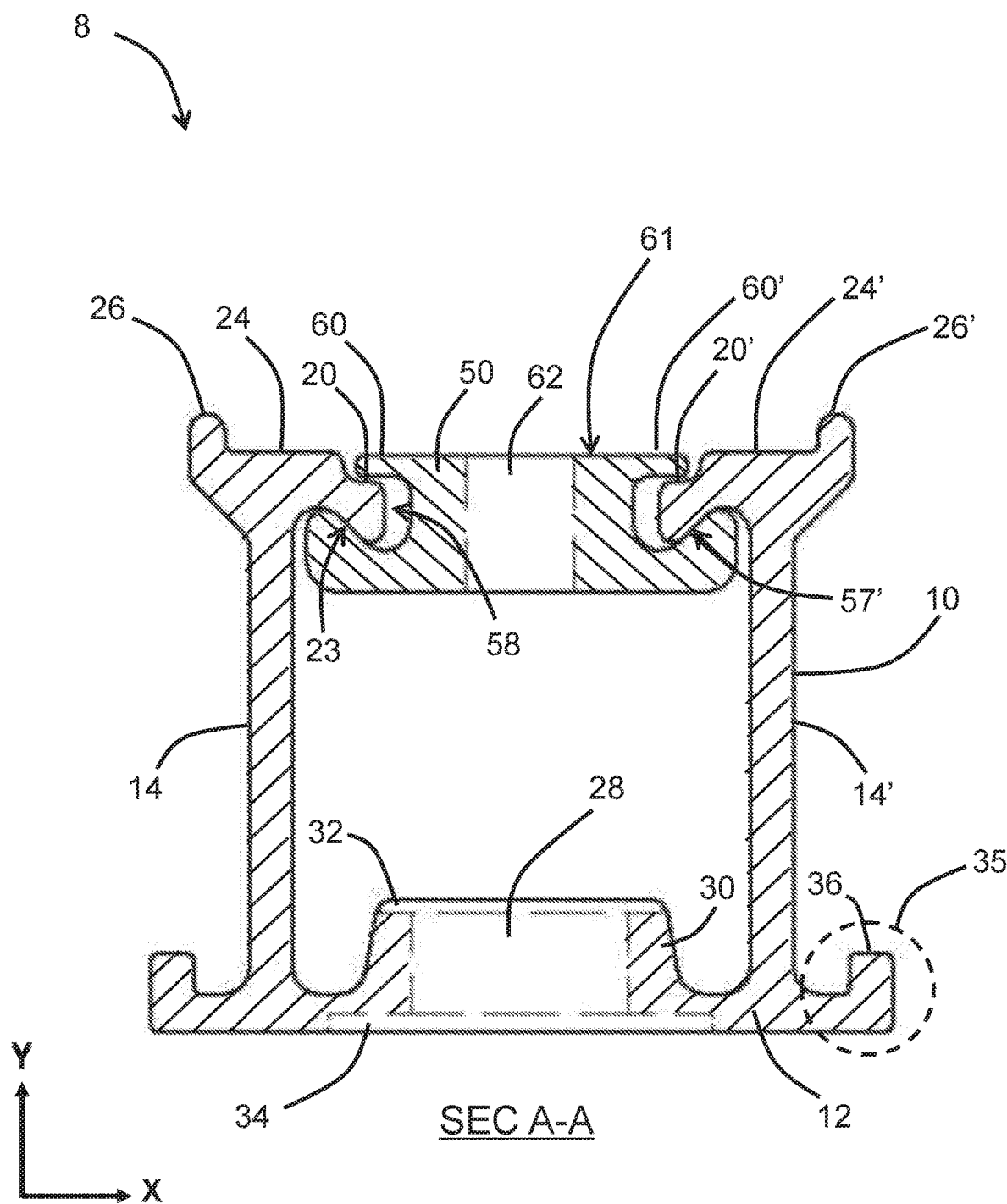
FIG. 5B shows a cross-hatched, elevation view of a cross-section through the end of a channel and channel nut sub-assembly, according to an embodiment.

FIG. 5B shows a cross-hatched, elevation view of a cross-section through the end of a channel 10 and channel nut 50 (sub-assembly 8), according to an embodiment. Reentrant grooves 58 and 58' of nut 50 slidingly engage with downturned internal flanges 16 and 16', respectively, of channel 10. They slidingly interlock together in the X-Y plane (but with a small clearance gap between the two parts), which allows the nut 50 to freely slide along the length of channel 10 in the Z-direction. When the clamping bolt (not shown) is tightened and nut 50 is pulled up tight against downturned internal flanges 16 and 16' of channel 10, then angled ramps 23 and 23' of channel 10 contact the mating angled ramps 57 and 57', respectively, of nut 50. The engagement of nut 50 with channel 10 via angled mating ramps 57 and 23 strengthens the entire assembled structure, in particular strengthening and stiffening the vertical sidewalls 14 and 14' against side deflections due to bending moments (i.e., bending). The engagement of upper wings 60 and 60' of nut 50 with the upper shoulder 20 and 20,' respectively, of internal flanges 16 and 16' prevent nut 50 from falling off of channel 10 during installation when the clamping bolt is not installed (or the bolt is installed loosely). Angled ramps 23, 23' of channel 10 serves as an Anti-Rotation feature that prevents rotation of nut 50 when tightening the clamping bolt. The upper surface 61 of nut 50 remains at the same vertical height, or slightly below, the horizontal support surface defined by ledges 24, 24', so that the L-foot bracket (not shown) may contact the upper external flanges 22, 22' of channel 10. Apertures 62 and 28, and grommet recesses 32 and 34, may be clearly seen in this view.

Figure 6:
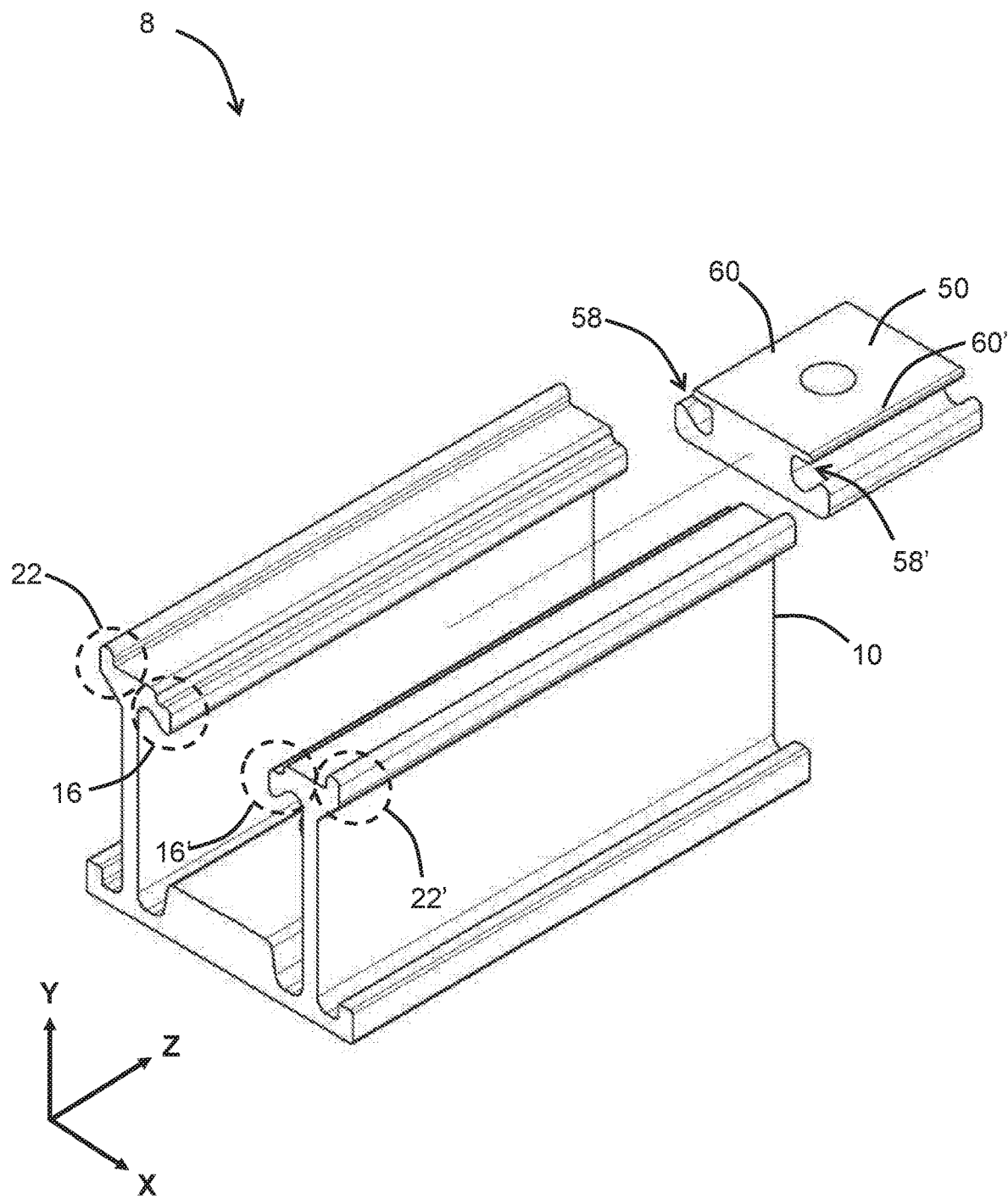
FIG. 6 shows an exploded, isometric view of a channel and a channel nut, prior to assembly, according to an embodiment.

FIG. 6 shows an exploded isometric view of channel 10 and channel nut 50, prior to assembly, according to an embodiment. Reentrant grooves 58 and 58' of nut 50 slidingly engage with downturned internal flanges 16 and 16', respectively, of channel 10. The distal ends of flanges 16 and 16' (or, alternatively, flanges 22 and 22') may be peened and turned down (not shown in FIG. 6, but shown in FIGS. 54 and 55) to prevent nut 50 from falling off the distal end of channel 10 during handling and installation.

Figure 7:
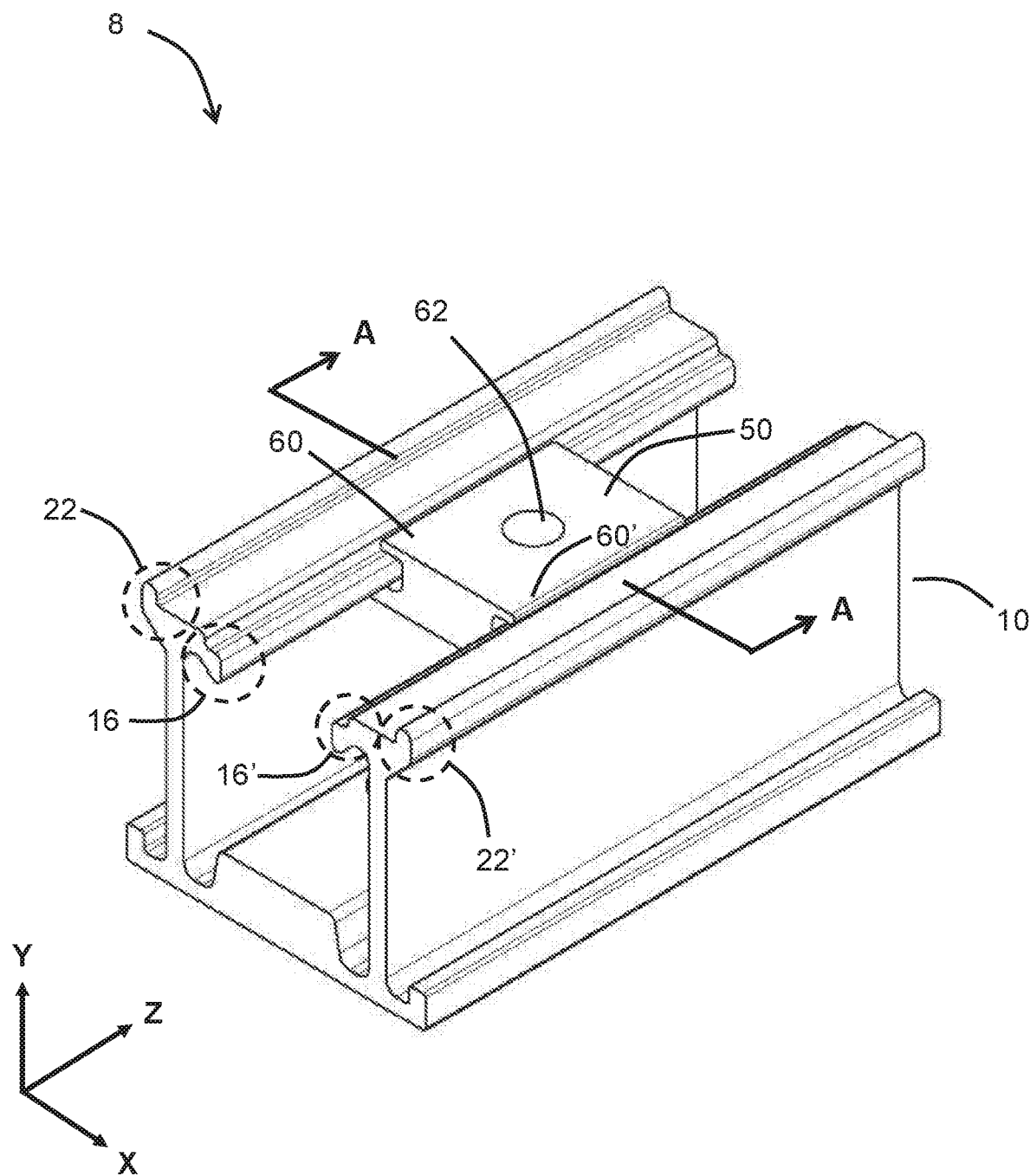
FIG. 7 shows an isometric view of a channel and a channel nut sub-assembly, according to an embodiment.

FIG. 7 shows an isometric view of channel 10 and channel nut 10 (sub-assembly 8), according to an embodiment. Reentrant grooves 58 and 58' of nut 50 slidingly engage with downturned internal flanges 16 and 16', respectively, of channel 10. The engagement of upper wings 60 and 60' of nut 50 with the upper shoulder 20 and 20' of internal flanges 16 and 16', respectively, prevent nut 50 from falling off of channel 10 during installation when the clamping bolt is not installed. The distal ends of flanges 16 and 16' (or, alternatively, flanges 22 and 22') may be peened and turned down (not shown in FIG. 7, but shown in FIGS. 54 and 55) to prevent nut 50 from falling off the distal end of channel 10 during handling and installation.

Figure 8:
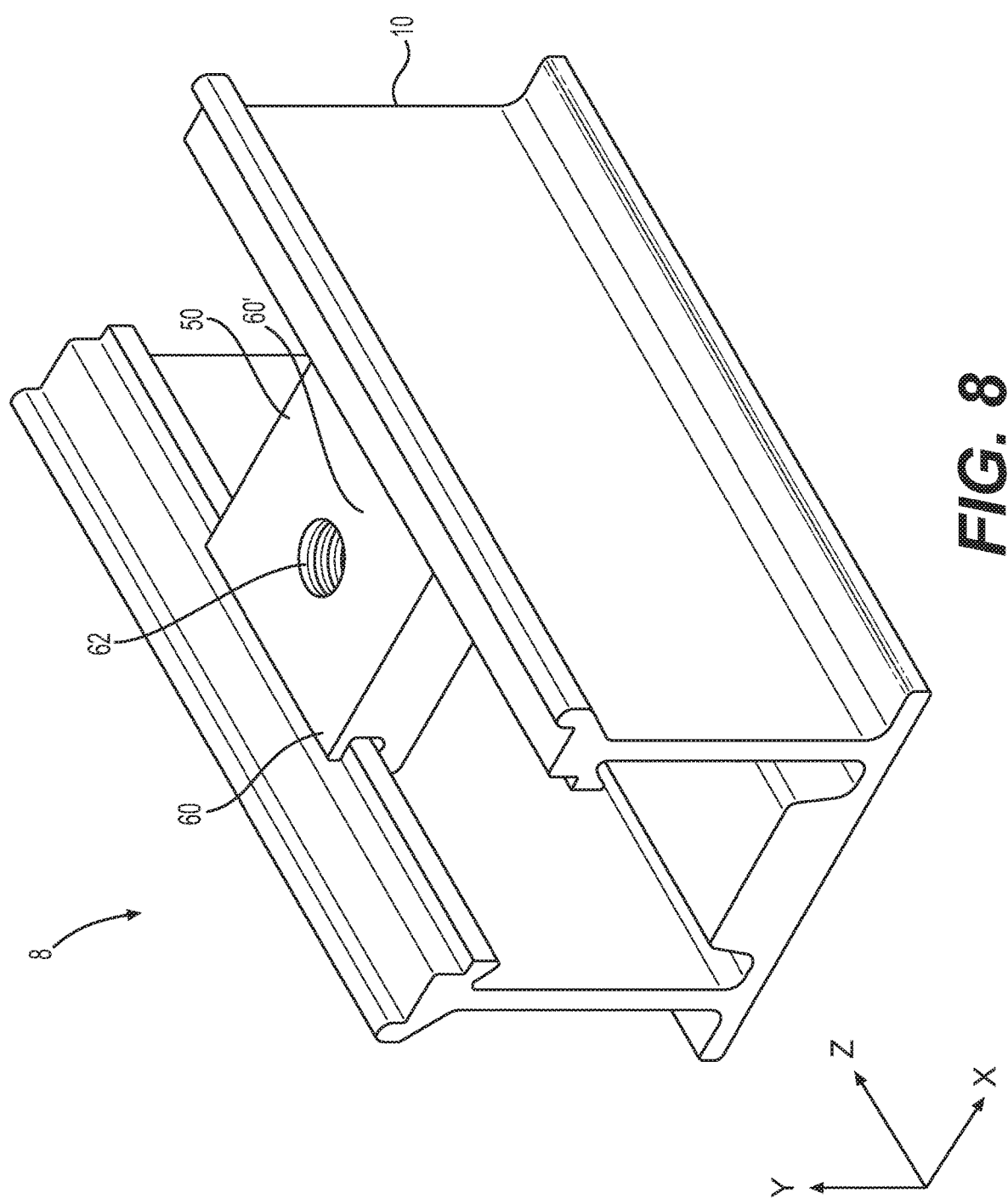
FIG. 8 shows a shaded, isometric view of a channel and a channel nut sub-assembly, according to an embodiment.

FIG. 8 shows a shaded isometric view of a channel and a channel nut (sub-assembly 8), according to an embodiment. Reentrant grooves 58 and 58' of nut 50 slidingly engage with downturned internal flanges 16 and 16', respectively, of channel 10. The engagement of upper wings 60 and 60' of nut 50 with the upper shoulder 20 and 20' of internal flanges 16 and 16', respectively, prevent nut 50 from falling off of channel 10 during installation when the clamping bolt is not installed. The distal ends of flanges 16 and 16' (or, alternatively, flanges 22 and 22') may be peened and turned down (not shown in FIG. 8, but shown in FIGS. 54 and 55) to prevent nut 50 from falling off the distal end of channel 10 during handling and installation.

Figure 9:
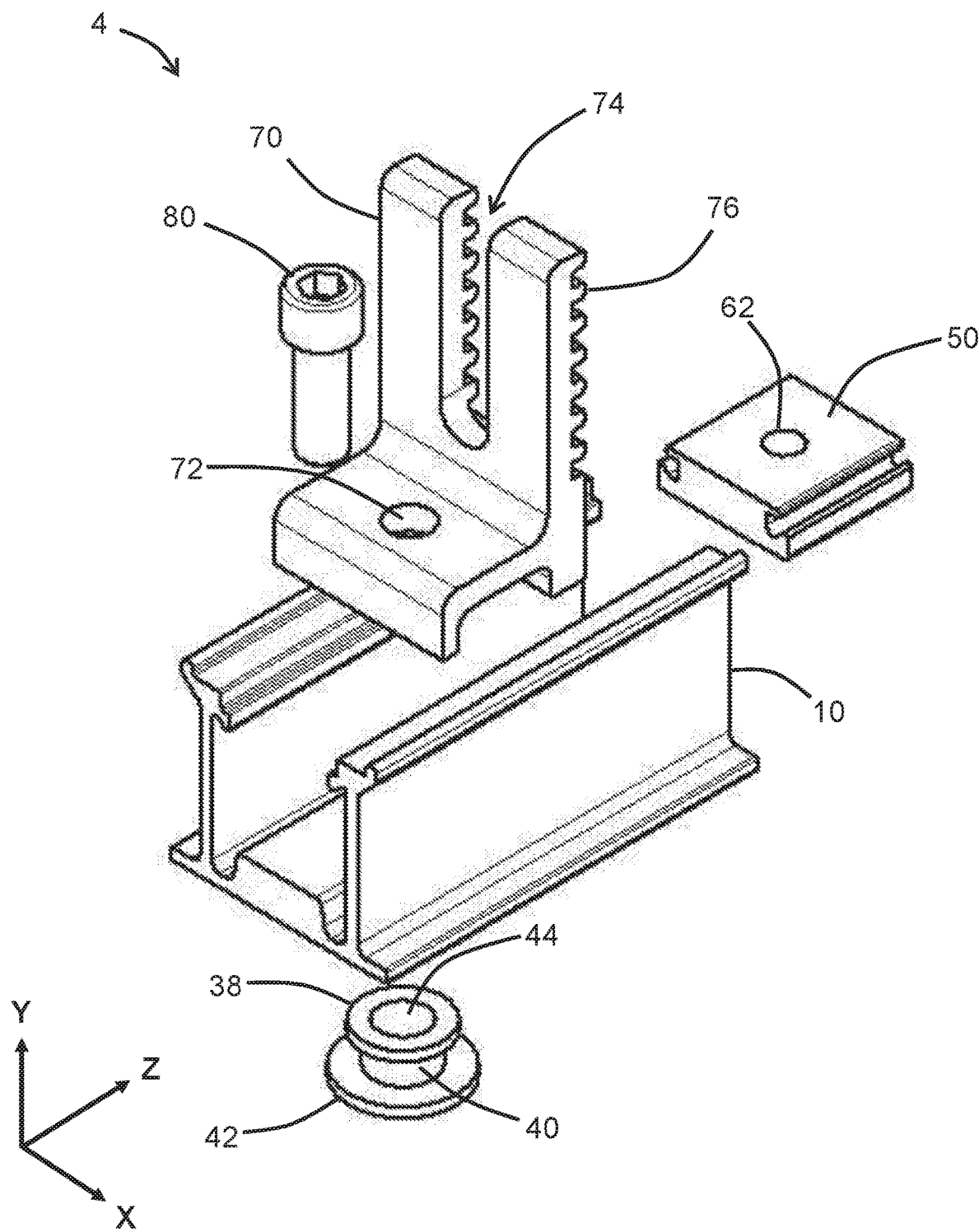
FIG. 9 shows an exploded, isometric view of a channel, channel nut, L-foot bracket, clamping bolt, and grommet, before assembly, according to an embodiment.

FIG. 9 shows an exploded isometric view of a channel 10, channel nut 50, L-foot bracket 70, clamping bolt 80, and grommet 40, before assembly, according to an embodiment. L-foot bracket 70 is an L-shaped structural bracket, with a vertical aperture 72 disposed on a base portion, and a U-shaped aperture 74 disposed in a vertical portion of L-foot bracket 70. A series of parallel (or substantially parallel), indexed teeth (corrugations) 76 are disposed on the front side of L-foot bracket 70, which engage with mating teeth/ grooves on a horizontal structural rail (not shown), onto which solar panels (not shown) are mounted. Clamping bolt 80 passes through un-threaded aperture 72 in L-foot bracket 70 and engages with threads in aperture 62 of nut 50. I-shaped grommet 40 has upper annular flange 38 and lower annular flange 42, which may be made of EDPM or rubber. In an embodiment, the L-foot bracket 70 may be vertically adjustable. The diameter of the lower flange 42 may be greater than the diameter of the upper flange 38.

Figure 10:
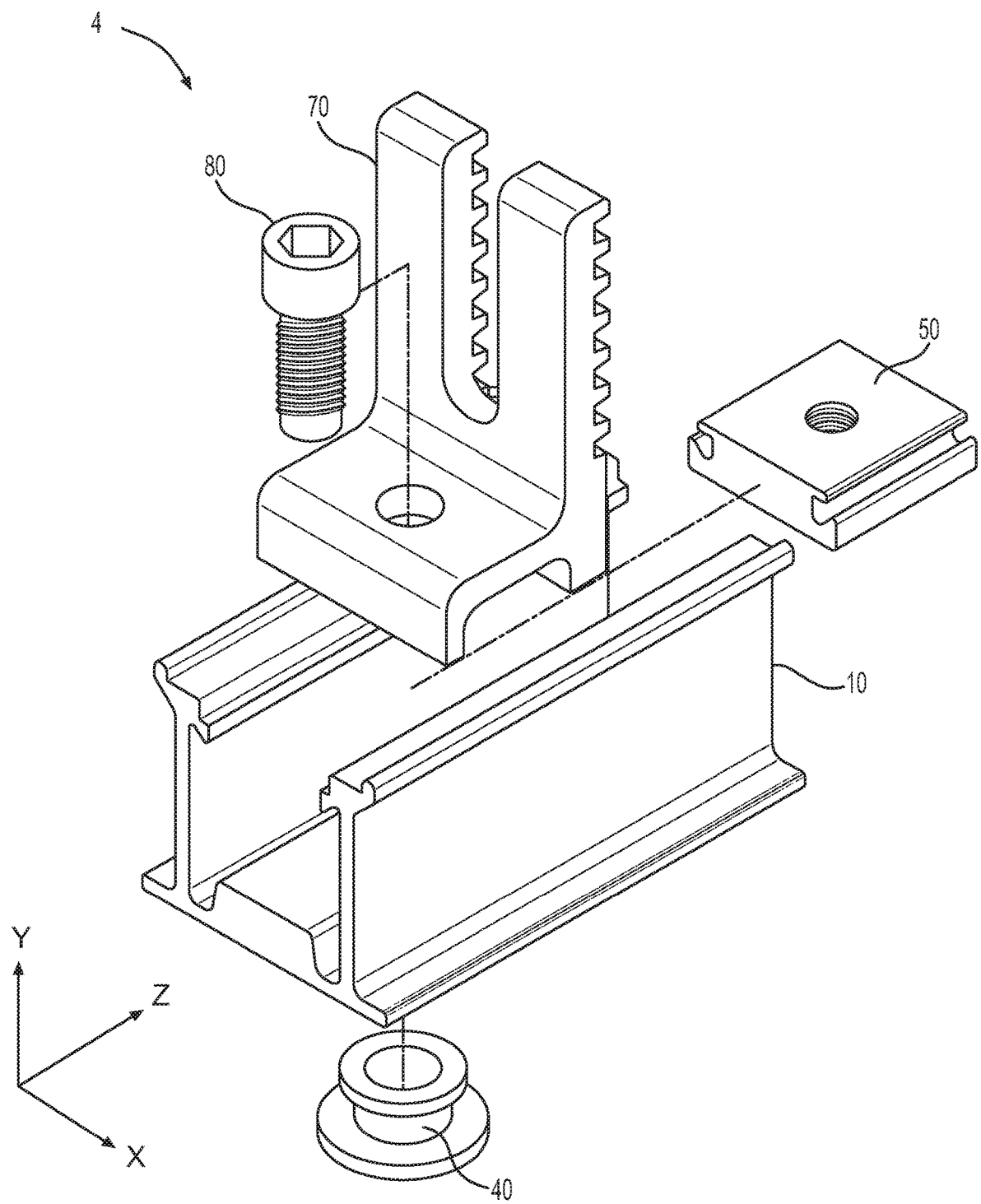
FIG. 10 shows a shaded, exploded isometric view of a channel, channel nut, L-foot bracket, clamping bolt, and grommet, before assembly, according to an embodiment.

FIG. 10 shows a shaded, exploded isometric view of a channel 10, channel nut 50, L-foot bracket 70, clamping bolt 80, and grommet 40, before assembly, according to an embodiment. L-foot bracket 70 is an L-shaped structural bracket, with a vertical aperture 72 disposed on a base portion, and a U-shaped aperture 74 disposed in a vertical portion of L-foot bracket 70. A series of parallel (or substantially parallel), indexed teeth (corrugations) 76 are disposed on the front side of L-foot bracket 70, which engage with mating teeth/grooves on a horizontal structural rail (not shown), onto which solar panels (not shown) are mounted. Clamping bolt 80 passes through un-threaded aperture 72 in L-foot bracket 70 and engages with threads in aperture 62 of nut 50. I-shaped grommet 40 has upper annular flange 38 and lower annular flange 42, which may be made of EDPM or rubber. The diameter of the lower flange 42 may be greater than the diameter of the upper flange 38.

Figure 11:
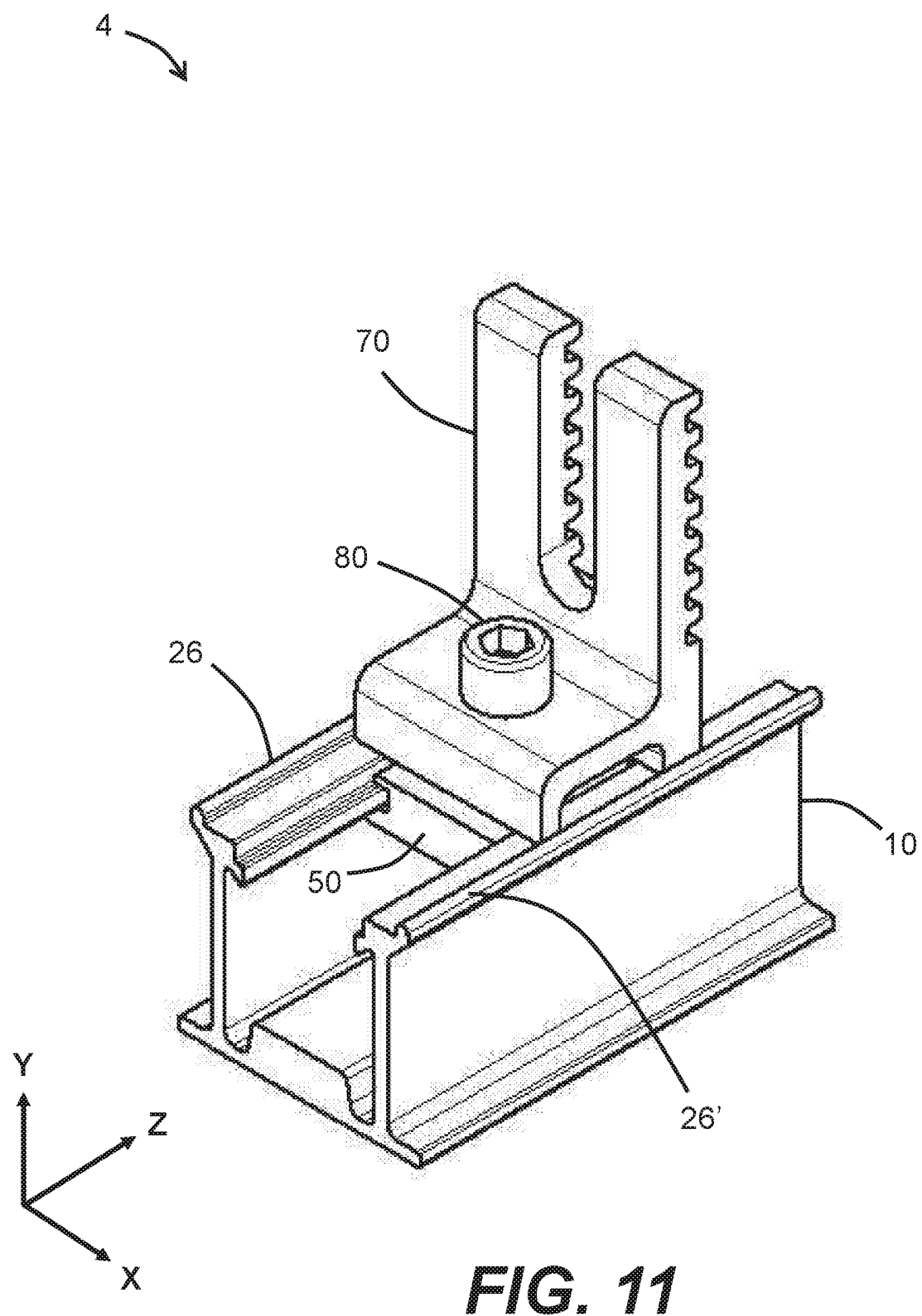
FIG. 11 shows an isometric view of an assembled channel, channel nut, and L-foot bracket, clamping bolt, and grommet, according to an embodiment.

FIG. 11 shows an isometric view of an assembled channel 10, channel nut 50, L-foot bracket 70, clamping bolt 80, and grommet 40, assembled into assembly 4 according to an embodiment. Bolt 80 clamps L-foot bracket 70 to channel 10 using channel nut 50. Before bolt 80 is tightened, L-foot bracket 70 may freely slide along the length of channel 10 in the Z-direction, as needed, until a final position is reached. Substantially parallel lips 26 and 26' serve as guide rails to center and align L-foot bracket 70 in a proper orientation relative to channel 10, and to prevent rotation of L-foot bracket 70 when tightening bolt 80.

Figure 12:
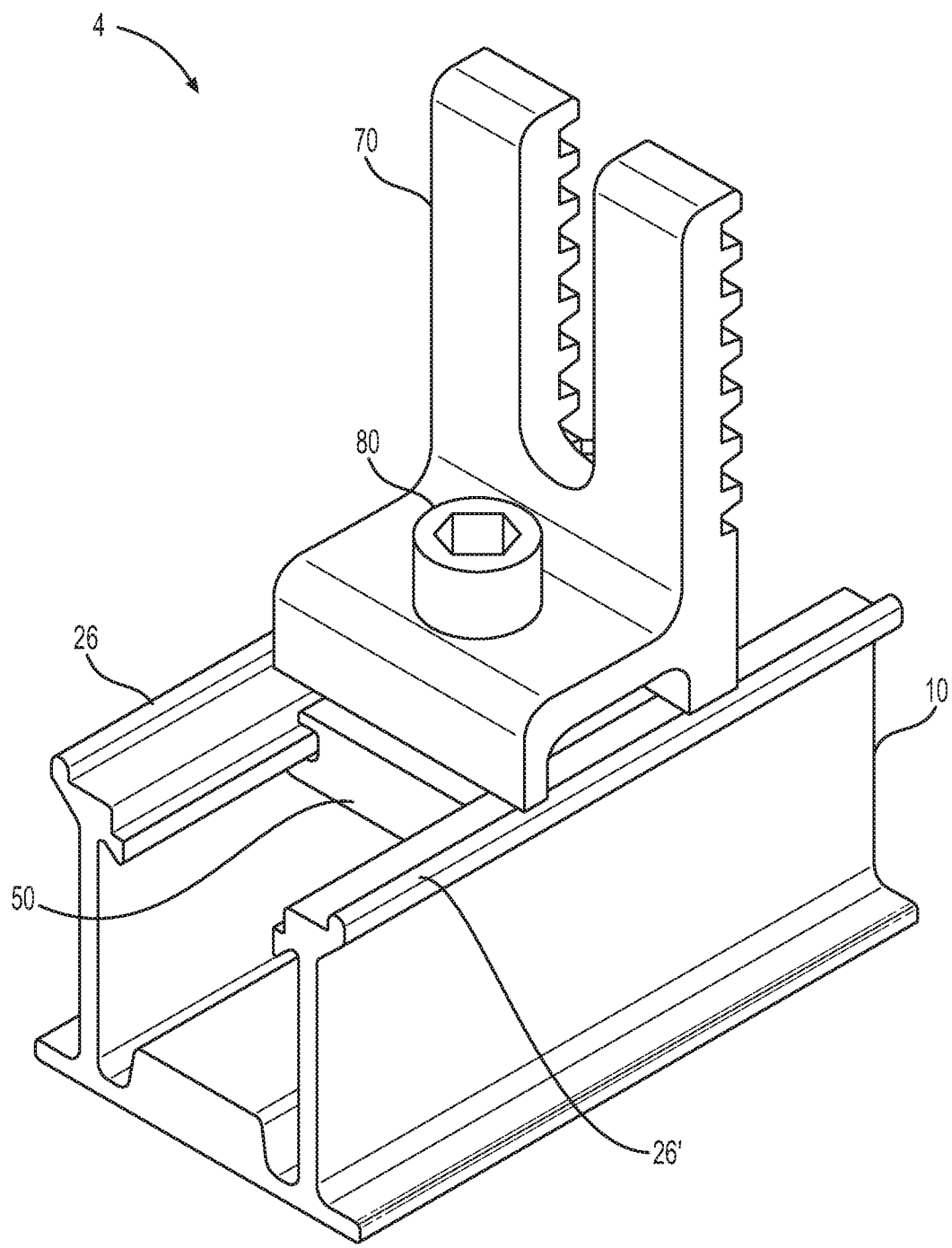
FIG. 12 shows a shaded, isometric view of an assembled channel, channel nut, and L-foot bracket, clamping bolt, and grommet, according to an embodiment.

FIG. 12 shows a shaded, isometric view of channel 10, channel nut 50, L-foot bracket 70, clamping bolt 80, and grommet 40, assembled into assembly 4 according to an embodiment. Bolt 80 clamps L-foot bracket 70 to channel 10 using channel nut 50. Before bolt 80 is tightened, L-foot bracket 70 may freely slide along the length of channel 10 in the Z-direction, as needed, until a final position is reached. Substantially parallel lips 26 and 26' serve as guide rails to center and align L-foot bracket 70 in a proper orientation relative to channel 10, and to prevent rotation of L-foot bracket 70 when tightening bolt 80.

Figure 13:
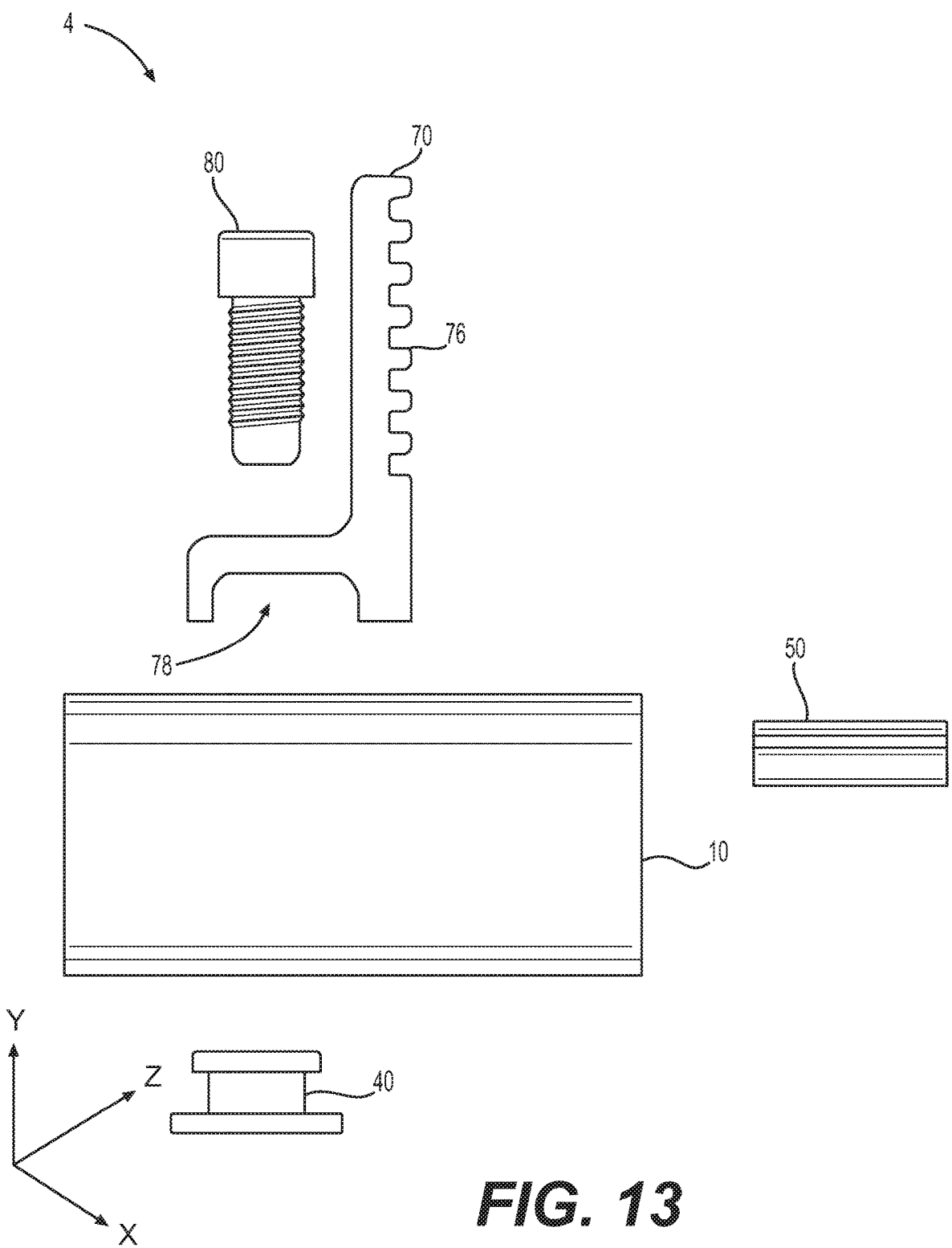
FIG. 13 shows an exploded, shaded, side elevation view of a channel, channel nut, and L-foot bracket, clamping bolt, and grommet, before assembly, according to an embodiment.

FIG. 13 shows an exploded, shaded, side elevation view of a channel 10, channel nut 50, L-foot bracket 70, clamping bolt 80, and grommet 40, before assembly, according to an embodiment. L-foot bracket 70 may optionally include a cutout portion 78 in the lower part of bracket 70, to reduce material and weight.

Figure 14:
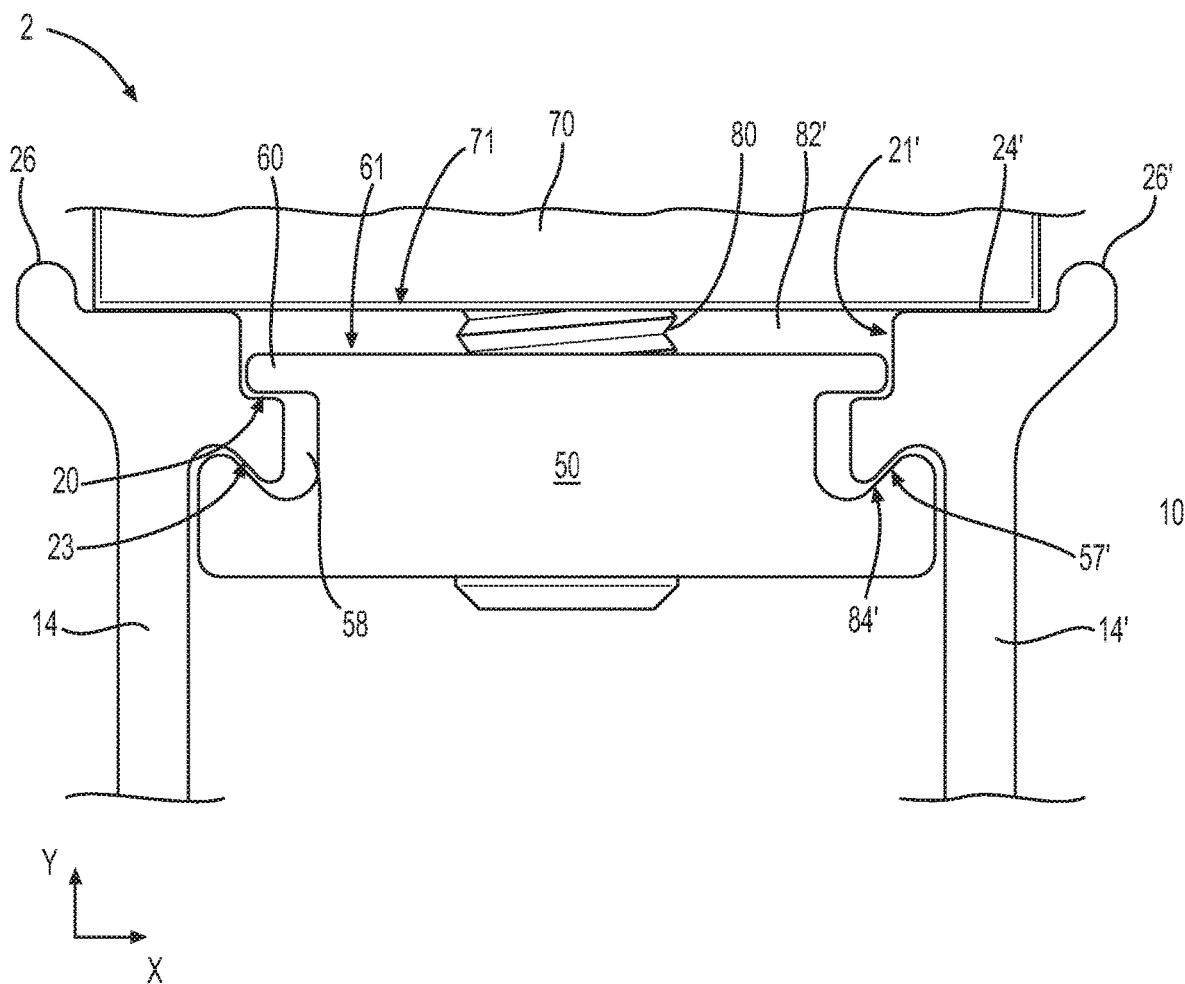
FIG. 14 shows an elevation end view of a channel, channel nut, and clamping bolt, before tightening the clamping bolt, according to an embodiment.

FIG. 14 shows an elevation end view of channel 10, channel nut 50, and clamping bolt 80, before tightening clamping bolt 80, according to an embodiment. In this configuration, the clamping bolt is loose. FIG. 14 shows that a relatively small clearance gap 84' exists in-between the interlocking, mating surfaces (e.g., ramp 23' and ramp 57') of channel 10 and nut 50, respectively, which permits nut 50 to freely slide along the length of channel 10 in the Z-direction. Also, a relatively large clearance gap 82' exists between the top surface 61 of nut 50 and the lower surface 71 of L-foot bracket 70, in order to prevent any interference between nut 50 and L-foot bracket 70 when assembly 2 is clamped together.

Figure 15:
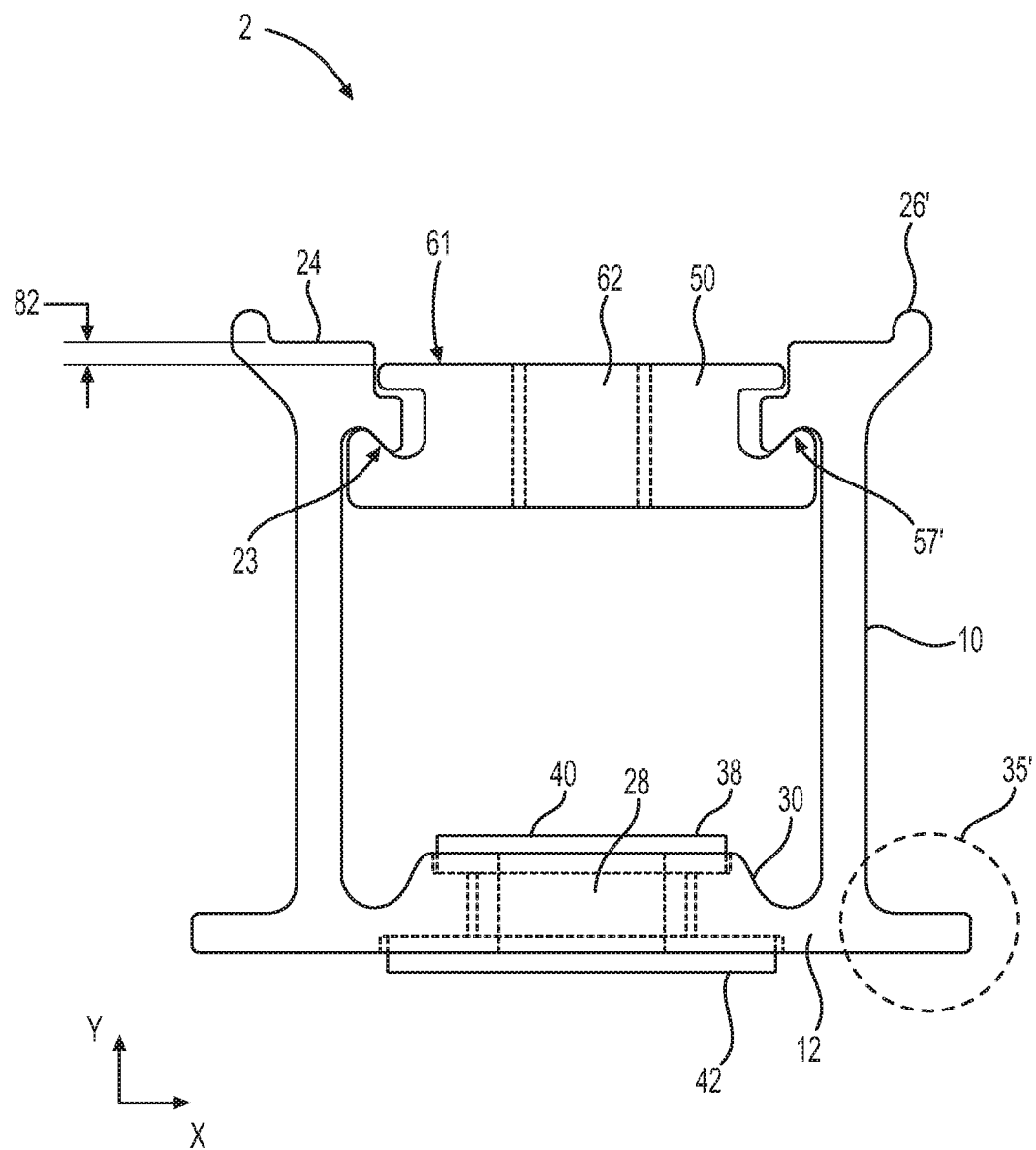
FIG. 15 shows an elevation end view of a channel and channel nut, after tightening a clamping bolt, according to an embodiment.

FIG. 15 shows an elevation end view of channel 10 and channel nut 50, after tightening a clamping bolt (not shown), according to an embodiment. Gap 82 is identified, which is the distance between the horizontal line defined by upper ledges 24 and 24' of channel 10 and the upper surface 61 of nut 50. Gap 82 may be sized to prevent any interference between nut 50 and L-foot bracket 70 when assembly 2 is clamped together. Aperture 62 in nut 50, and aperture 28 in boss 30, as well as grommet 40, may be seen. Note that in this embodiment, base extension flange 35' does not have an upturned lip 36' (as is shown in FIG. 1).

Figure 16:
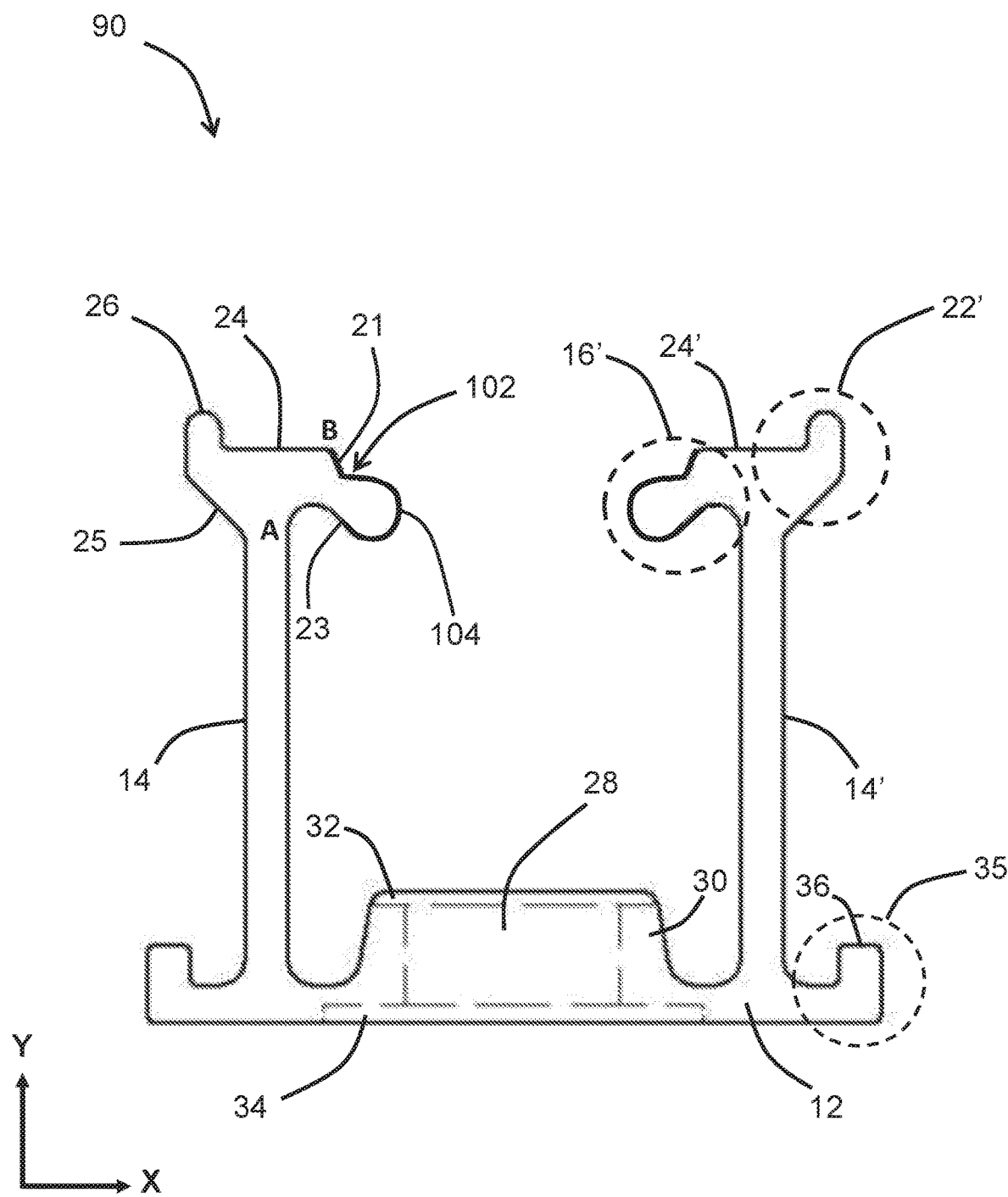
FIG. 16 shows an elevation view of the end of a channel, according to an embodiment.

FIG. 16 shows an elevation view of the end of channel 90, according to an embodiment. The shape of downturned internal flange 16 includes a thin neck region 102, a bulbous (rounded) enlarged tab end 104, and an angled ramp segment 23. The overall shape may resemble a "puzzle piece" (where there are no straight-line segments). Other features shown in FIG. 16 may include a short vertical (or near-vertical) segment 21 connected to downturned flange 16, a horizontal ledge 24 connected to vertical segment 21, a raised lip 26, and an angled exterior segment 25.

Figure 17:
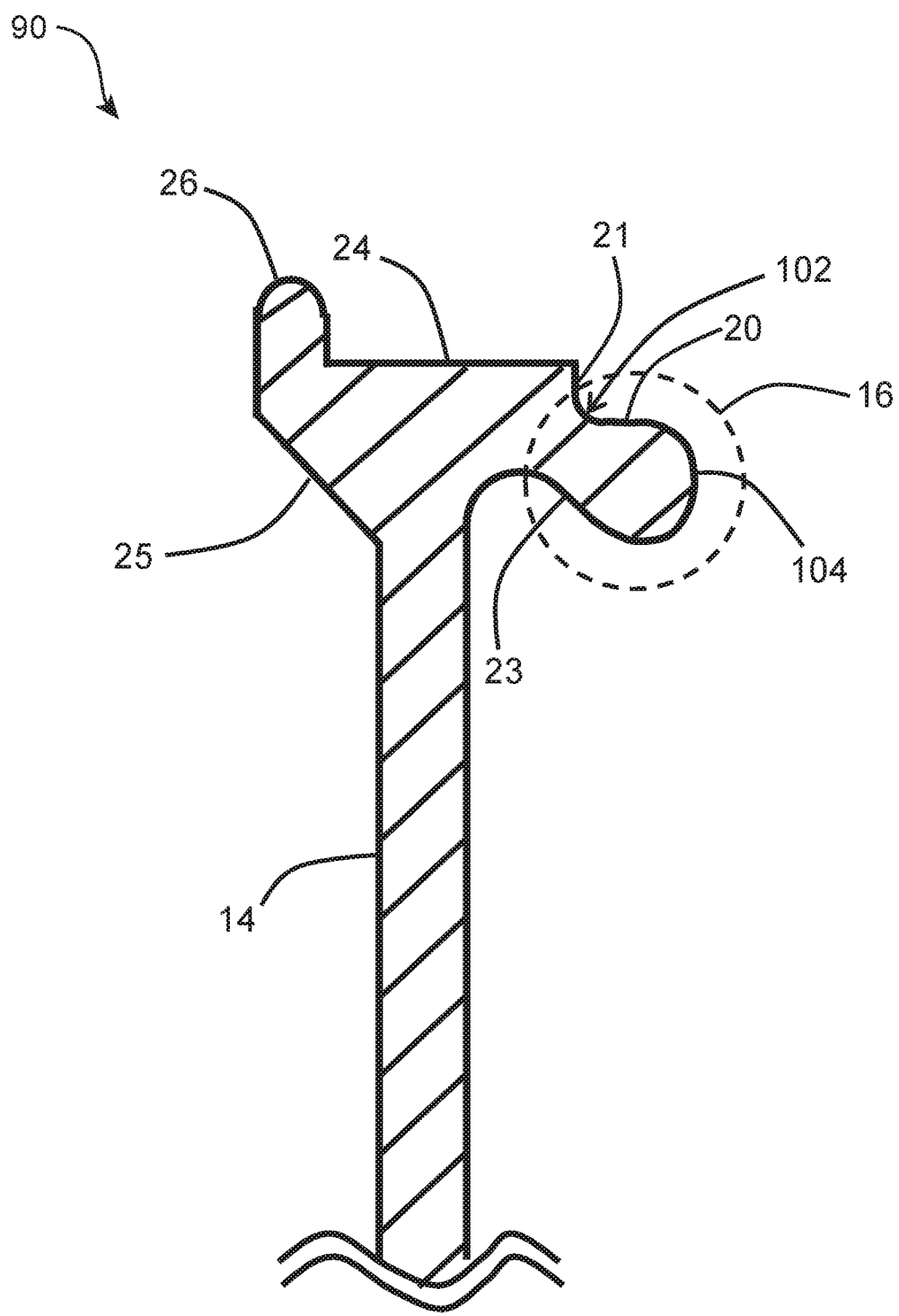
FIG. 17 shows a cross-hatched elevation view of a cross-section of the end of left channel sidewall, according to an embodiment.

FIG. 17 shows a cross-hatched elevation view of a cross-section of the end of left channel sidewall 14, according to an embodiment. The shape of downturned internal flange 16 includes a thin neck region 102, a bulbous (rounded) enlarged tab end 104, and an angled ramp segment 23. The overall shape may resemble a "puzzle piece" (where there are no straight-line segments). Other features shown in FIG. 16 may include a short vertical (or near-vertical) segment 21 connected to downturned flange 16, a horizontal ledge 24 connected to vertical segment 21, a raised lip 26, and an angled exterior segment 25.

Figure 18:
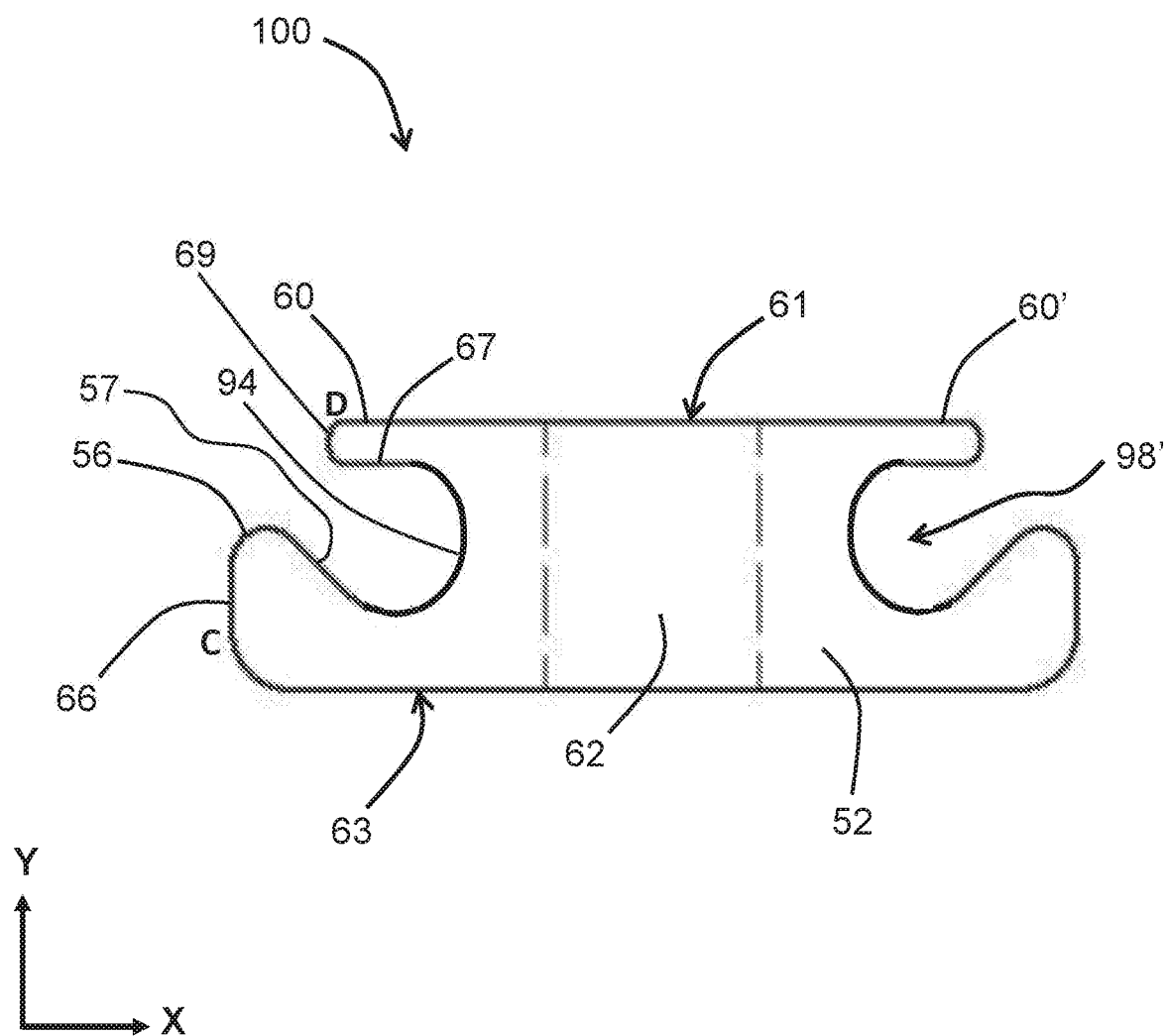
FIG. 18 shows an elevation view of the end of a channel nut, according to an embodiment.

FIG. 18 shows an elevation view of the end of channel nut 100, according to an embodiment. Nut 100 is similar to nut 50 shown in FIGS. 2-3, with the exception that reentrant groove 98 may be deeper and more rounded (bulbous) 94 than the groove 58' identified in FIG. 3. Reentrant groove 98' in FIG. 18 may resemble a "puzzle piece" (where there are no straight-line segments in the rounded segment 94).

Figure 19:
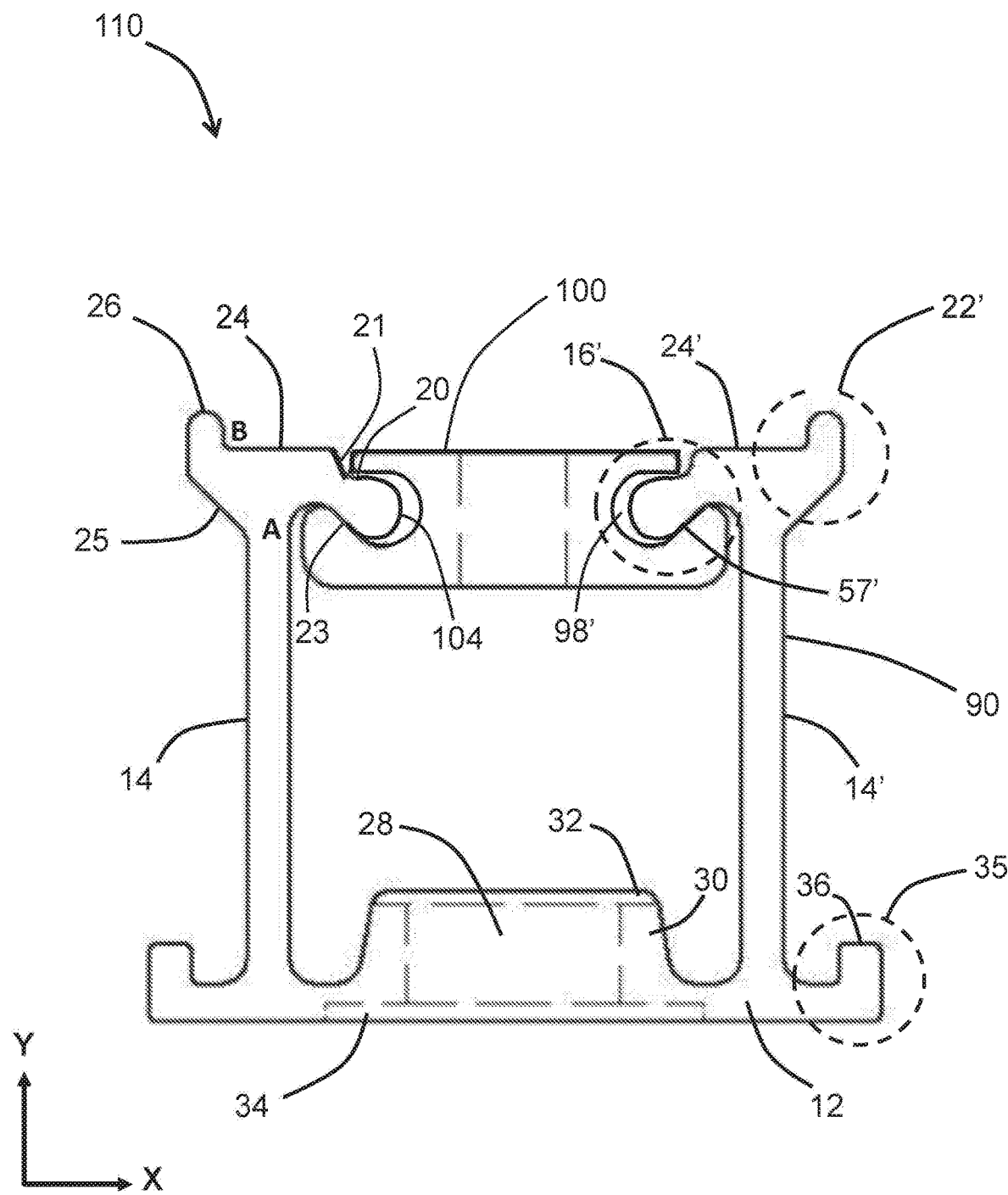
FIG. 19 shows an elevation view of the end of a channel and channel nut subassembly, according to an embodiment.

FIG. 19 shows an elevation view of the end of channel 90 and channel nut 100 (subassembly 110), according to an embodiment. Reentrant grooves 98 and 98' of nut 110 slidingly engage (interlock) with the bulbous tabs 104, 104' of downturned internal flanges 16 and 16', respectively, of channel 90. The puzzle-piece shape of the pair of reentrant grooves 98, 98' match the corresponding puzzle-piece shape of the pair of bulbous tabs 104, 104', with a small clearance gap in-between the two different parts. The two components slidingly interlock together in the X-Y plane (but with a relatively small clearance gap between the two parts), which allows nut 50 to freely slide along the length of channel 90 in the Z-direction. Angled ramps 57 and 57' of channel nut 100 are drawn up tight by a clamping bolt (not shown) that provides a clamping force against the angled ramps 23 and 23' of downturned internal flanges 16 and 16', respectively.

Figure 20:
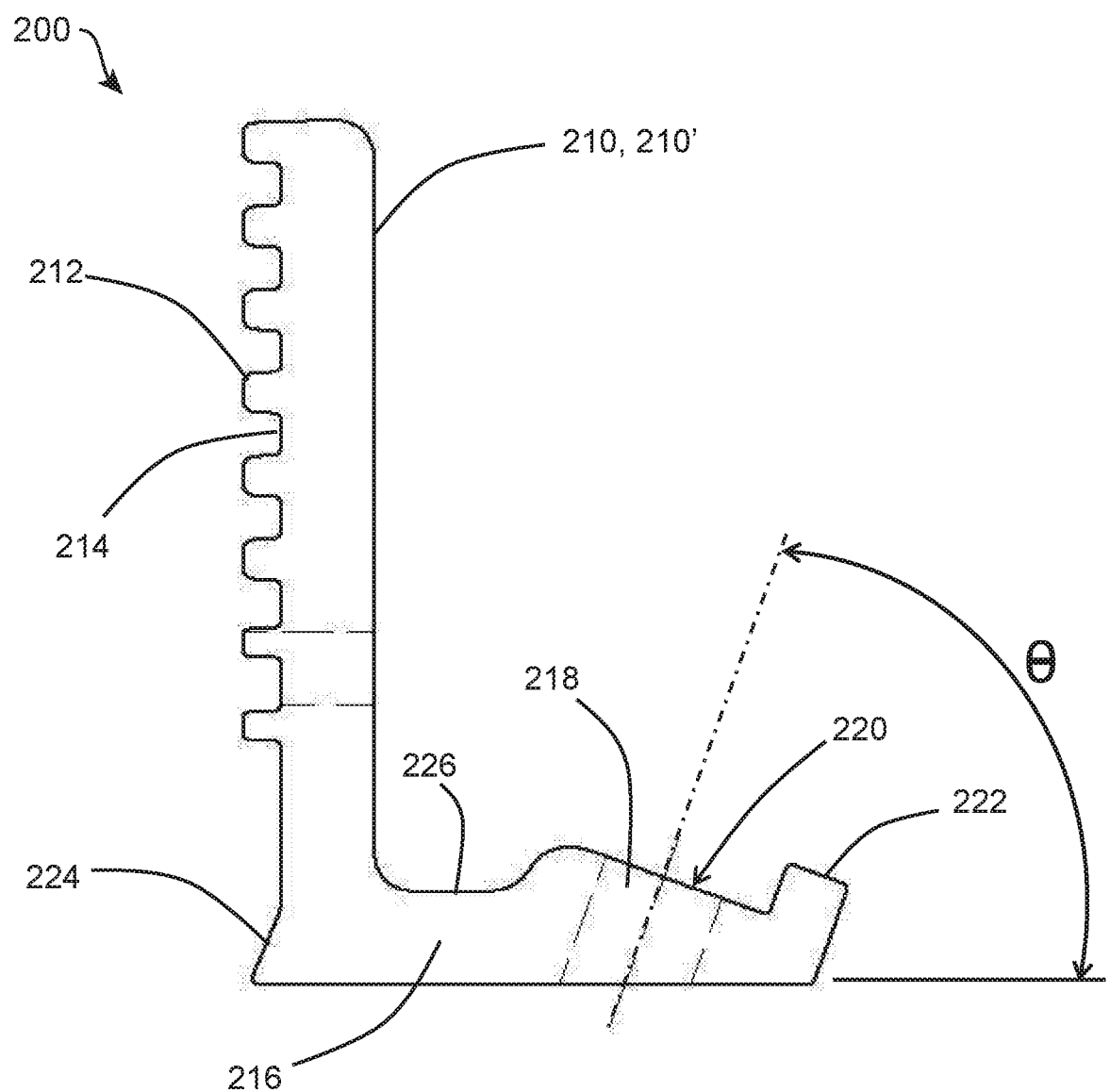
FIG. 20 shows an elevation side view of an L-foot bracket with an angled hole for the clamping bolt, according to an embodiment.

FIG. 20 shows an elevation side view of an L-foot bracket 200 with an angled hole 218 for the clamping bolt (not shown), according to an embodiment. Angled hole 218 may be angled at a tilt angle, θ, of approximately 70° to the horizontal. Alternatively, tilt angle, θ, may range from approximately 60° to approximately 80°. L-bracket 200 includes: a horizontal base 216, a pair of substantially parallel, integral vertical legs 210 and 210' that has a plurality of corrugations (teeth) 212 and 212', respectively, on the backside of vertical legs 210 and 210'; a vertical slot 230 disposed in-between vertical legs 210 and 210'; an angled aperture (hole) 218; a flat facing surface 220 that is substantially perpendicular to an longitudinal axis of aperture 218; and an upwardly protruding ledge 222 on a distal end of base 216. Base 216 further includes an outwardly-flared end 224 on the lower end of vertical leg 210. A longitudinal groove 226 is disposed in-between the lower end of vertical leg 210 and aperture 218.

Figure 21:
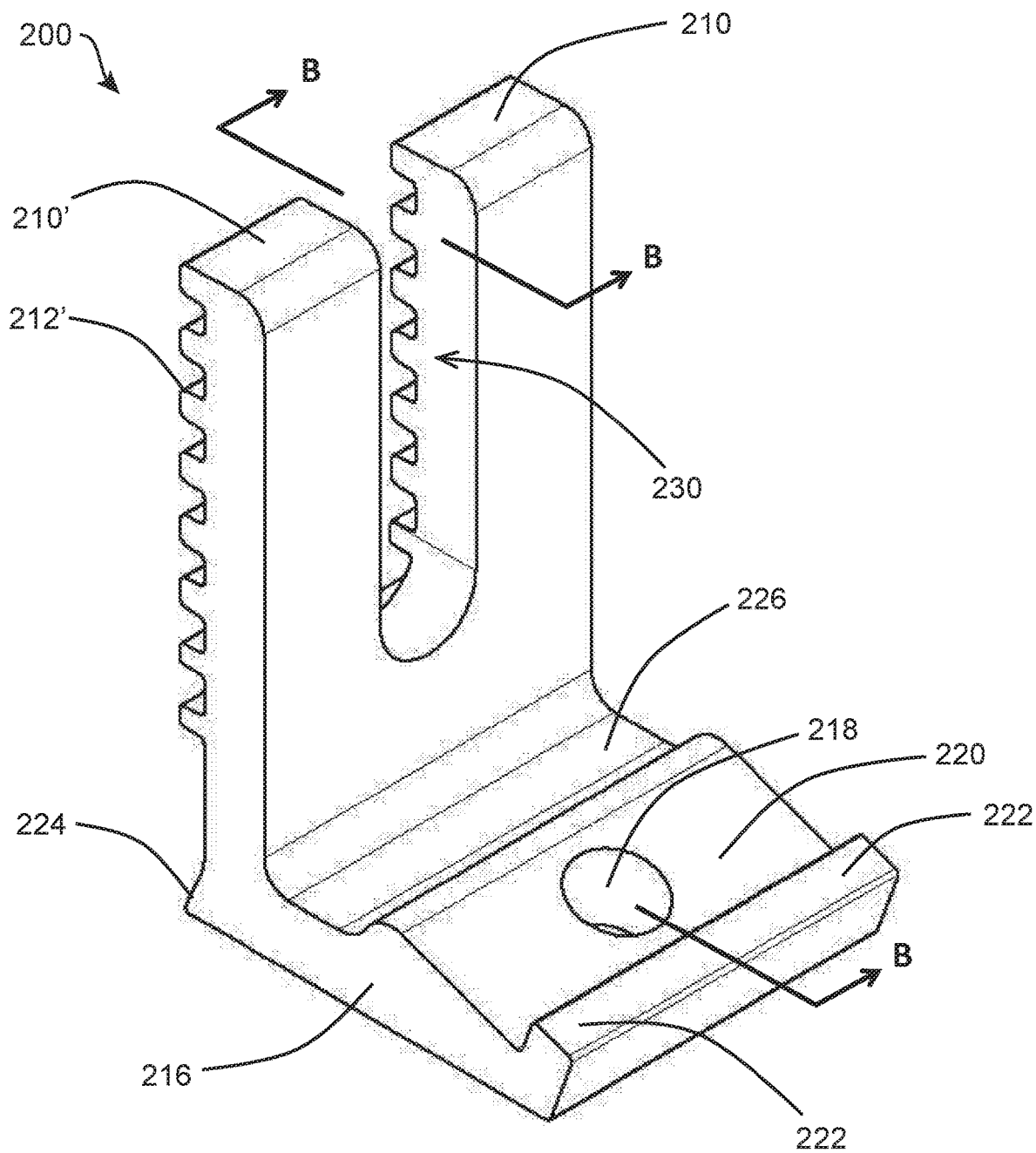
FIG. 21 shows an isometric view of the front end of an L-foot bracket with an angled hole for the clamping bolt, according to an embodiment.

FIG. 21 shows an isometric view of the front end of an L-foot bracket 200 with an angled hole 218 for the clamping bolt (not shown), according to an embodiment. Angled hole 218 may be angled at a tilt angle, θ, of approximately 70° to the horizontal. Alternatively, tilt angle, θ, may range from approximately 60° to approximately 80°. Alternatively, tilt angle, θ, may be less than 90°. L-bracket 200 includes: a horizontal base 216, a pair of substantially parallel, integral vertical legs 210 and 210' that has a plurality of corrugations (teeth) 212 and 212', respectively, on the backside of vertical legs 210 and 210'; a vertical slot 230 disposed in-between vertical legs 210 and 210'; an angled aperture (hole) 218; a flat facing surface 220 that is substantially perpendicular to an longitudinal axis of aperture 218; and an upwardly protruding ledge 222 on a distal end of base 216. Base 216 further includes an outwardly-flared end 224 on the lower end of vertical leg 210. A longitudinal groove 226 is disposed in-between the lower end of vertical leg 210 and aperture 218. Cross-section B-B is indicated in this figure. The purpose of upwardly protruding ledge 222 is to stiffen and strengthen the horizontal base 216 of L-foot bracket 200 against bending forces applied by the angled clamping bolt 290 when the bolt is tightened.

Figure 22:
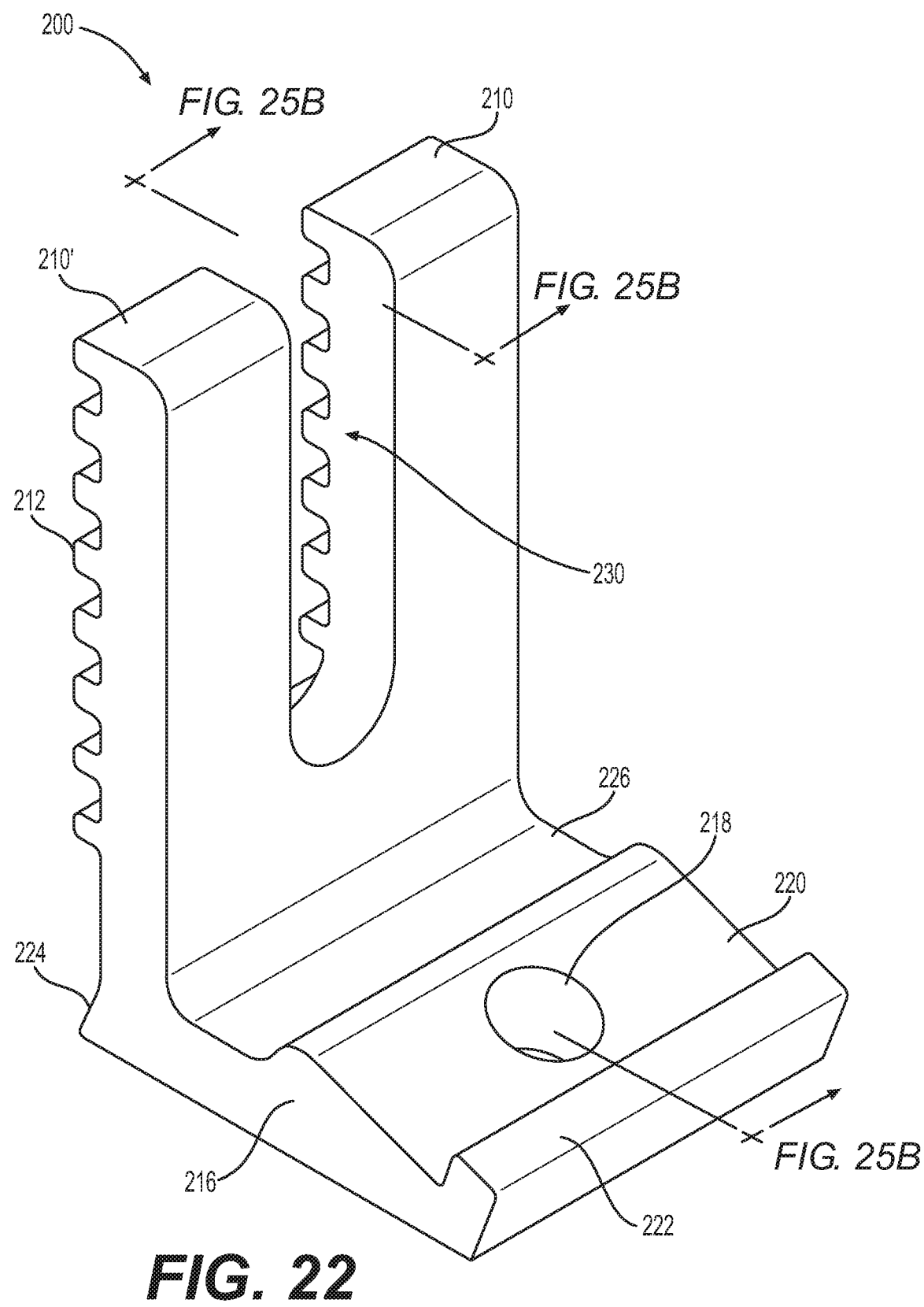
FIG. 22 shows a solid-shaded, isometric view of the front of an L-foot bracket with an angled hole for the clamping bolt, according to an embodiment.

FIG. 22 shows a solid-shaded, isometric view of the front end of an L-foot bracket 200 with an angled hole 218 for the clamping bolt (not shown), according to an embodiment. Angled hole 218 may be angled at a tilt angle, θ, of approximately 70° to the horizontal. Alternatively, tilt angle, θ, may range from approximately 60° to approximately 80°. L-bracket 200 includes: a horizontal base 216, a pair of substantially parallel, integral vertical legs 210 and 210' that has a plurality of corrugations (teeth) 212 and 212', respectively, on the backside of vertical legs 210 and 210'; a vertical slot 230 disposed in-between vertical legs 210 and 210'; an angled aperture (hole) 218; a flat facing surface 220 that is substantially perpendicular to an longitudinal axis of aperture 218; and an upwardly protruding ledge 222 on a distal end of base 216. Base 216 further includes an outwardly-flared end 224 on the lower end of vertical leg 210. A longitudinal groove 226 is disposed in-between the lower end of vertical leg 210 and aperture 218. Cross-section B-B is indicated in this figure.

Figure 23:
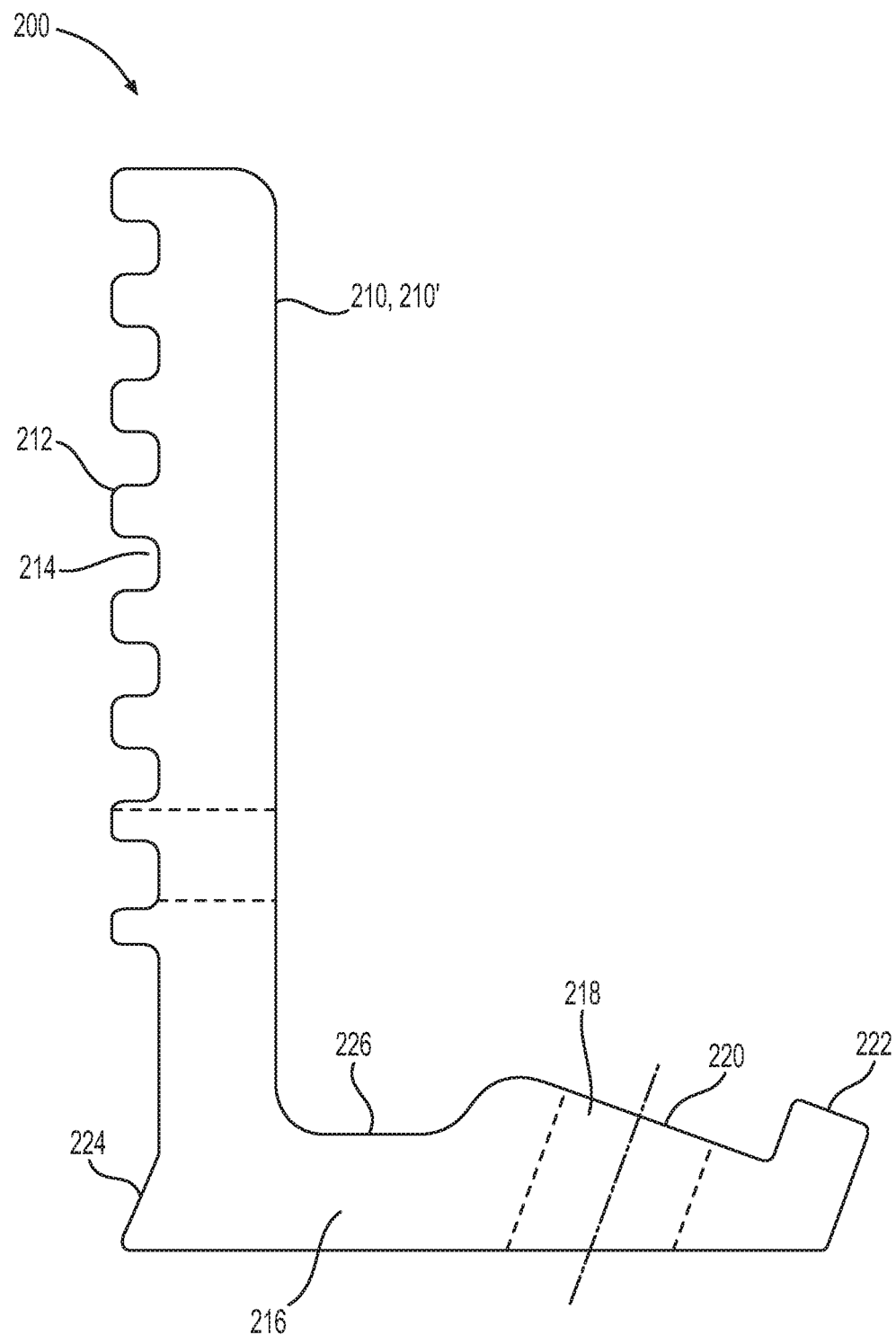
FIG. 23 shows a solid-shaded, elevation side view of an L-foot bracket with an angled hole for the clamping bolt, according to an embodiment.

FIG. 23 shows a solid-shaded, elevation side view of an L-foot bracket 200 with an angled hole 218 for the clamping bolt (not shown), according to an embodiment. Angled hole 218 may be angled at a tilt angle, θ, of approximately 70° to the horizontal. Alternatively, tilt angle, θ, may range from approximately 60° to approximately 80°. L-bracket 200 includes: a horizontal base 216, a pair of substantially parallel, integral vertical legs 210 and 210' that has a plurality of corrugations (teeth) 212 and 212', respectively, on the backside of vertical legs 210 and 210'; a vertical slot 230 disposed in-between vertical legs 210 and 210'; an angled aperture (hole) 218; a flat facing surface 220 that is substantially perpendicular to an longitudinal axis of aperture 218; and an upwardly protruding ledge 222 on a distal end of base 216. Base 216 further includes an outwardly-flared end 224 on the lower end of vertical leg 210. A longitudinal groove 226 is disposed in-between the lower end of vertical leg 210 and aperture 218.

Figure 24:
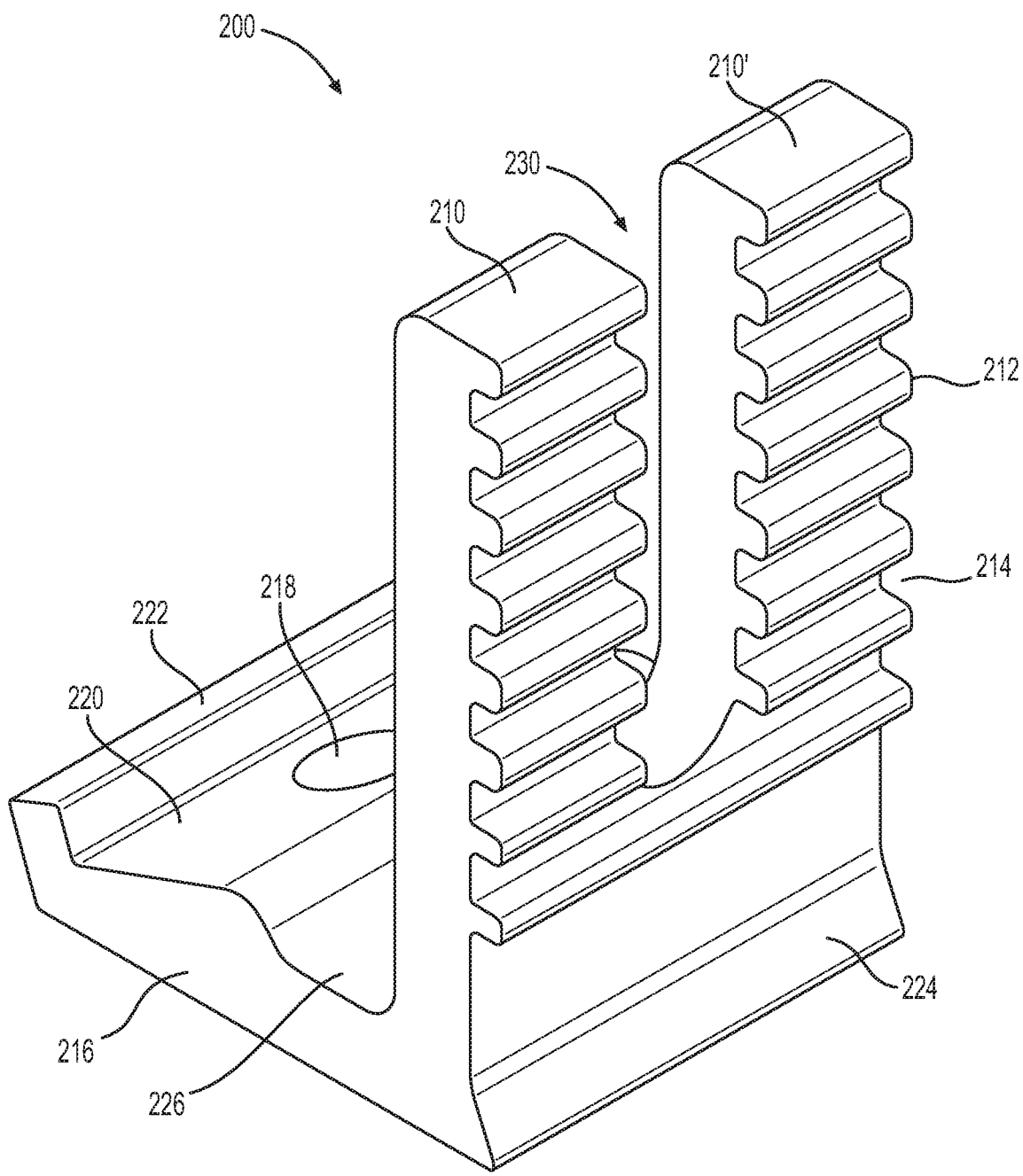
FIG. 24 shows a solid-shaded, isometric view of the rear of an L-foot bracket with an angled hole for the clamping bolt, according to an embodiment.

FIG. 24 shows a solid-shaded, isometric view of the rear of an L-foot bracket 200 with an angled hole 218 for the clamping bolt (not shown), according to an embodiment. Angled hole 218 may be angled at a tilt angle, θ, of approximately 70° to the horizontal. Alternatively, tilt angle, θ, may range from approximately 60° to approximately 80°. L-bracket 200 includes: a horizontal base 216, a pair of substantially parallel, integral vertical legs 210 and 210' that has a plurality of corrugations (teeth) 212 and 212', respectively, on the backside of vertical legs 210 and 210'; a vertical slot 230 disposed in-between vertical legs 210 and 210'; an angled aperture (hole) 218; a flat facing surface 220 that is substantially perpendicular to an longitudinal axis of aperture 218; and an upwardly protruding ledge 222 on a distal end of base 216. Base 216 further includes an outwardly-flared end 224 on the lower end of vertical leg 210.

A longitudinal groove 226 is disposed in-between the lower end of vertical leg 210 and aperture 218.

Figure 25A:
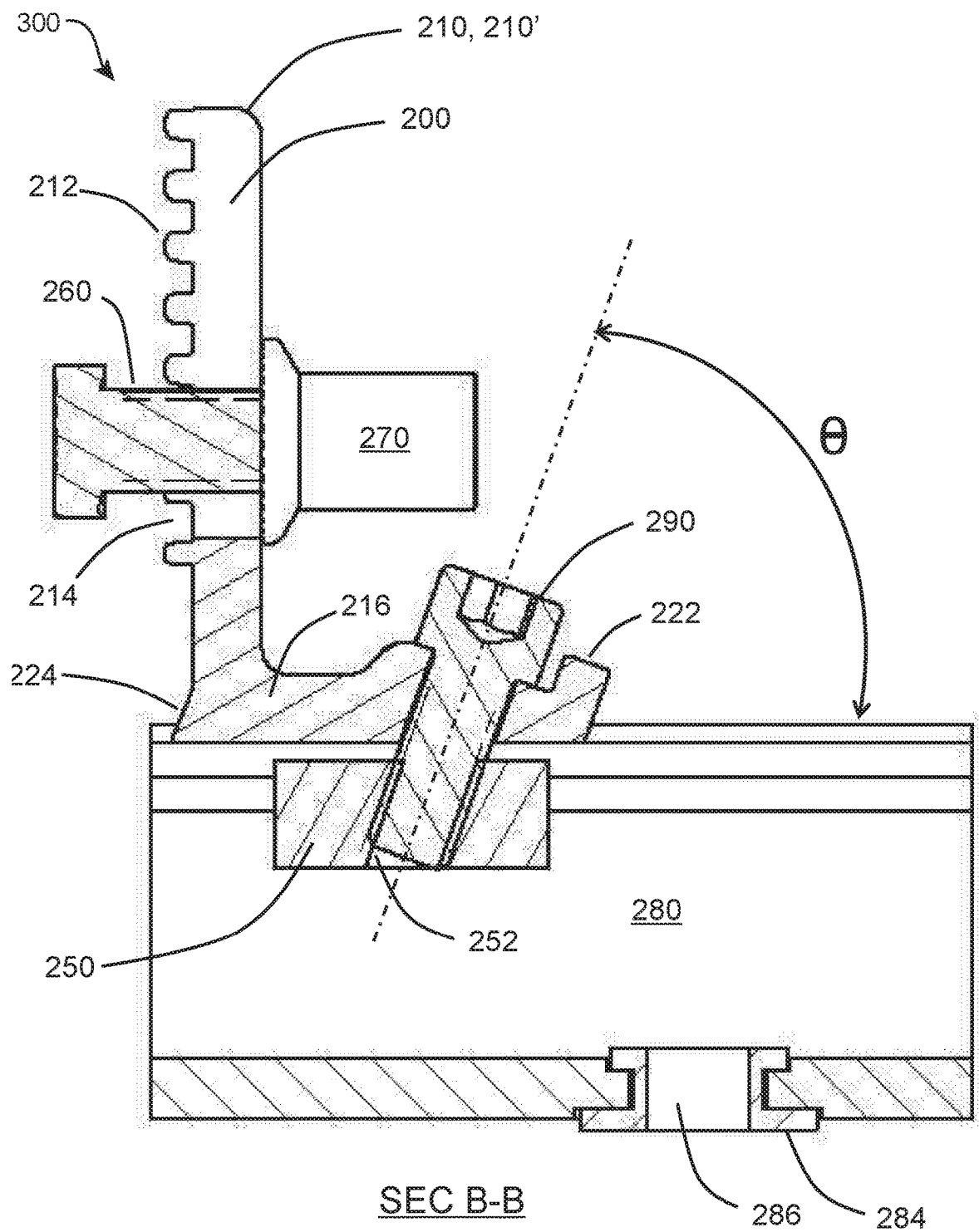
FIG. 25A shows a cross-section elevation side view of an L-foot bracket with an angled hole for the clamping bolt and an angled channel nut disposed underneath the L-foot bracket, according to an embodiment.

FIG. 25A shows a cross-section elevation side view (Section B-B) of an L-foot bracket 200 with an angled hole 218 for the clamping bolt 290 and an angled channel nut 250 clamped underneath the L-foot bracket 200, according to an embodiment. Angled hole 218 may be angled at a tilt angle, θ, of approximately 70° to the horizontal. Alternatively, tilt angle, θ, may range from approximately 60° to approximately 80°. L-bracket 200 includes: a horizontal base 216, a pair of substantially parallel, integral vertical legs 210 and 210' that has a plurality of corrugations (teeth) 212 and 212' on the backside of vertical legs 210 and 210', respectively; an angled aperture (hole) 218; and an upwardly protruding ledge 222 on a distal end of base 216. The nut tilt angle of the longitudinal axis of threaded aperture 252 in angled channel nut 250 matches the bracket tilt angle, θ, of the angled hole 218 in the base 216 of L-bracket 200. EDPM grommet 284 is disposed in the bottom of channel 280, surrounding aperture 286. The central axis of clamping bolt 290 may be tilted approximately 20°-30° off-axis to avoid interference of the clamping bolt 290 with the proximal end of horizontal uni-nut 270 during insertion of the clamping bolt 290 in the L-foot bracket's aperture. In an embodiment, the L-foot bracket 200 may be vertically adjustable. Angling of the clamping bolt 290 also makes it easier to operate the hex tool used to tighten the clamping bolt (access for the drill tool is improved).

Figure 25B:
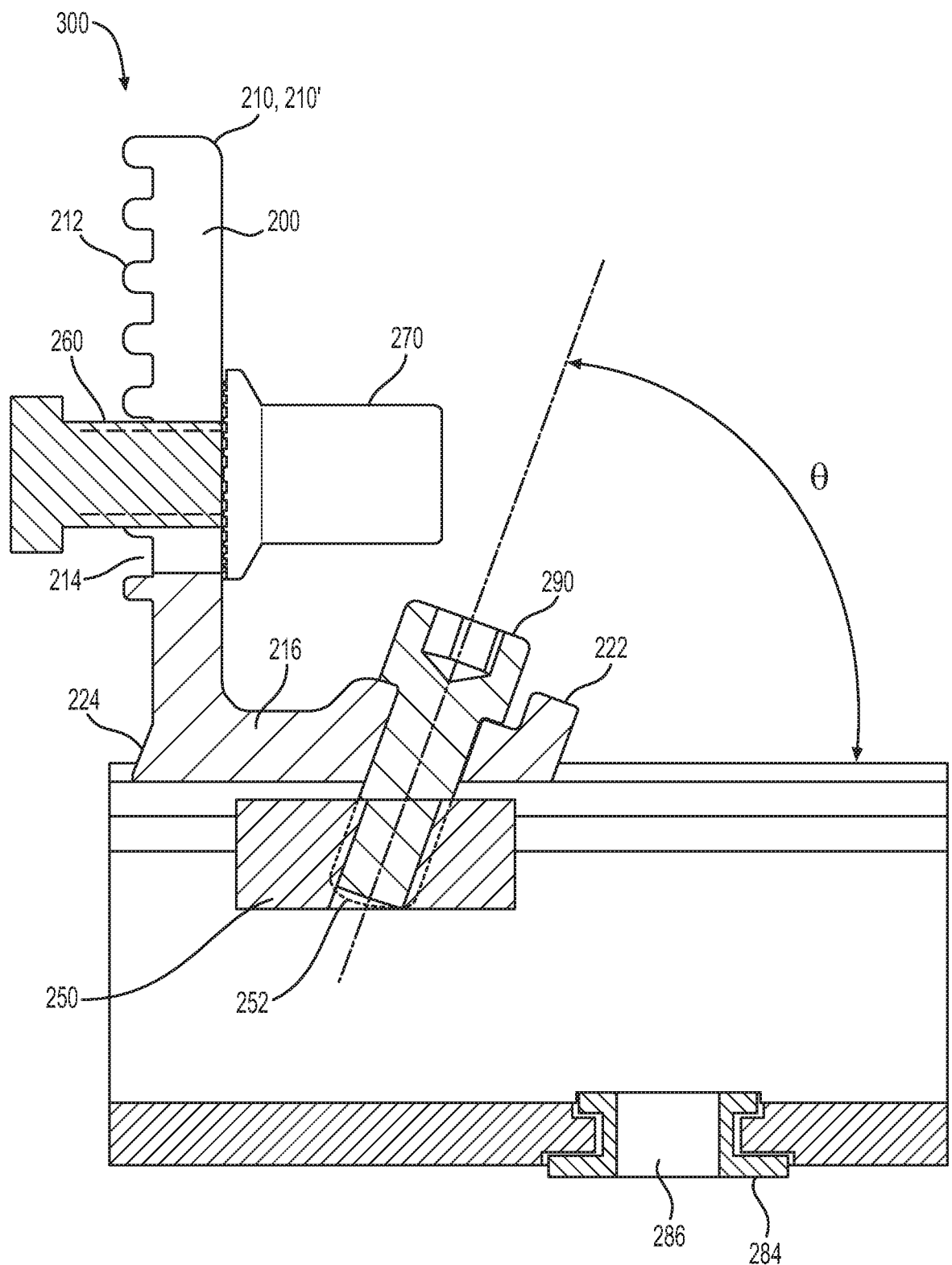
FIG. 25B shows a solid-shaded, cross-section elevation side view of an L-foot bracket with an angled hole for the clamping bolt and an angled channel nut disposed underneath the L-foot bracket, according to an embodiment.

FIG. 25B shows a solid-shaded, cross-section elevation side view (Section B-B) of an L-foot bracket 200 with an angled hole 218 for the clamping bolt 290 and an angled channel nut 250 clamped underneath the L-foot bracket 200, according to an embodiment. Angled hole 218 may be angled at a tilt angle, θ, of approximately 70° to the horizontal. Alternatively, tilt angle, θ, may range from approximately 60° to approximately 80°. L-bracket 200 includes: a horizontal base 216, a pair of substantially parallel, integral vertical legs 210 and 210' that has a plurality of corrugations (teeth) 212 and 212' on the backside of vertical legs 210 and 210', respectively; an angled aperture (hole) 218; and an upwardly protruding ledge 222 on a distal end of base 216. The tilt angle of the longitudinal axis of threaded aperture 252 in angled channel nut 250 matches the tilt angle, θ, of the angled hole 218 in the base 216 of L-bracket 200. EDPM grommet 284 is disposed in the bottom of channel 280, surrounding aperture 286.

Figure 26:
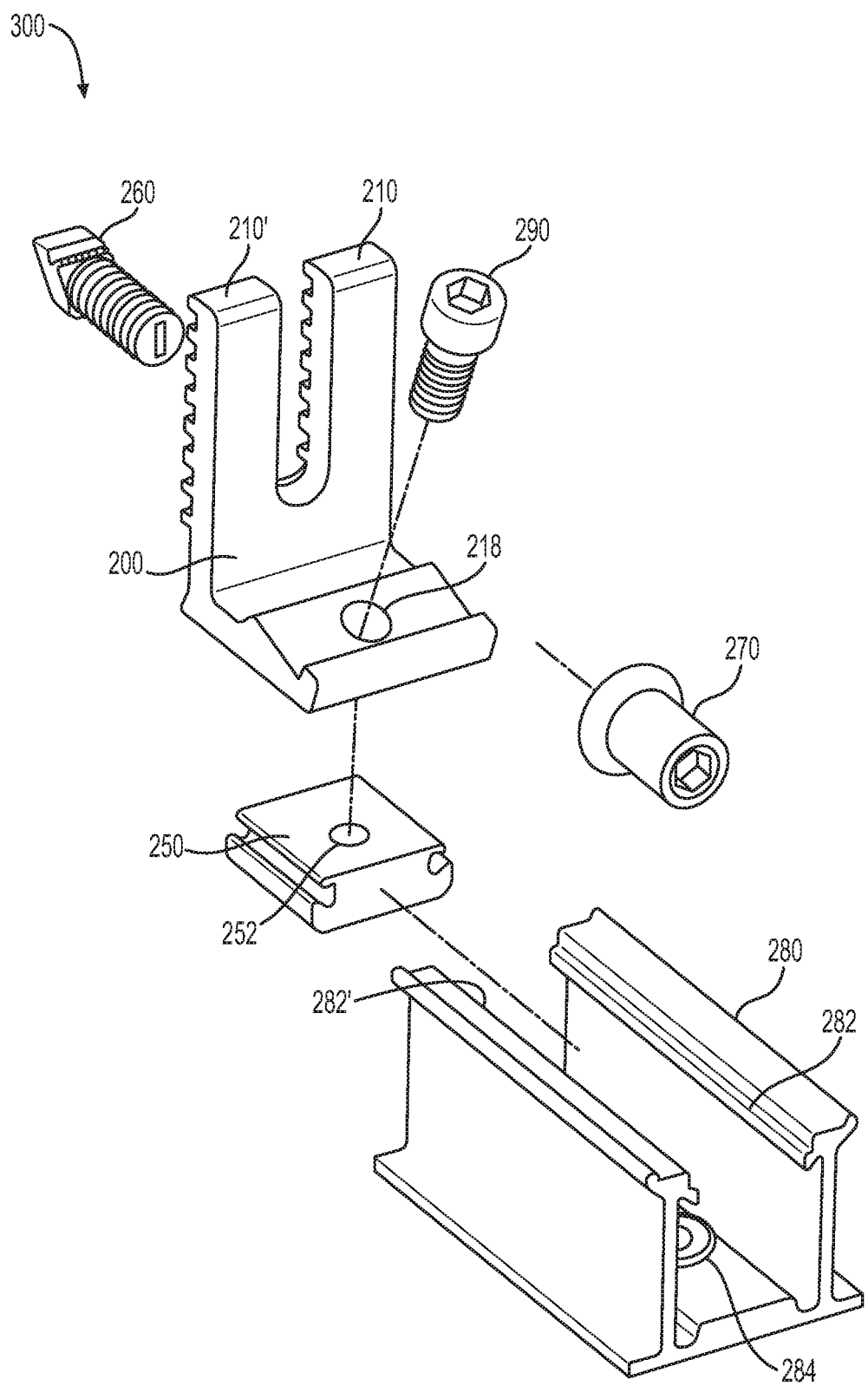
FIG. 26 shows an exploded, solid-shaded, isometric view of the front of an L-foot bracket, channel, and channel nut assembly, according to an embodiment.

FIG. 26 shows an exploded, solid-shaded, isometric view of the front of an assembly 300 including a L-foot bracket 200, channel 280, and angled channel nut 250, according to an embodiment. Clamping bolt 290 is received through aperture 218 in L-bracket 200, and bolt 290 engages threaded aperture 252 of angled channel nut 250. Angled channel nut 250 slidingly engages substantially parallel guide rails 282, 282' of channel 280. Uni-nut 270 engages the threads of T-bolt 260.

Figure 27:
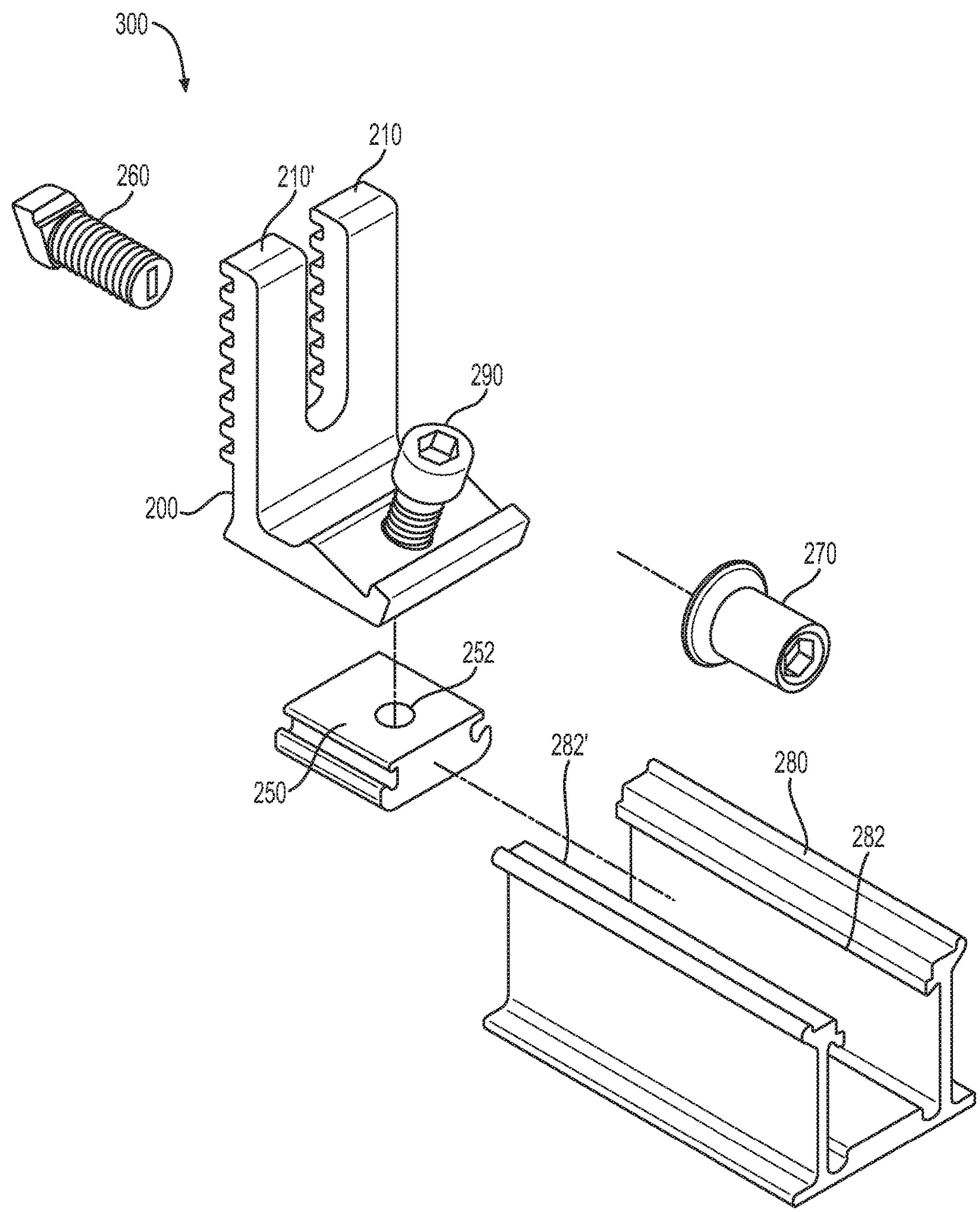
FIG. 27 shows an exploded, solid-shaded, isometric view of the front of an L-foot bracket, channel, and channel nut assembly, according to an embodiment.

FIG. 27 shows an exploded, solid-shaded, isometric view of the front of an assembly 300 including a L-foot bracket 200, channel 280, and angled channel nut 250, according to an embodiment. Clamping bolt 290 is received through aperture 218 in L-bracket 200, and bolt 290 engages threaded aperture 252 of angled channel nut 250. Angled channel nut 250 slidingly engages substantially parallel guide rails 282, 282' of channel 280. Uni-nut 270 engages the threads of T-bolt 260.

Figure 28:
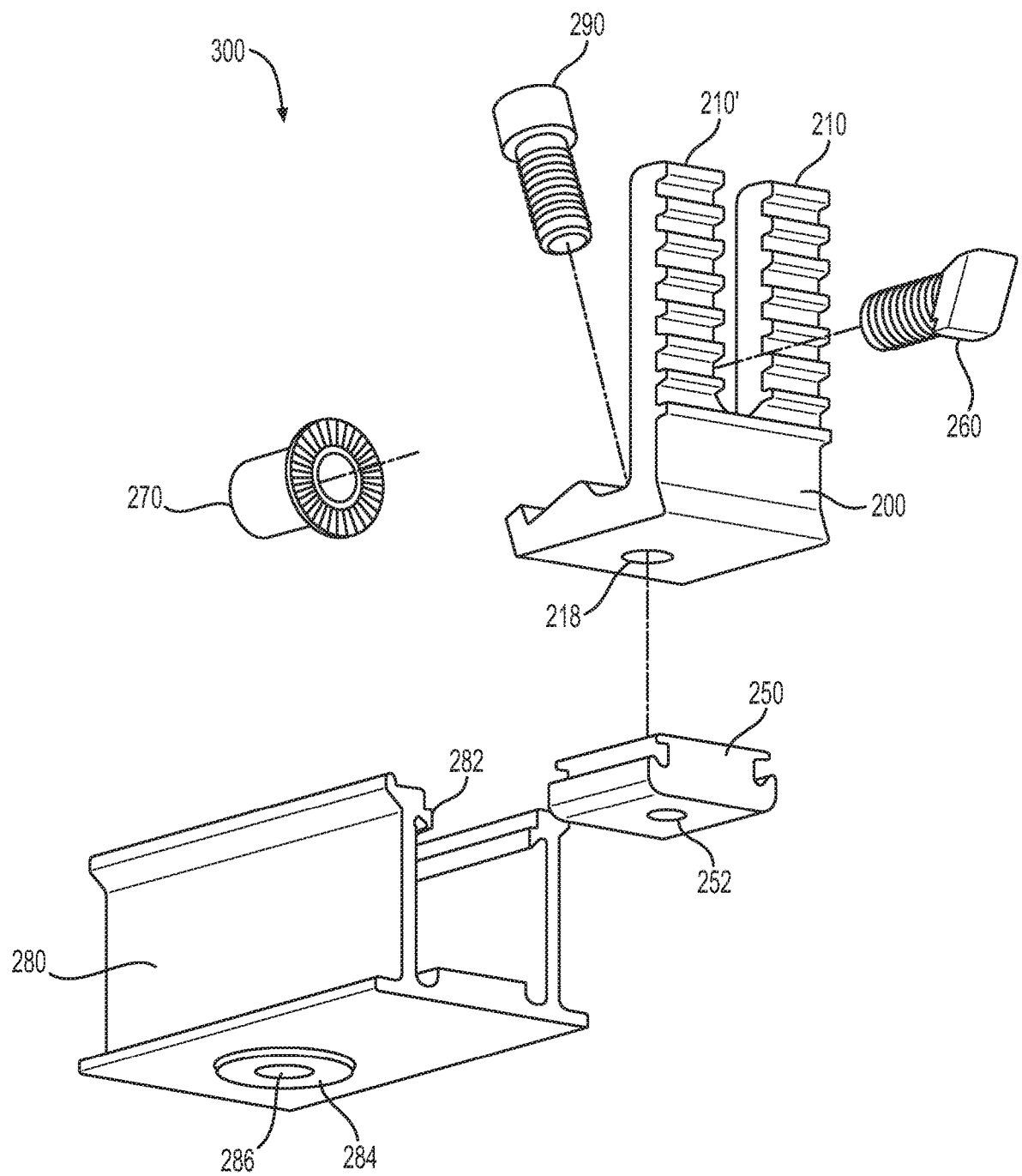
FIG. 28 shows an exploded, solid-shaded, isometric view of the rear of an L-foot bracket, channel, and channel nut assembly, according to an embodiment.

FIG. 28 shows an exploded, solid-shaded, isometric view of the rear of an assembly 300 including a L-foot bracket 200, channel 280, and angled channel nut 250, according to an embodiment. Clamping bolt 290 is received through aperture 218 in L-bracket 200, and bolt 290 engages threaded aperture 252 of angled channel nut 250. Angled channel nut 250 slidingly engages substantially parallel guide rails 282, 282' of channel 280. Uni-nut engages the threads of T-bolt 260.

Figure 29:
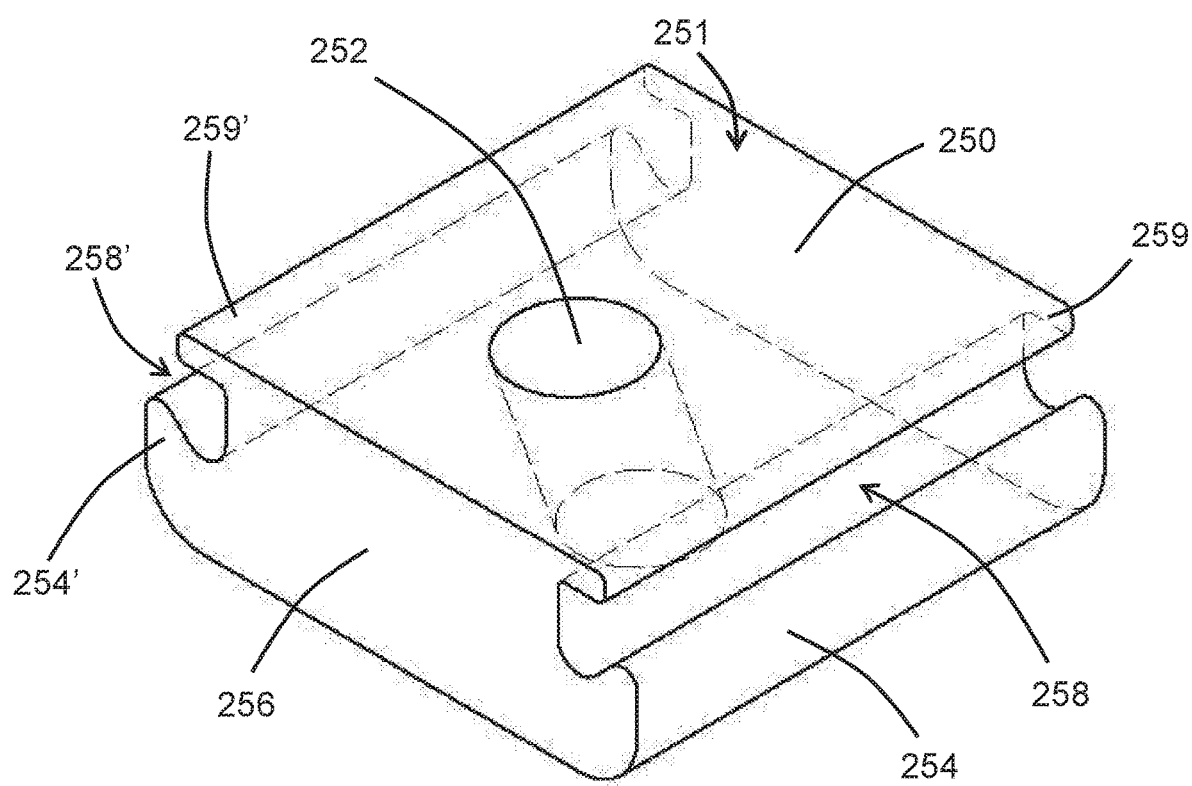
FIG. 29 shows an isometric view of an angled channel nut, according to an embodiment.

FIG. 29 shows an isometric view of an angled channel nut 250, according to an embodiment. Angled nut 250 has a body 256 and a threaded aperture 252 that is angled at the tilt angle, θ. Nut 250 further includes: a pair of reentrant grooves 258, 258' disposed on opposing sides of body 256; a pair of outer upturned flanges 254, 254' disposed on opposing sides of body 256; and a pair of partially overhanging wings 259, 259' disposed on opposing sides of body 256.

Figure 30:
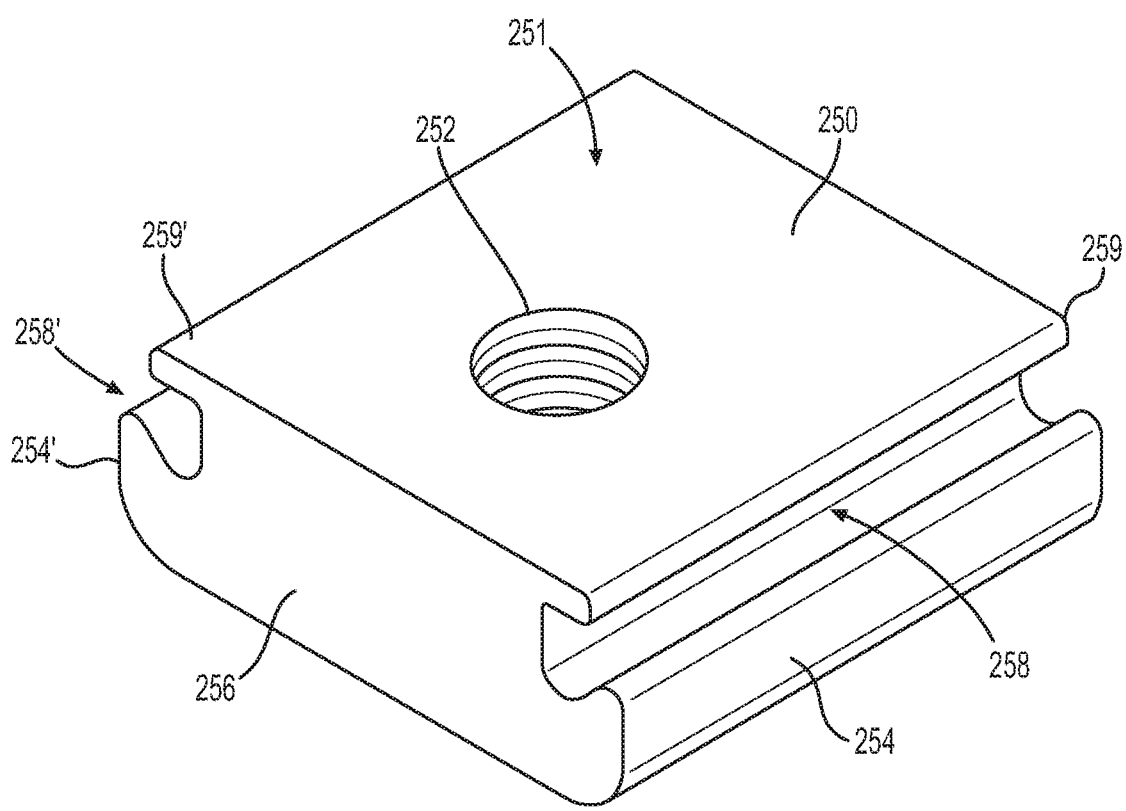
FIG. 30 shows a solid-shaded, isometric view of an angled channel nut, according to an embodiment.

FIG. 30 shows a solid-shaded, isometric view of an angled channel nut 250, according to an embodiment. Angled nut 250 has a body 256 and a threaded aperture 252 that is angled at the tilt angle, θ. Nut 250 further includes: a pair of reentrant grooves 258, 258' disposed on opposing sides of body 256; a pair of outer upturned flanges 254, 254' disposed on opposing sides of body 256; and a pair of partially overhanging wings 259, 259' disposed on opposing sides of body 256.

Figure 31:
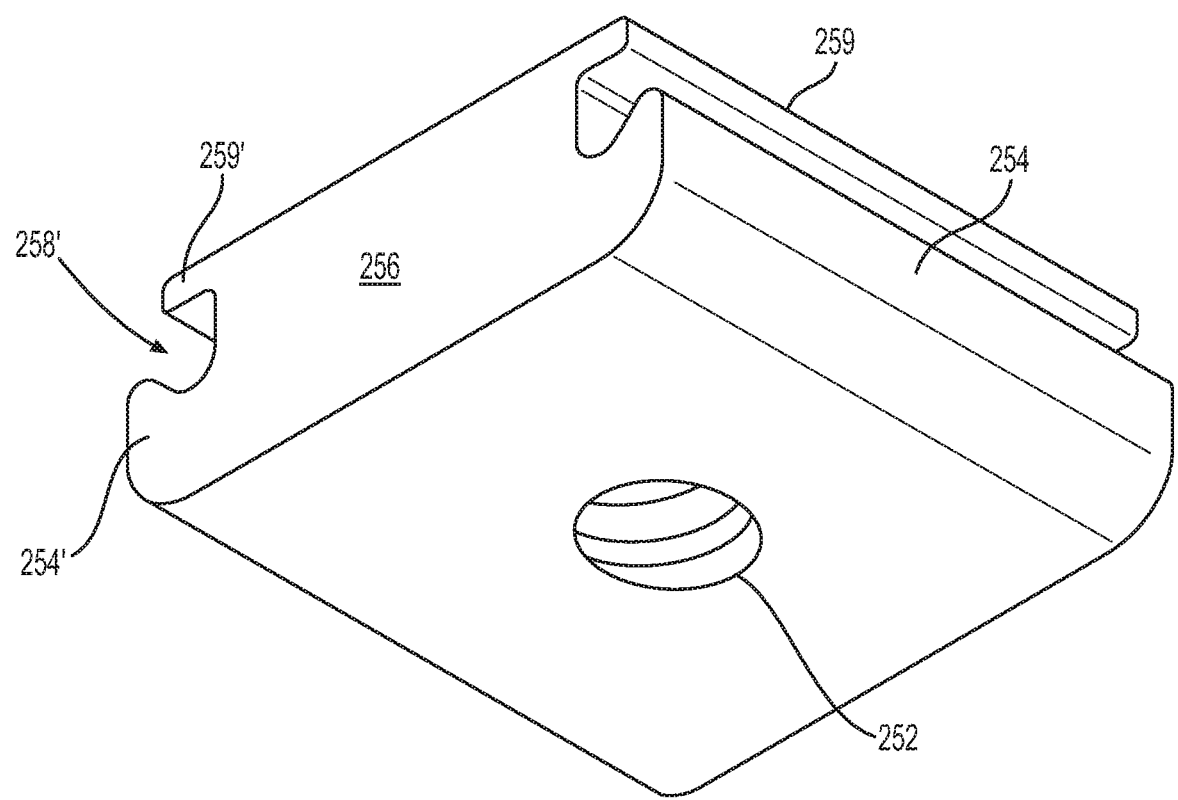
FIG. 31 shows a solid-shaded, isometric view of the underside of an angled channel nut, according to an embodiment.

FIG. 31 shows a solid-shaded, isometric view of the underside of an angled channel nut 250, according to an embodiment. Angled nut 250 has a body 256 and a threaded aperture 252 that is angled at the tilt angle, θ. Nut 250 further includes: a pair of reentrant grooves 258, 258' disposed on opposing sides of body 256; a pair of outer upturned flanges 254, 254' disposed on opposing sides of body 256; and a pair of partially overhanging wings 259, 259' disposed on opposing sides of body 256.

Figure 32:
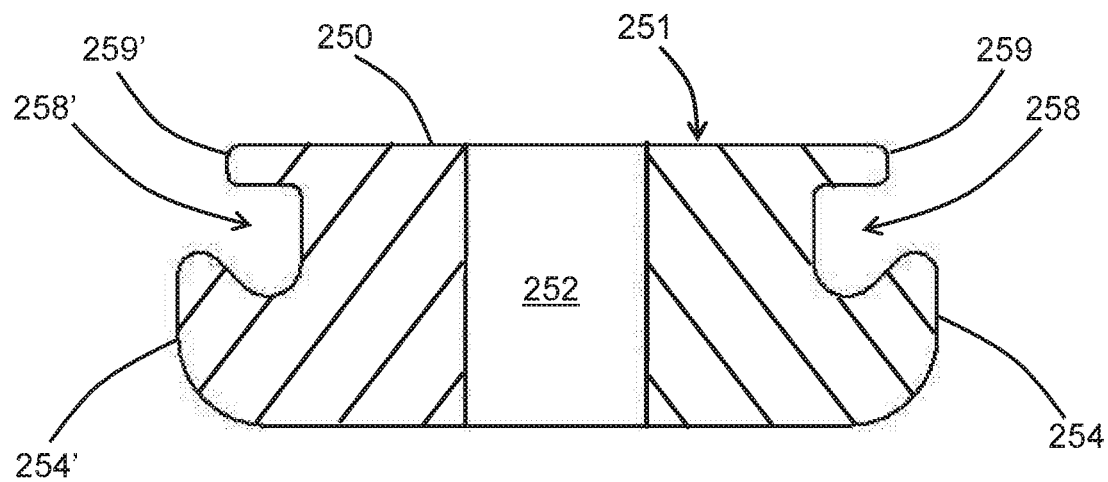
FIG. 32 shows a cross-sectional, elevation view of the side of an angled channel nut, according to an embodiment.

FIG. 32 shows a cross-sectional, elevation view of the side of an angled channel nut 250, according to an embodiment. Angled nut 250 has a body 256 and a threaded aperture 252 that is angled at the tilt angle, θ. Nut 250 further includes: a pair of reentrant grooves 258, 258' disposed on opposing sides of body 256; a pair of outer upturned flanges 254, 254' disposed on opposing sides of body 256; and a pair of partially overhanging wings 259, 259' disposed on opposing sides of body 256.

Figure 33:
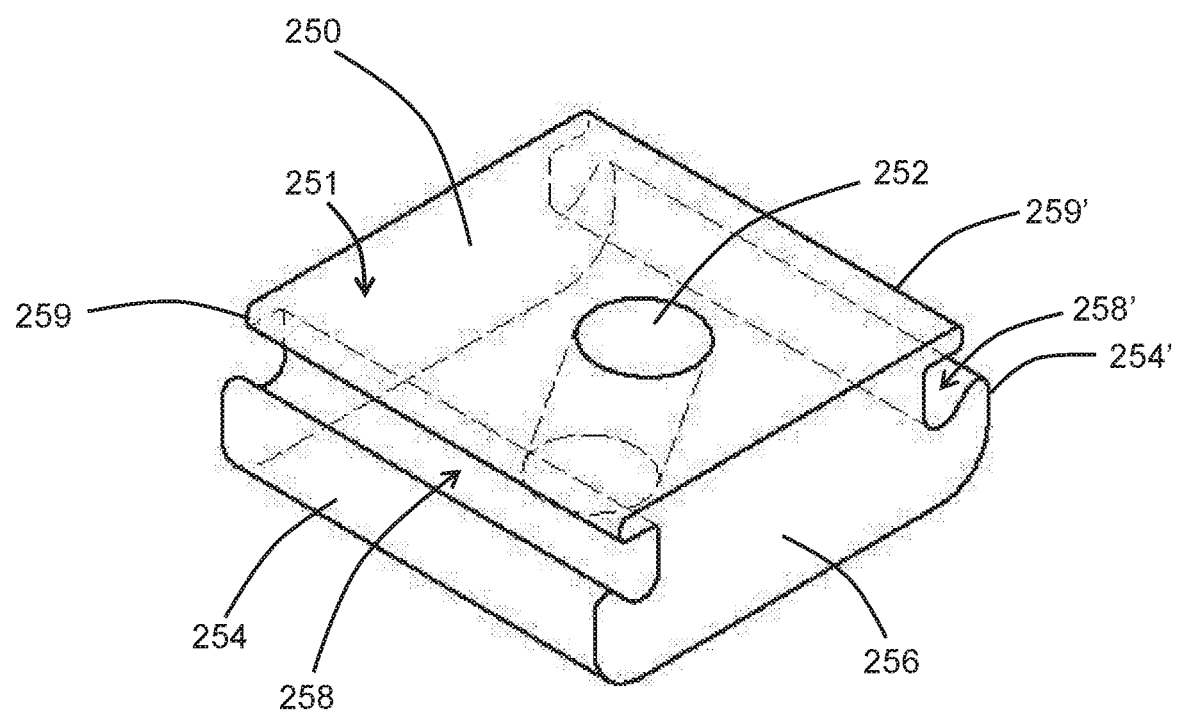
FIG. 33 shows an isometric view of an angled channel nut, according to an embodiment.

FIG. 33 shows an isometric view of an angled channel nut 250, according to an embodiment. Angled nut 250 has a body 256 and a threaded aperture 252 that is angled at the tilt angle, θ. Nut 250 further includes: a pair of reentrant grooves 258, 258' disposed on opposing sides of body 256; a pair of outer upturned flanges 254, 254' disposed on opposing sides of body 256; and a pair of partially overhanging wings 259, 259' disposed on opposing sides of body 256.

Figure 34:
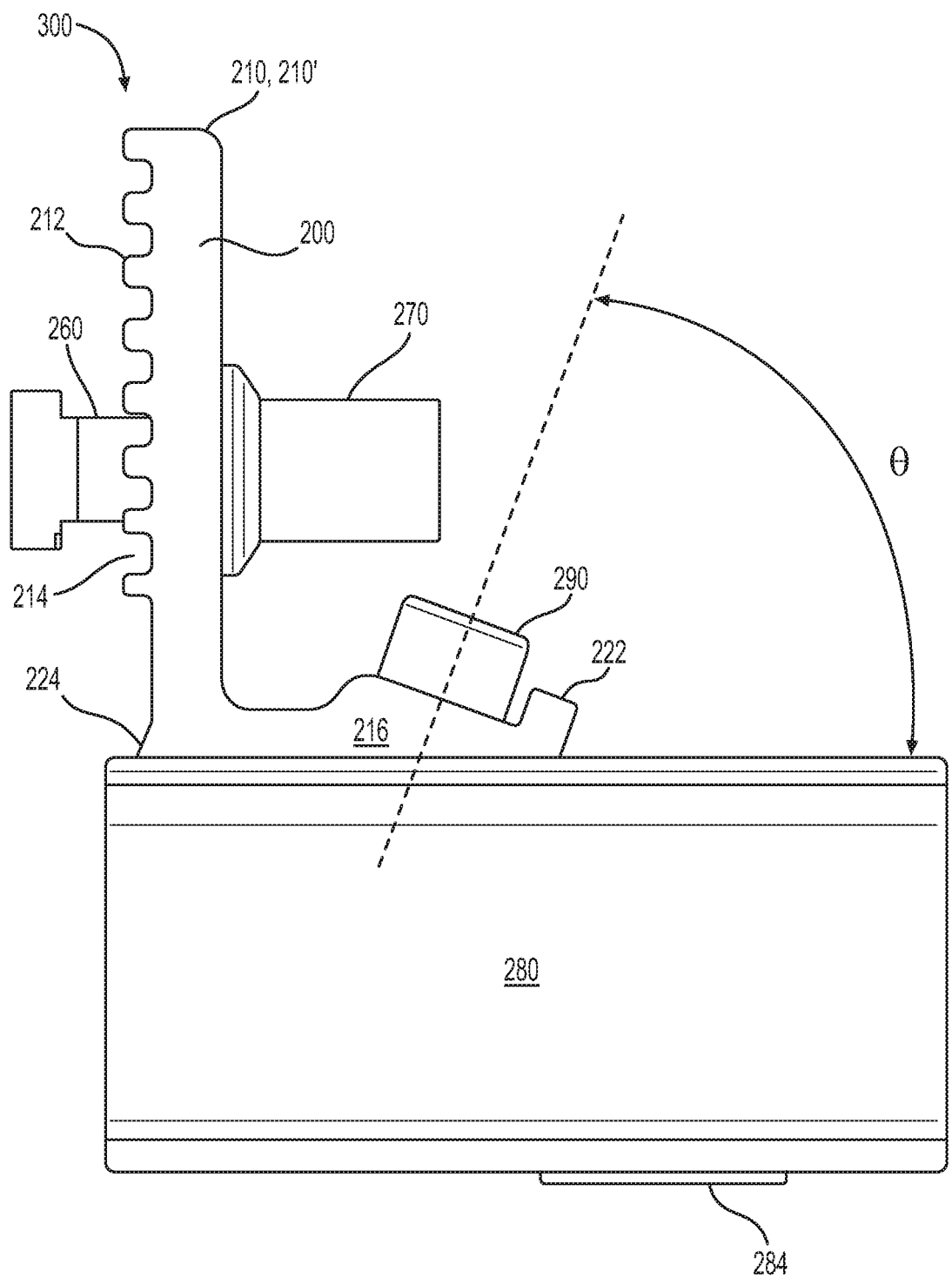
FIG. 34 shows an elevation side view of an angled bolt and a L-foot bracket clamped to a channel, according to an embodiment.

FIG. 34 shows an elevation side view of an angled clamping bolt 290 and a L-foot bracket 200 clamped to a channel 280, according to an embodiment. L-foot bracket 200 includes: a pair of vertical legs 210,210' that have a plurality of substantially parallel, horizontal corrugations (teeth) 212 and a corresponding plurality of substantially parallel, horizontal grooves 214 on the backside of legs 210, 210'; and an integral lower horizontal base 216, with an angled aperture (not shown) for receiving an angled clamping bolt 290. T-bolt 260 and uni-nut 270 engage each other through the open slot 230 (not shown) disposed in-between vertical legs 210 and 210'. L-bracket 200 is clamped rigidly to channel (slider) 280 when clamping bolt 290 is tightened. When clamping bolt 290 is loose, the assembly of L-bracket 200 and T-bolt 260 and uni-nut 270 (with any attached hardware, not shown) may slide freely along the longitudinal length of channel 280.

Figure 35:
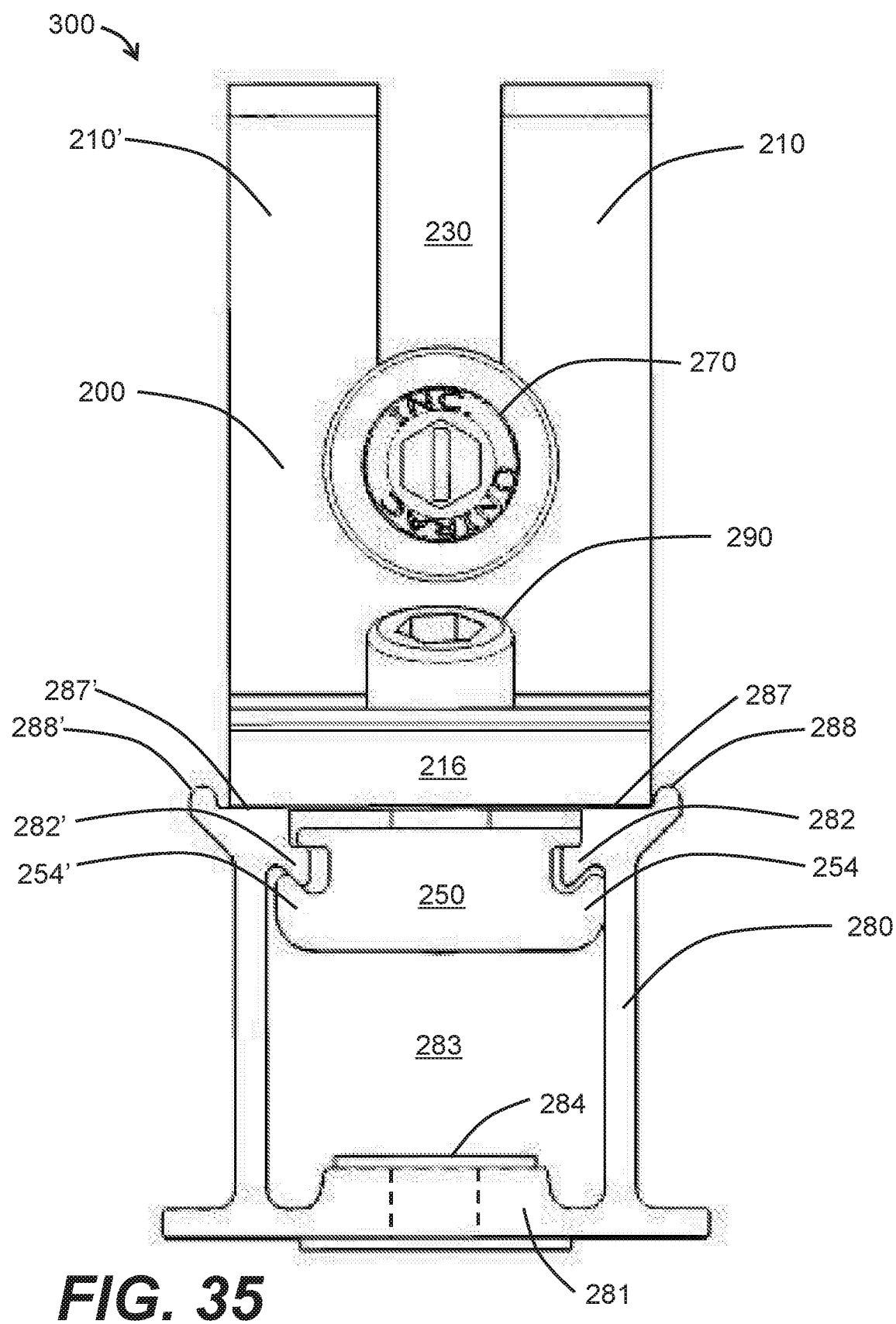
FIG. 35 shows an elevation front end view of an angled clamping bolt and a L-foot bracket clamped to a channel, according to an embodiment.

FIG. 35 shows an elevation front end view of an angled clamping bolt 290 and a L-foot bracket 200 clamped to a channel 280, according to an embodiment. U-shaped channel 280 includes a pair of longitudinal upwardly-facing upper guide rails (upper flange) 288, 288'; longitudinal upper horizontal tracks 287, 287'; and a pair of longitudinal downwardly-facing lower flanges 282, 282' that engage and interlock with longitudinal upwardly-facing outer flanges 254, 254' of angled channel nut 250, respectively. The bottom surface of the horizontal base 216 of L-foot bracket 200 contacts and rests upon the left/right pair of longitudinal upper horizontal tracks 287, 287'. L-foot bracket 200 is constrained from twisting by the pair of left/right upwardly-facing upper guide rails 288, 288', respectively. Hollow volume 283 is disposed inside of channel 280. EDPM grommet 284 is disposed inside of raised longitudinal boss 281.

Figure 36:
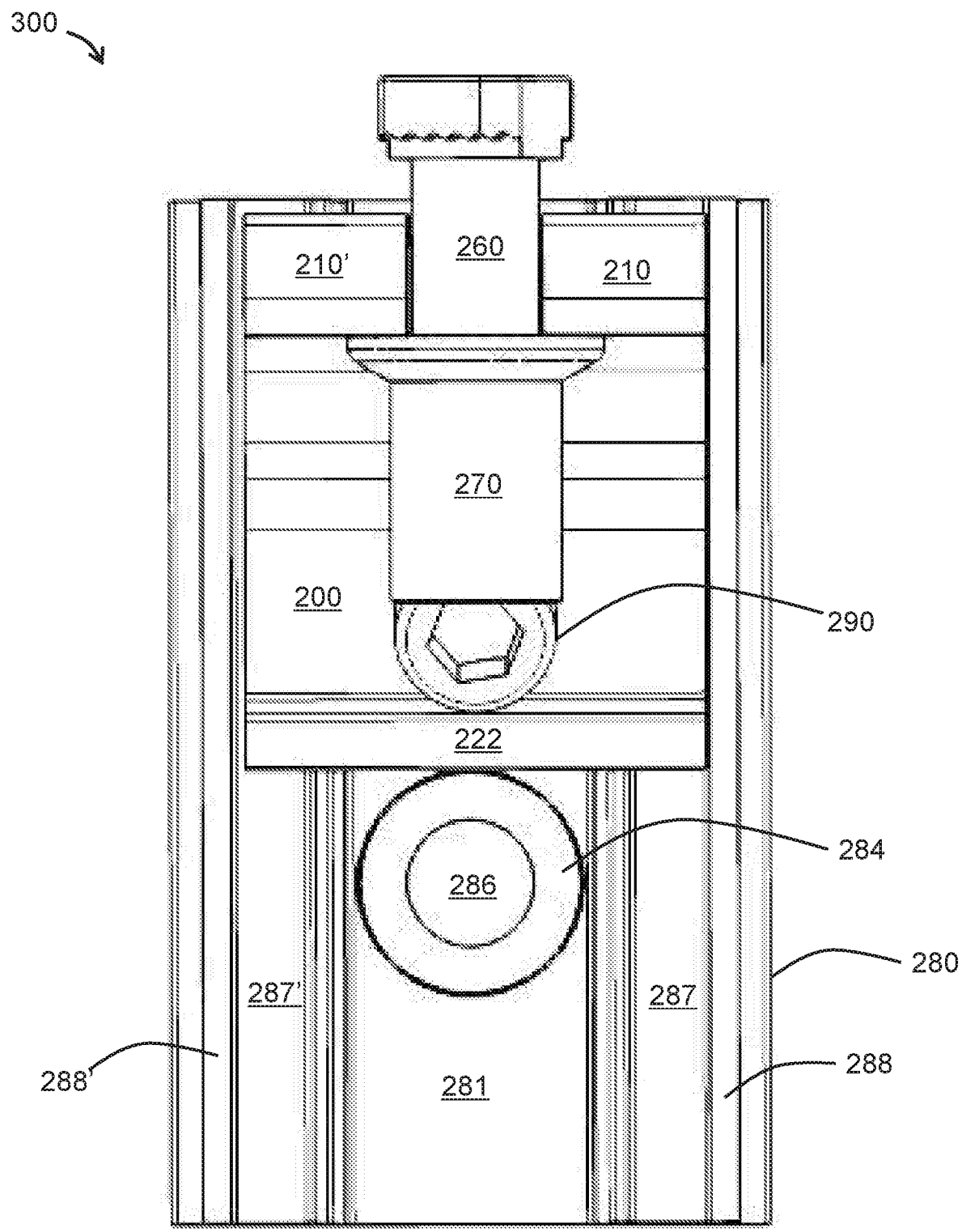
FIG. 36 shows top plan view of an angled clamping bolt, and a L-foot bracket clamped to a channel, according to an embodiment.

FIG. 36 shows top plan view of an angled clamping bolt 290 and a L-foot bracket 200 clamped to a channel 280, according to an embodiment. Uni-nut 270 engages threads of T-bolt 260. Channel 280 includes a pair of longitudinal upwardly-facing upper guide rails (upper flange) 288, 288'; longitudinal upper horizontal tracks 287, 287'. The bottom surface of the horizontal base 216 of L-foot bracket 200 contacts and rests upon the left/right pair of longitudinal upper horizontal tracks 287, 287', constrained from twisting by the pair of left/right upwardly-facing upper guide rails 288, 288', respectively. EDPM grommet 284 is disposed inside of raised longitudinal boss 281, and surrounds and waterproofs aperture 286 in boss 281 of channel 280.

Figure 37:
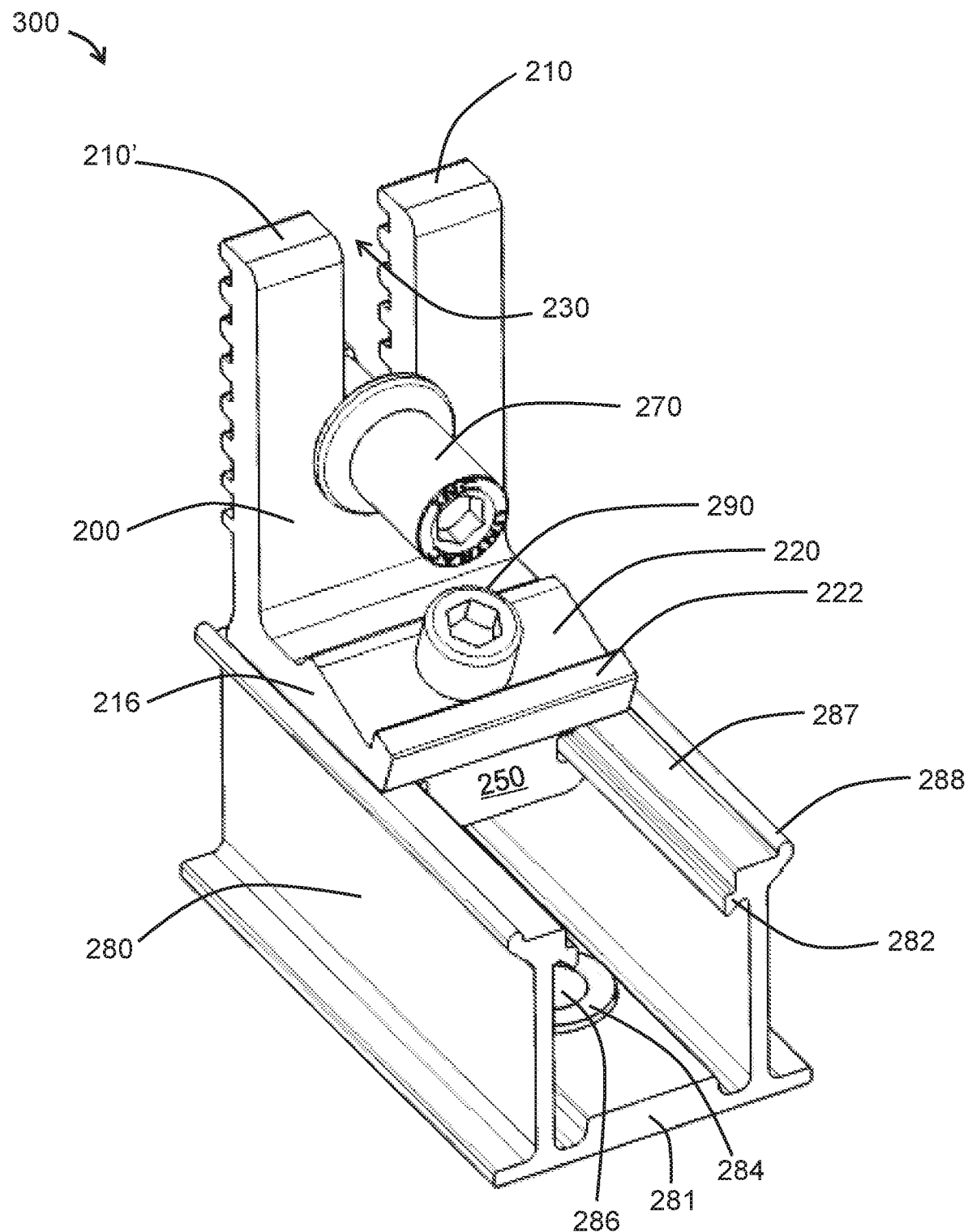
FIG. 37 shows an isometric view of an angled clamping bolt, angled channel nut, and a L-foot bracket clamped to a channel, according to an embodiment.

FIG. 37 shows an isometric view of an angled clamping bolt 290 and a L-foot bracket 200 clamped to a channel 280, according to an embodiment. Uni-nut 270 engages threads of T-bolt 260. U-shaped channel 280 includes a pair of longitudinal upwardly-facing upper guide rails (upper flange) 288, 288'; longitudinal upper horizontal tracks 287, 287'; and a pair of longitudinal downwardly-facing lower flanges 282, 282' that engage and interlock with longitudinal upwardly-facing outer flanges 254, 254' of angled channel nut 250, respectively. The bottom surface of the horizontal base 216 of L-foot bracket 200 contacts and rests upon the left/right pair of longitudinal upper horizontal tracks 287, 287'. L-foot bracket 200 is constrained from twisting by the pair of left/right upwardly-facing upper guide rails 288, 288', respectively. Hollow volume 283 is disposed inside of channel 280. EDPM grommet 284 is disposed inside of raised longitudinal boss 281, and surrounds and waterproofs aperture 286 in boss 281 of channel 280.

Figure 38:
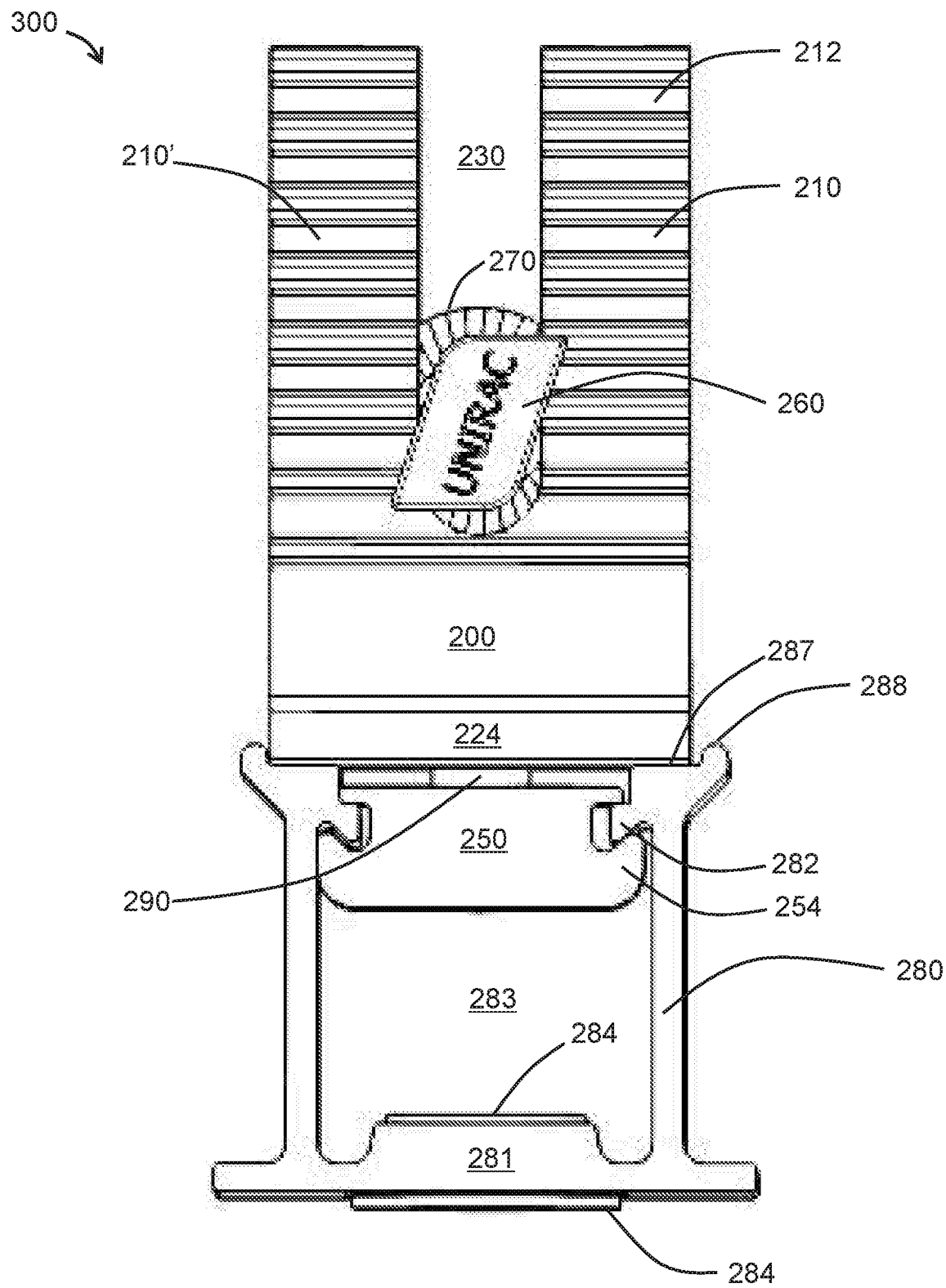
FIG. 38 shows an elevation rear end view of an angled clamping bolt, angled channel nut, and a L-foot bracket clamped to a channel, according to an embodiment.

FIG. 38 shows an elevation rear end view of an angled clamping bolt 290 and a L-foot bracket 200 clamped to a channel 280, according to an embodiment. Uni-nut 270 engages threads of T-bolt 260. U-shaped channel 280 includes a pair of longitudinal upwardly-facing upper guide rails (upper flange) 288, 288'; longitudinal upper horizontal tracks 287, 287'; and a pair of longitudinal downwardly-facing lower flanges 282, 282' that engage and interlock with longitudinal upwardly-facing outer flanges 254, 254' of angled channel nut 250, respectively. The bottom surface of the horizontal base 216 of L-foot bracket 200 contacts and rests upon the left/right pair of longitudinal upper horizontal tracks 287, 287'. L-foot bracket 200 is constrained from twisting by the pair of left/right upwardly-facing upper guide rails 288, 288', respectively. Hollow volume 283 is disposed inside of channel 280. EDPM grommet 284 is disposed inside of raised longitudinal boss 281, and surrounds and waterproofs aperture 286 in boss 281 of channel 280.

Figure 39:
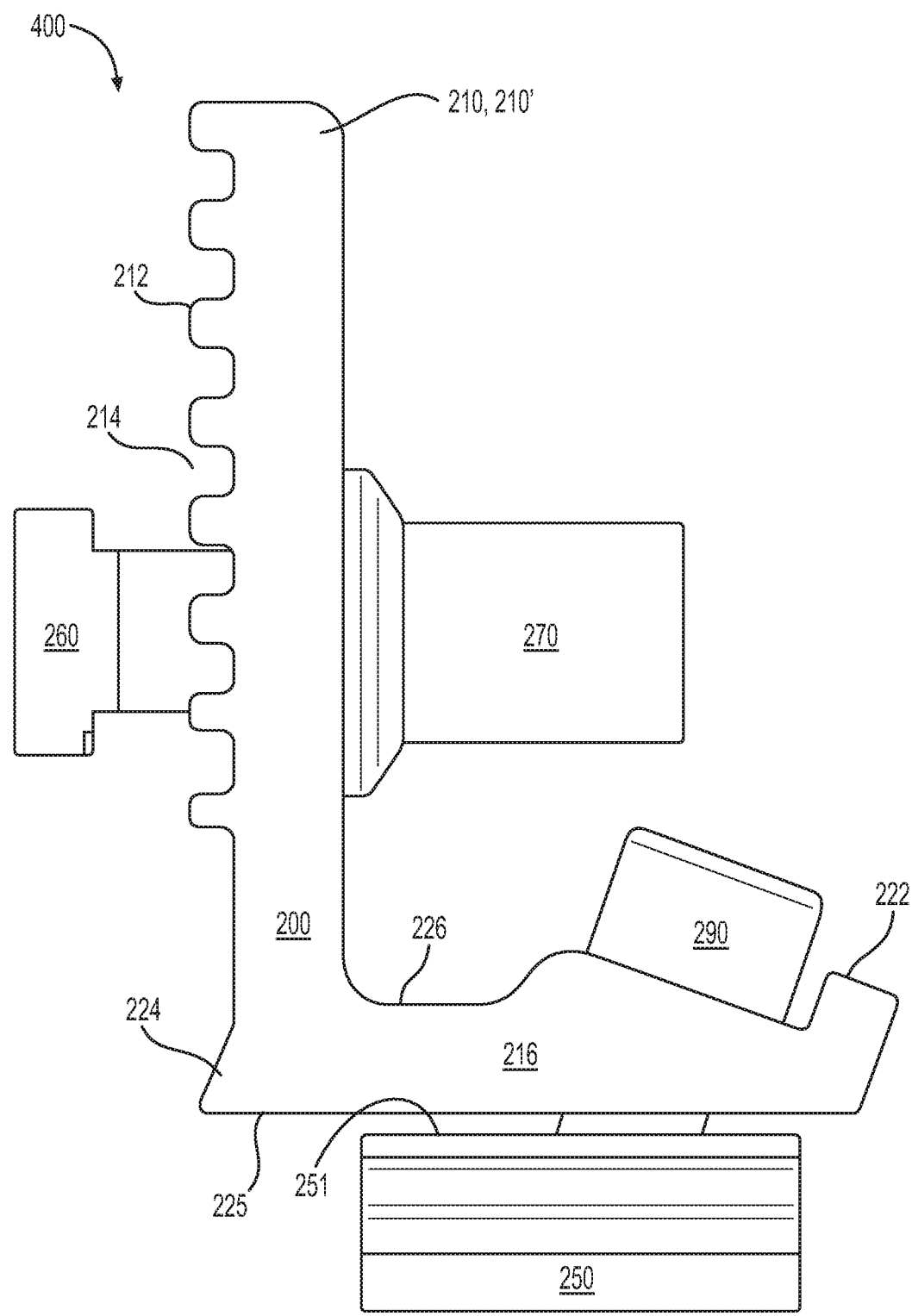
FIG. 39 shows an elevation side view of an angled clamping bolt, angled channel nut, and a L-foot bracket, according to an embodiment.

FIG. 39 shows an elevation side view of an angled clamping bolt 290, angled channel nut 250, and a L-foot bracket 200, according to an embodiment. L-foot bracket 200 includes: a pair of vertical legs 210, 210' that have a plurality of substantially parallel, horizontal corrugations (teeth) 212 and a corresponding plurality of substantially parallel, horizontal grooves 214 on the backside of legs 210, 210'; and an integral lower horizontal base 216, with an angled aperture (not shown) for receiving an angled clamping bolt 290. L-bracket further includes a horizontal mid-portion 226; and a square, angled ledge 222 that protrudes generally upwardly from horizontal base portion 216 of L-foot bracket 200. T-bolt 260 and uni-nut 270 engage each other through the open slot 230 (not shown) disposed in-between vertical legs 210 and 210'. The tilt angle of angled channel nut 250 matches the tilt angle of the angled clamping bolt 290, which means that the upper surface 251 of channel nut 250 is substantially parallel to the bottom surface 225 of horizontal base portion 216 of L-foot bracket 200.

Figure 40:
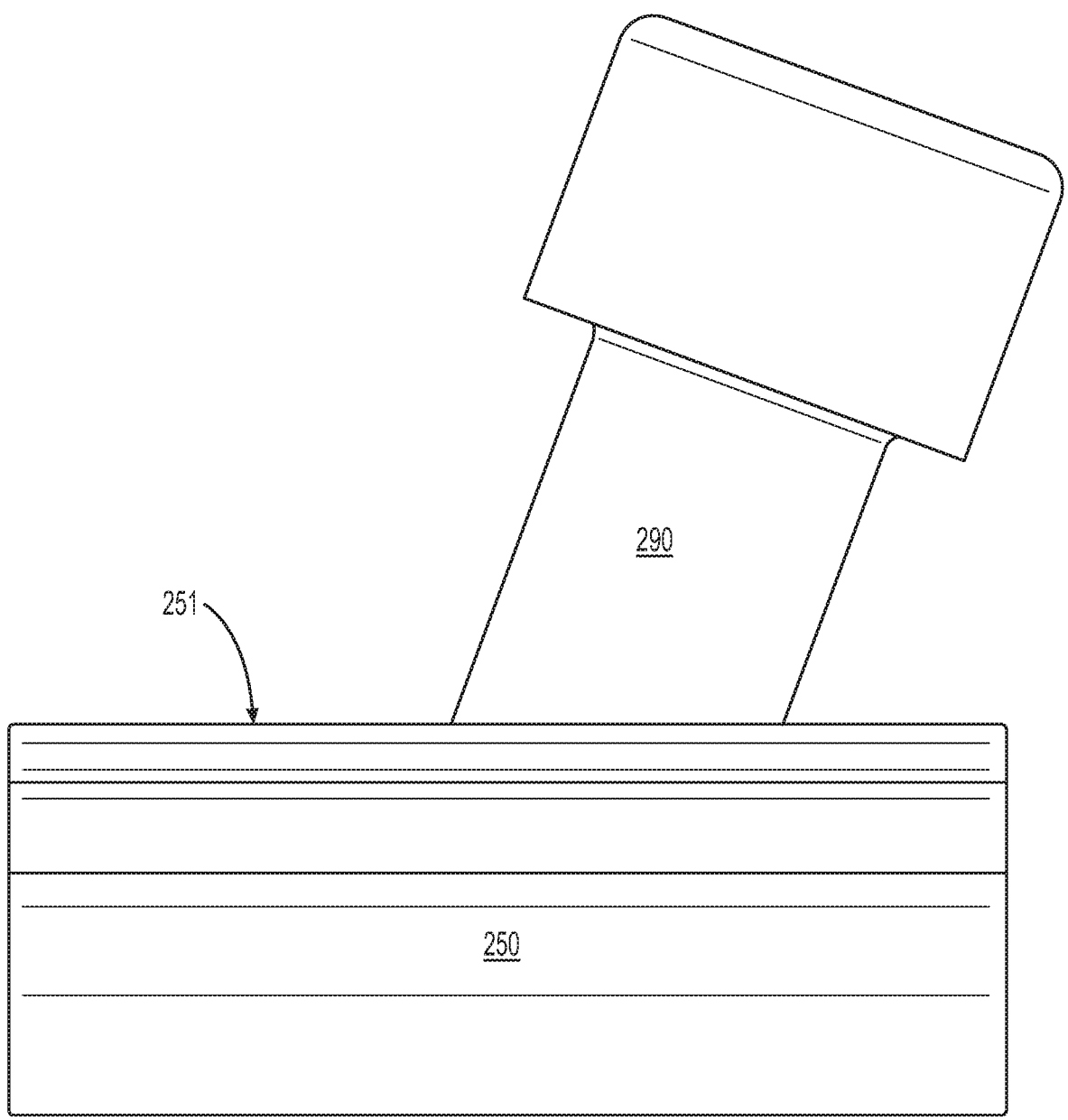
FIG. 40 shows an elevation side view of an angled clamping bolt and angled channel nut, according to an embodiment.

FIG. 40 shows an elevation side view of an angled bolt 290 and angled channel nut 250, according to an embodiment. The upper surface 251 of angled channel nut 250 is indicated.

Figure 41:
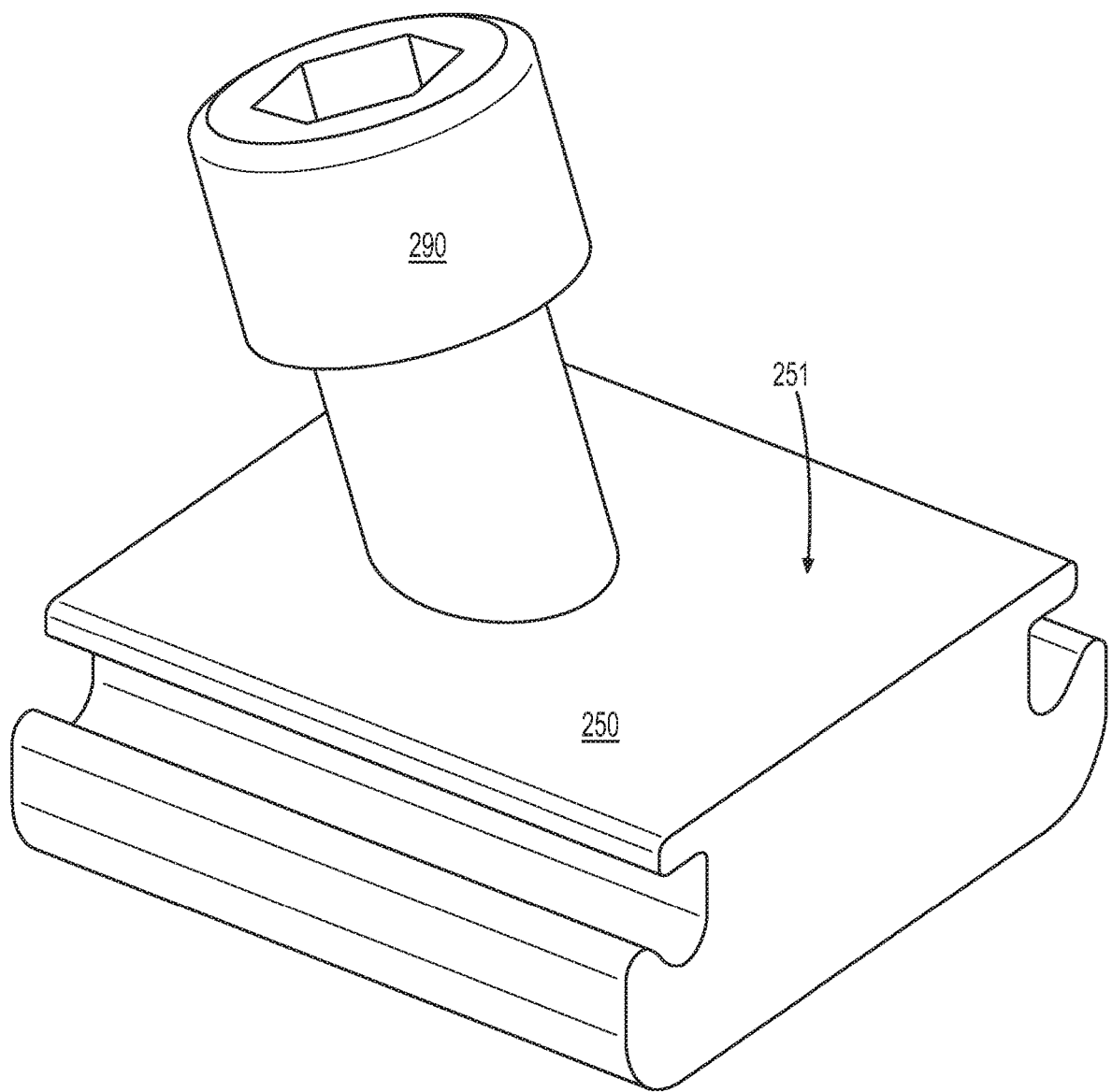
FIG. 41 shows an isometric view of an angled clamping bolt and angled channel nut, according to an embodiment.

FIG. 41 shows an isometric view of an angled bolt 290 and angled channel nut 250, according to an embodiment. The upper surface 251 of angled channel nut 250 is indicated.

Figure 42:
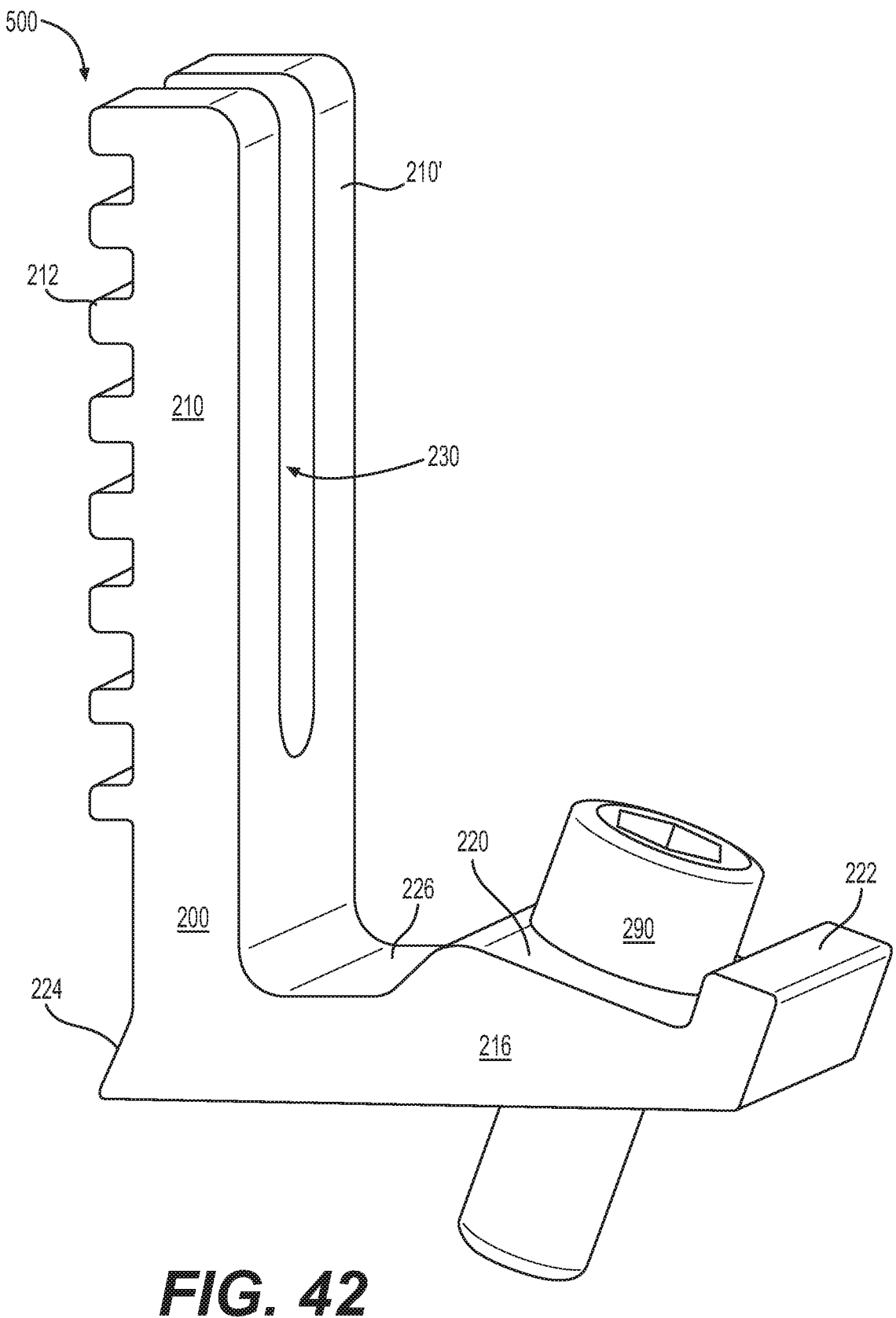
FIG. 42 shows an isometric view of an angled clamping bolt and an L-bracket, according to an embodiment.

FIG. 42 shows an isometric view of an angled clamping bolt 290 and an L-foot bracket 200, according to an embodiment. L-foot bracket 200 includes: a pair of vertical legs 210, 210' that have a plurality of substantially parallel, horizontal corrugations (teeth) 212 and a corresponding plurality of substantially parallel, horizontal grooves 214 on the backside of legs 210, 210'; and an integral lower horizontal base 216, with an angled aperture (not shown) for receiving an angled clamping bolt 290. L-bracket further includes a horizontal mid-portion 226; and a square, angled ledge 222 that protrudes generally upwardly from horizontal base portion 216 of L-foot bracket 200. The bottom of the hexagonal cap-head of clamping bolt 290 rests flat against angled upper surface 220 of base portion 216 of L-foot bracket 200.

Figure 43:
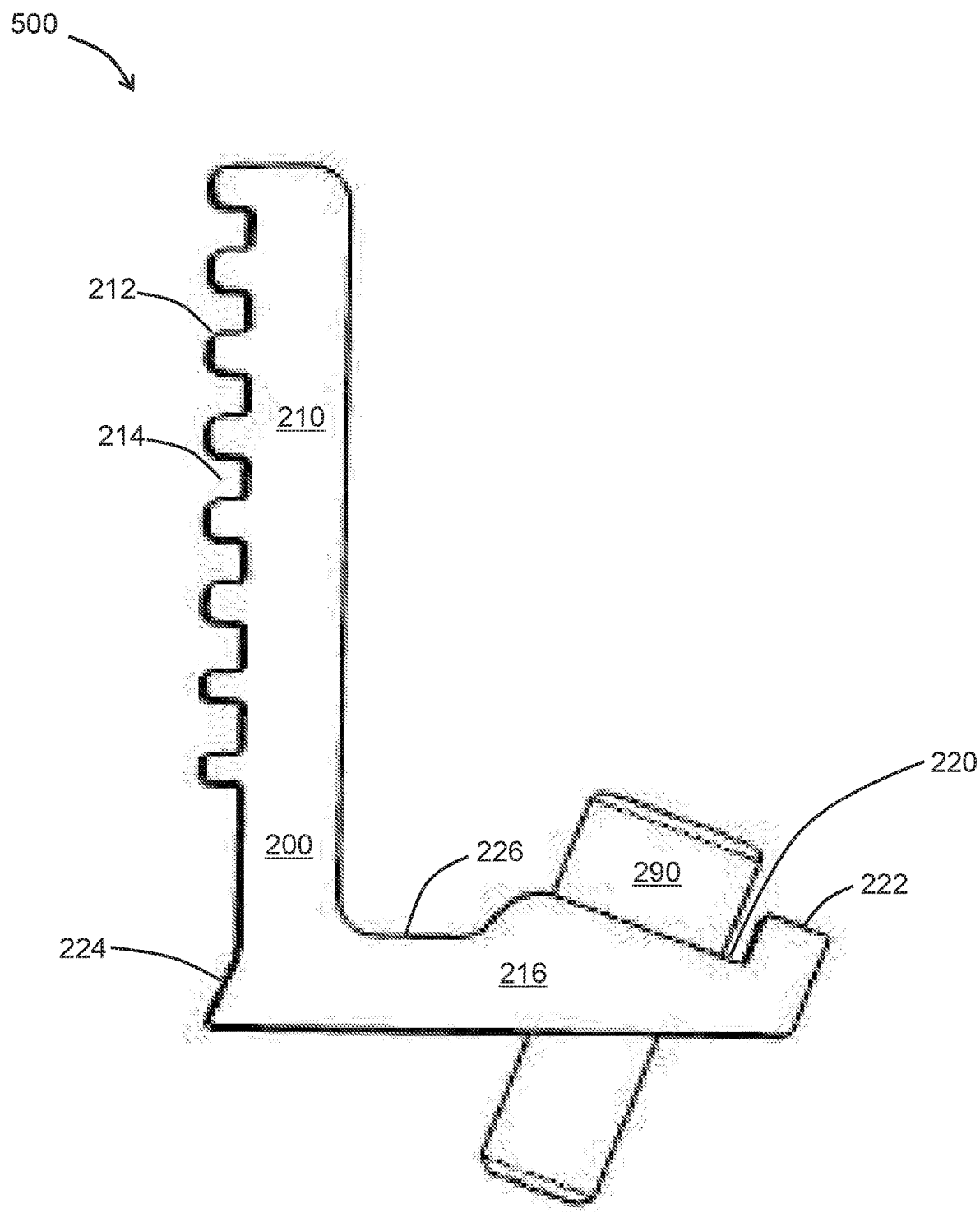
FIG. 43 shows an elevation side view of an angled clamping bolt and an L-foot bracket, according to an embodiment.

FIG. 43 shows an elevation side view of an angled clamping bolt 290 and an L-foot bracket 200, according to an embodiment. L-foot bracket 200 includes: a pair of vertical legs 210, 210' that have a plurality of substantially parallel, horizontal corrugations (teeth) 212 and a corresponding plurality of substantially parallel, horizontal grooves 214 on the backside of legs 210, 210'; and an integral lower horizontal base 216, with an angled aperture (not shown) for receiving an angled clamping bolt 290. L-bracket further includes a horizontal mid-portion 226; and a square, angled ledge 222 that protrudes generally upwardly from horizontal base portion 216 of L-foot bracket 200. The bottom of the hexagonal cap-head of clamping bolt 290 rests flat against angled upper surface 220 of base portion 216 of L-foot bracket 200.

Figure 44:
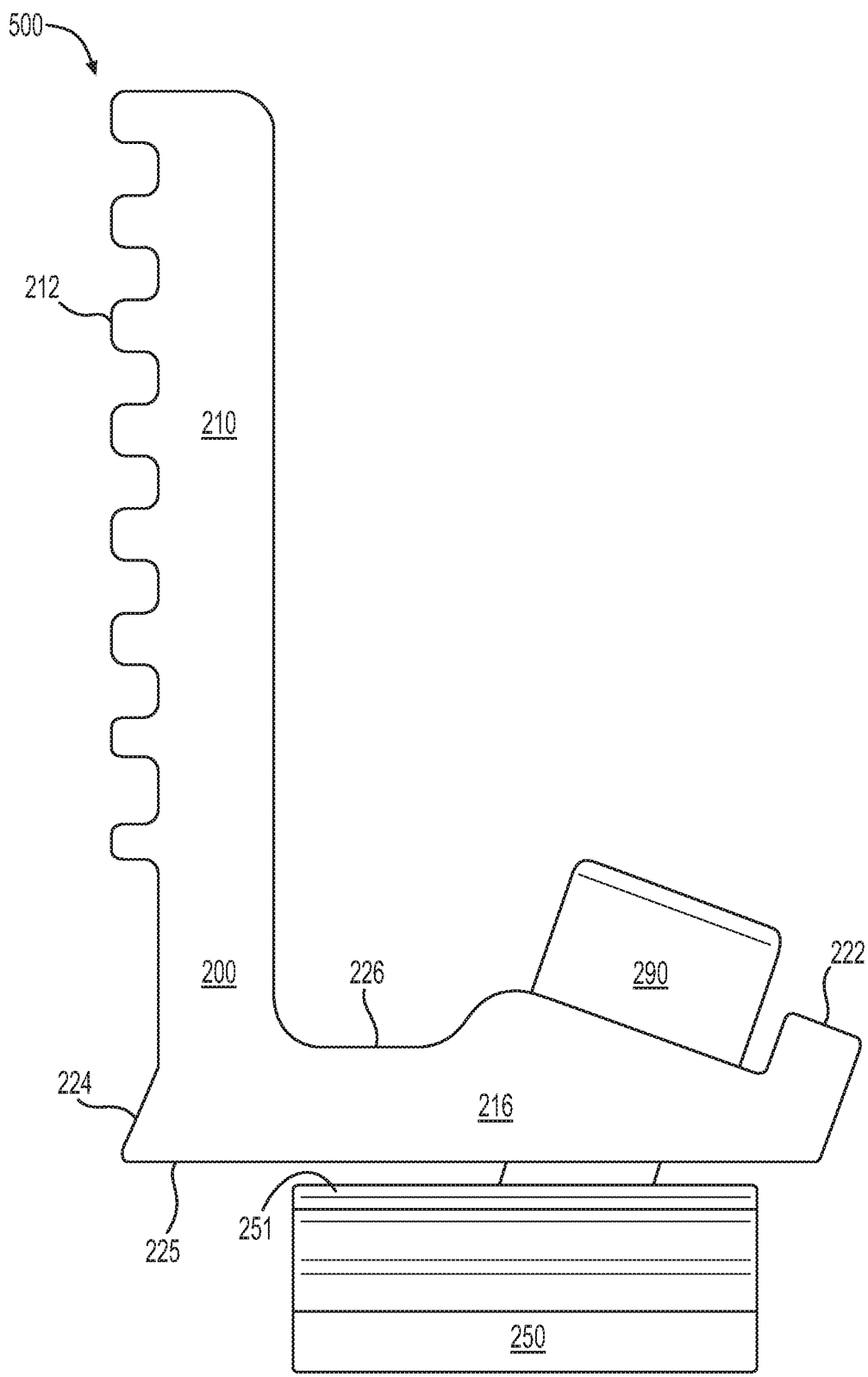
FIG. 44 shows an elevation side view of an angled clamping bolt, an angled channel nut, and an L-foot bracket, according to an embodiment.

FIG. 44 shows an elevation side view of an angled bolt 290, an angled channel nut 250, and an L-foot bracket 200, according to an embodiment. L-foot bracket 200 includes: a pair of vertical legs 210, 210' that have a plurality of substantially parallel, horizontal corrugations (teeth) 212 and a corresponding plurality of substantially parallel, horizontal grooves 214 on the backside of legs 210, 210'; and an integral lower horizontal base 216, with an angled aperture (not shown) for receiving an angled clamping bolt 290. L-bracket further includes a horizontal mid-portion 226; and a square, angled ledge 222 that protrudes generally upwardly from horizontal base portion 216 of L-foot bracket 200. The tilt angle of angled channel nut 250 matches the tilt angle of the angled clamping bolt 290, which means that the upper surface 251 of channel nut 250 is substantially parallel to the bottom surface 225 of horizontal base portion 216 of L-foot bracket 200.

Figure 45:
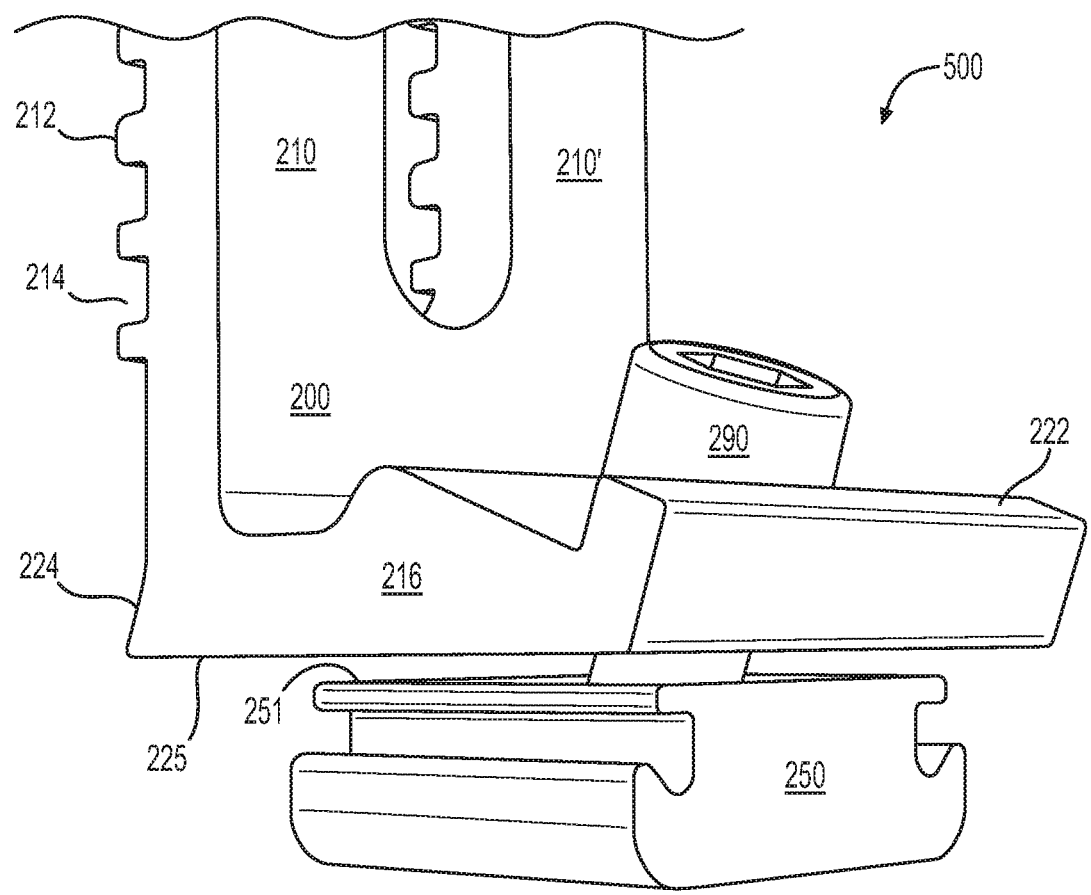
FIG. 45 shows an isometric view of an angled clamping bolt, an angled channel nut, and an L-foot bracket, according to an embodiment.

FIG. 45 shows an isometric view of an angled bolt 290, an angled channel nut 250, and an L-foot bracket 200, according to an embodiment of the instant disclosure. L-foot bracket 200 includes: a pair of vertical legs 210, 210' that have a plurality of substantially parallel, horizontal corrugations (teeth) 212 and a corresponding plurality of substantially parallel, horizontal grooves 214 on the backside of legs 210, 210'; and an integral lower horizontal base 216, with an angled aperture (not shown) for receiving an angled clamping bolt 290. L-bracket further includes a square, angled ledge 222 that protrudes generally upwardly from horizontal base portion 216 of L-foot bracket 200. The tilt angle of angled channel nut 250 matches the tilt angle of the angled clamping bolt 290, which means that the upper surface 251 of channel nut 250 is parallel (or substantially parallel) to the bottom surface 225 of horizontal base portion 216 of L-foot bracket 200.

Figure 46:
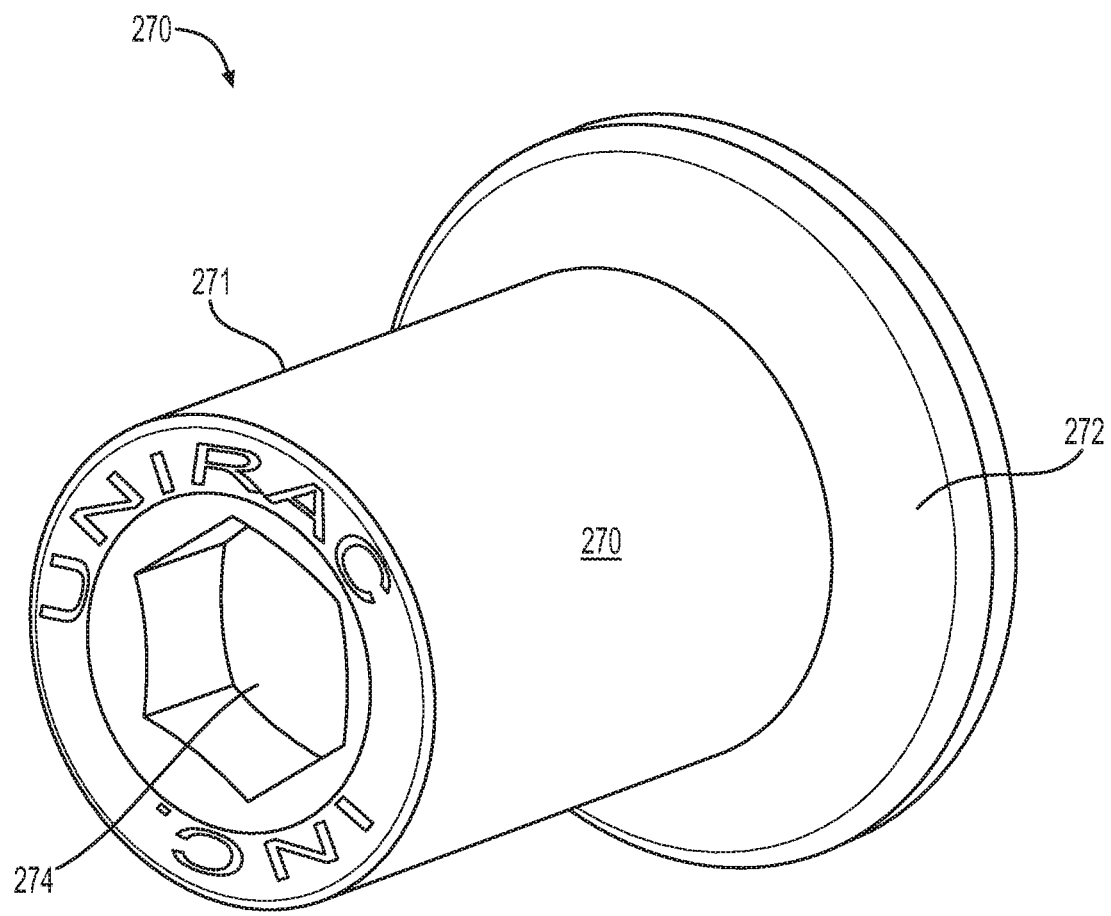
FIG. 46 shows an isometric front view of a uni-nut, according to an embodiment.

FIG. 46 shows an isometric front view of a uni-nut 270, according to an embodiment. Uni-nut 270 includes a hollow cylindrical shaft 271 with a smooth outer surface; a circularly flanged bottom 272; and an internal hexagonal drive 274 at the upper end (i.e., for accepting an Allen wrench drive tool). It is to be noted that the uni-nut 270 may not include the etched words ("Unirac Inc."), as shown in the figures.

Figure 47:
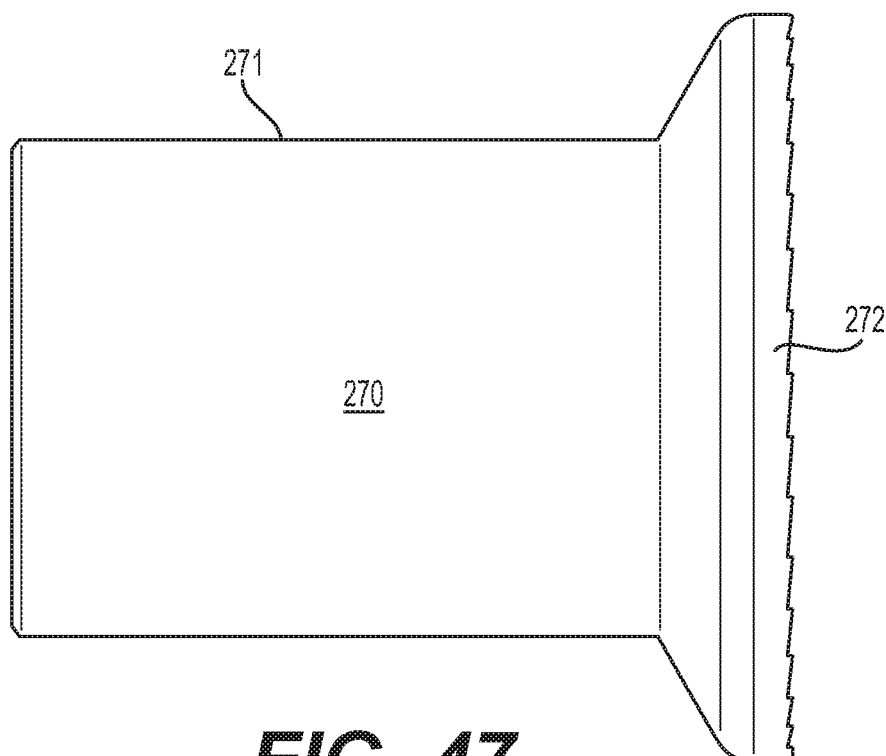
FIG. 47 shows an elevation side view of a uni-nut, according to an embodiment.

FIG. 47 shows an elevation side view of a uni-nut 270, according to an embodiment. Uni-nut 270 includes a hollow cylindrical shaft 271 with a smooth outer surface; a circularly flanged bottom 272; and an internal hexagonal drive 274 at the upper end (i.e., for accepting an Allen wrench drive tool).

Figure 48:
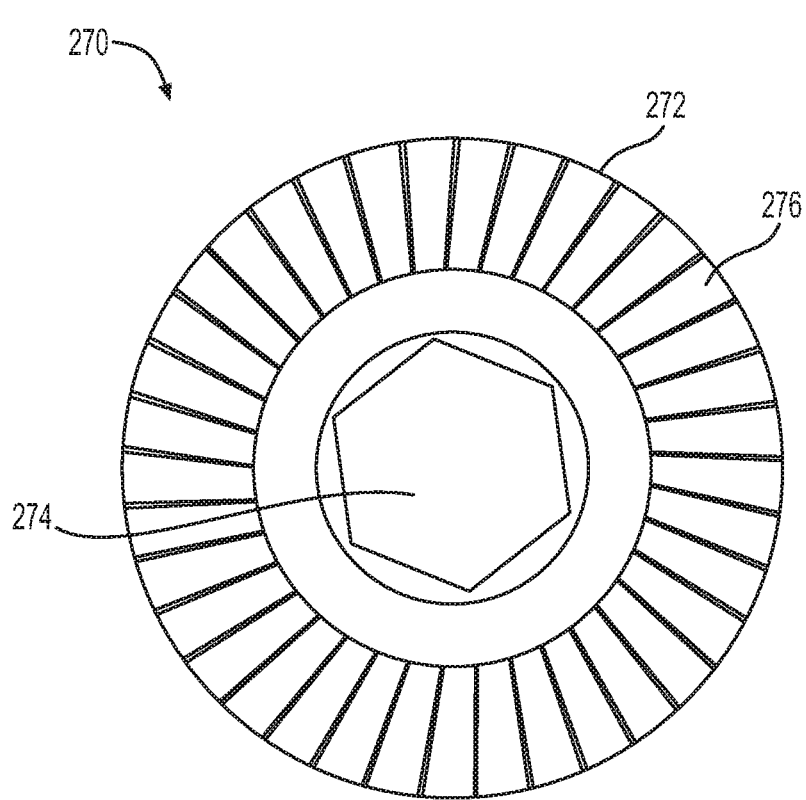
FIG. 48 shows an elevation rear view of a uni-nut, according to an embodiment.

FIG. 48 shows an elevation bottom view of a uni-nut 270, according to an embodiment. The bottom end of flange 272 includes a plurality of radially-oriented, fan-like serrations, whose purpose may include: (1) to make good electrical contact with the L-foot bracket 200, and (2) to prevent backing-out of the nut 270 over time due to vibrations. The hex-head internal drive 274 may be seen.

Figure 49:
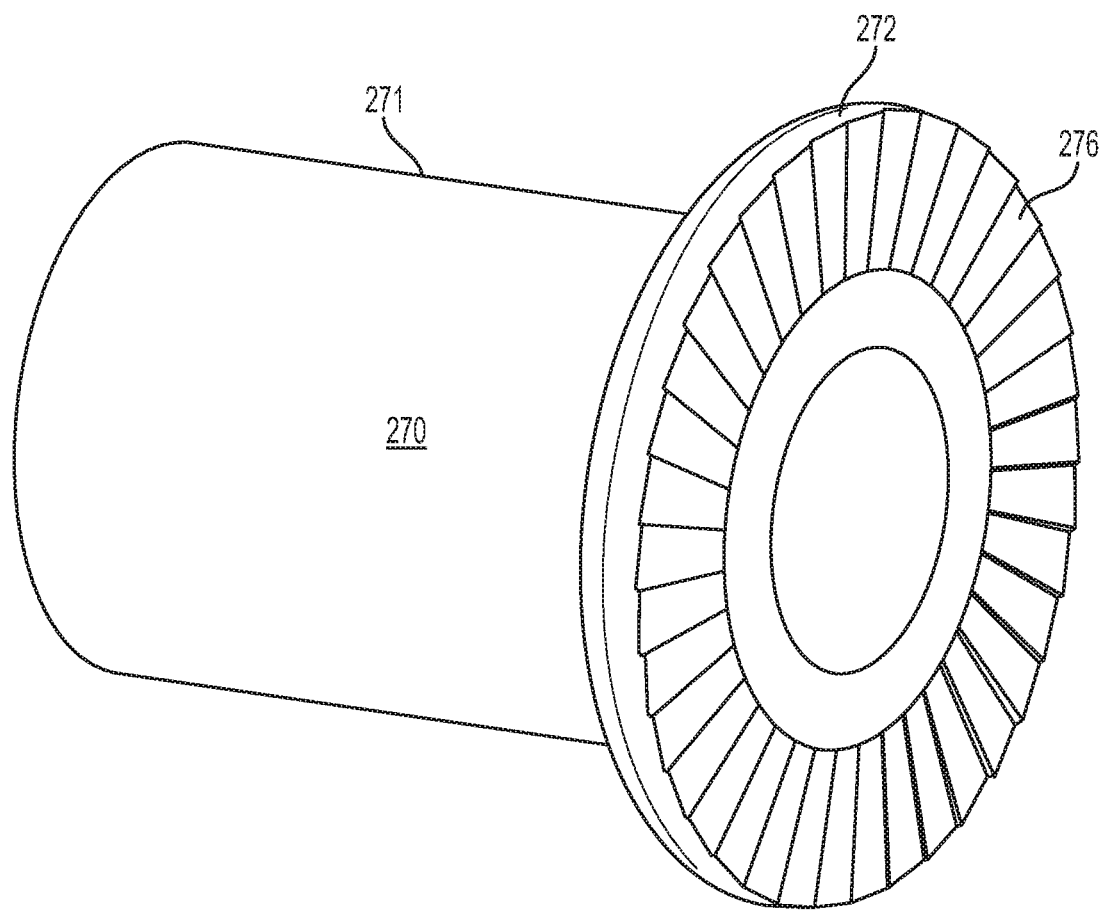
FIG. 49 shows an isometric rear view of a uni-nut, according to an embodiment.

FIG. 49 shows an isometric rear view of a uni-nut 270, according to an embodiment. Uni-nut 270 includes a hollow cylindrical shaft 271 with a smooth outer surface; a circularly flanged bottom 272; and an internal hexagonal drive 274 at the upper end (i.e., for accepting an Allen wrench drive tool). The bottom end of flange 272 includes a plurality of radially-oriented, fan-like serrations, whose purpose may include: (1) to make good electrical contact with the L-foot bracket 200, and (2) to prevent backing-out of the nut 270 over time due to vibrations.

Figure 50:
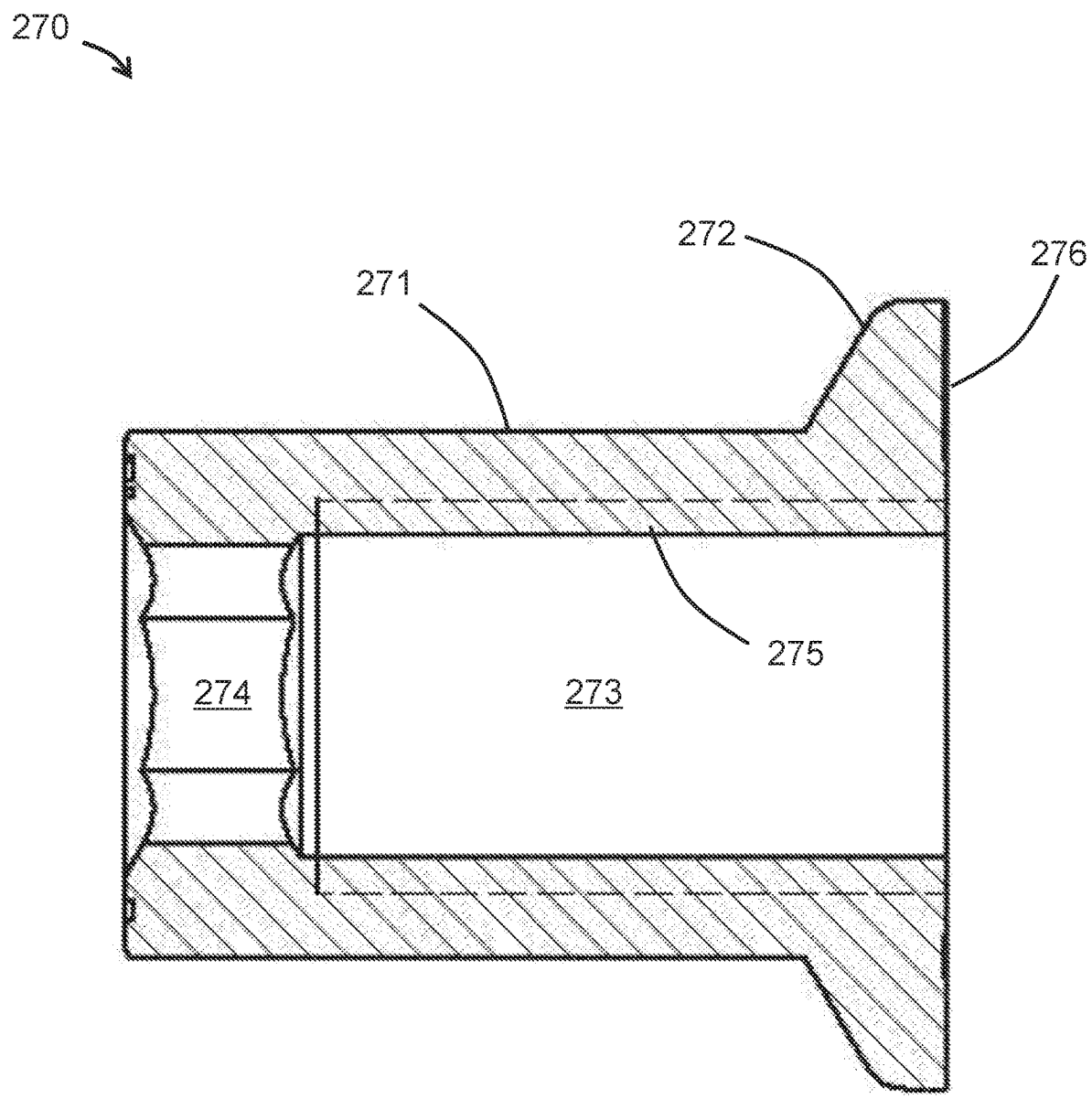
FIG. 50 shows a cross-section elevation side view of a uni-nut, according to an embodiment.

FIG. 50 shows a cross-section elevation side view of a uni-nut 270, according to an embodiment. Uni-nut 270 includes a hollow cylindrical shaft 271 with a smooth outer surface; a circularly flanged bottom 272 with radial serrations 276; and an internal hexagonal drive 274 at the upper end (i.e., for accepting an Allen wrench drive tool). Uni-nut 270 has a hollow, cylindrical interior 273 that is threaded with machine threads 275.

Figure 51:
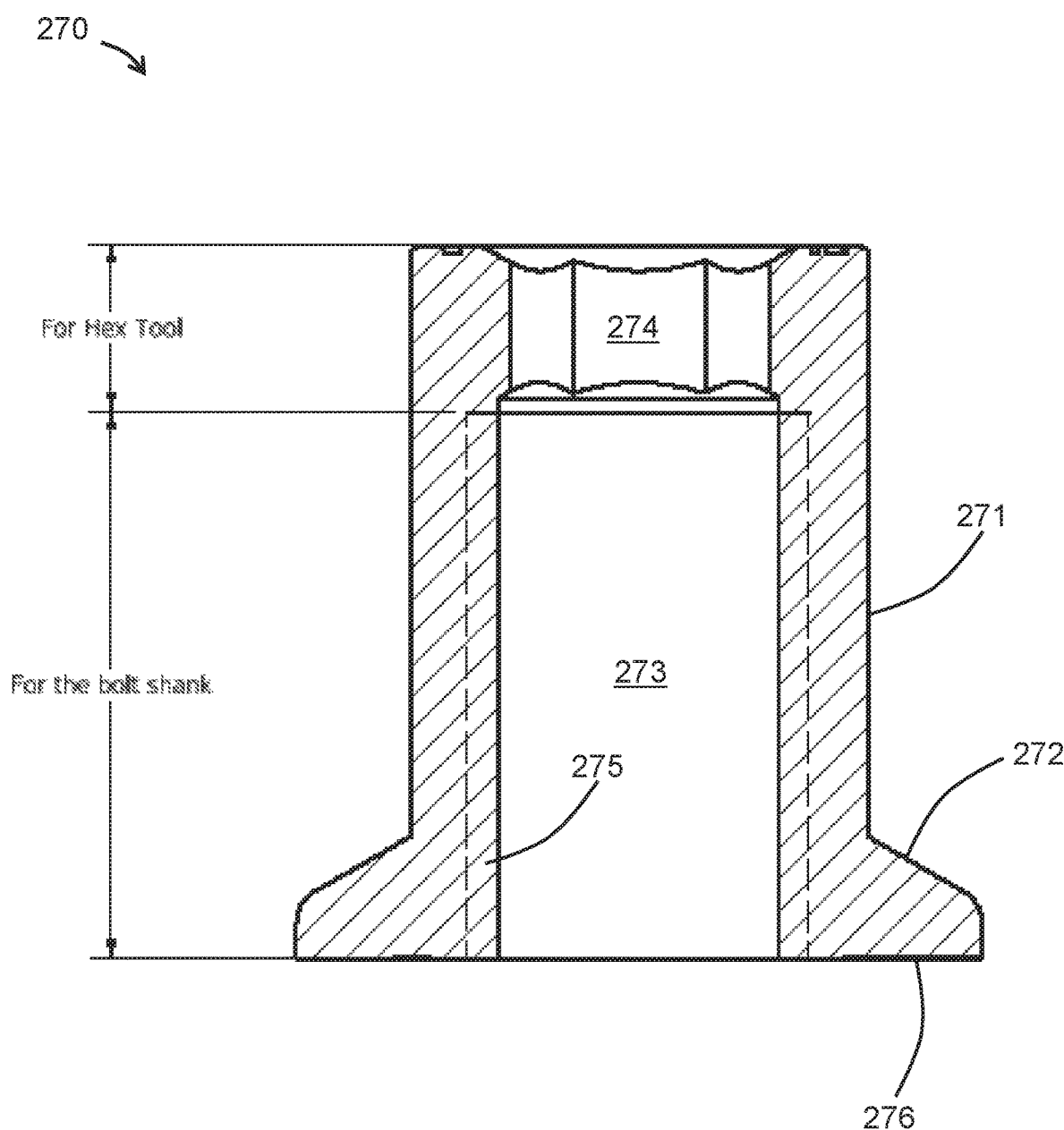
FIG. 51 shows a cross-section elevation side view of a uni-nut, according to an embodiment.

FIG. 51 shows a cross-section elevation side view of a uni-nut 270, according to an embodiment. Uni-nut 270 includes a hollow cylindrical shaft 271 with a smooth outer surface; a circularly flanged bottom 272 with radial serrations 276; and an internal hexagonal drive 274 at the upper end (i.e., for accepting an Allen wrench drive tool). Uni-nut 270 has a hollow, cylindrical interior 273 that is threaded with machine threads 275. The proximal (upper) end portion of uni-nut 270 includes the internal hexagonal drive 274; and the remaining distal portion of the shaft 271 is threaded on the inside with machine threads 275.

Figure 52:
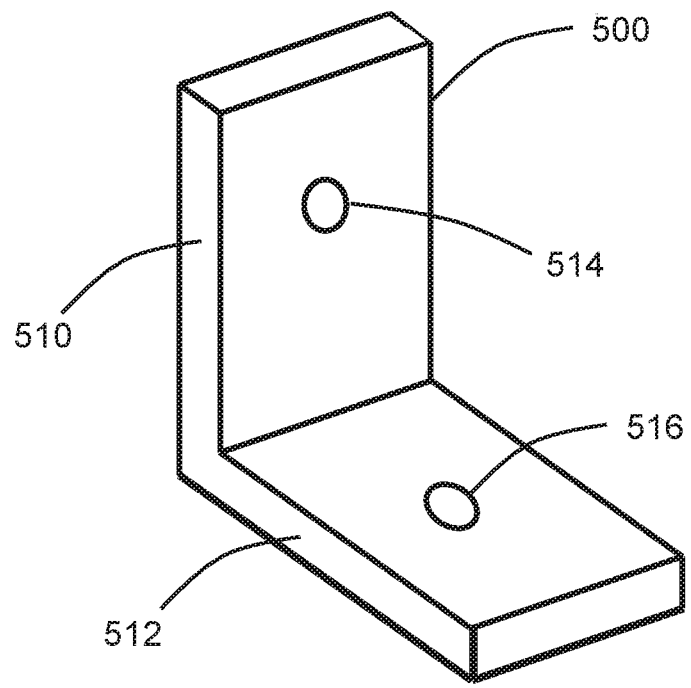
FIG. 52 shows an isometric view of a L-foot bracket, according to an embodiment.

FIG. 52 shows an isometric view of a L-foot bracket 500, according to an embodiment. L-foot bracket 500 includes a vertical leg portion 510 and an integral horizontal base portion 512, including an first aperture 514 disposed in the vertical leg portion 510, and a second aperture 516 disposed in the horizontal leg portion 510; wherein the second aperture 516 has a central axis 518 that is tilted with respect to a horizontal plane by a bracket tilt angle, θ, that is less than 90°. The bracket tilt angle may be less than or equal to 70°.

Figure 53:
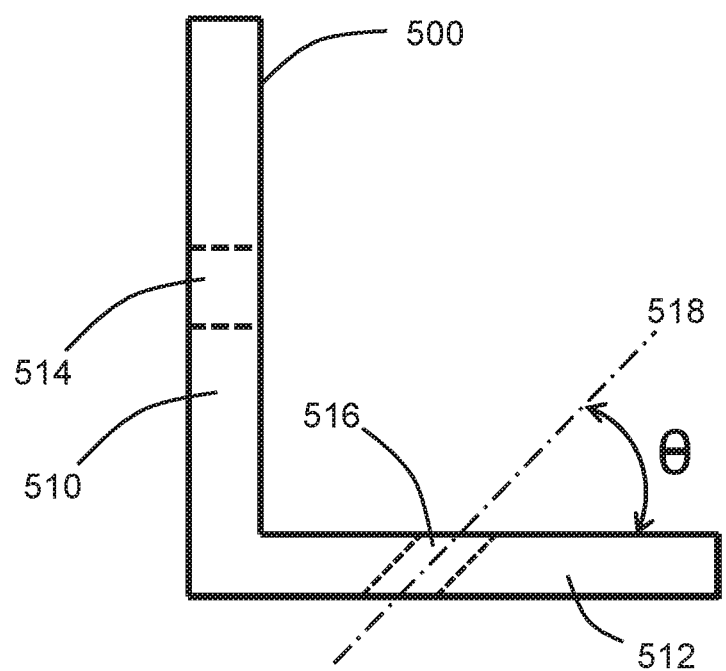
FIG. 53 shows an elevation side view of a L-foot bracket, according to an embodiment.

FIG. 53 shows an elevation side view of a L-foot bracket 500, according to an embodiment. L-foot bracket 500 includes a vertical leg portion 510 and an integral horizontal base portion 512, including an first aperture 514 disposed in the vertical leg portion 510, and a second aperture 516 disposed in the horizontal leg portion 510; wherein the second aperture 516 has a central axis 518 that is tilted with respect to a horizontal plane by a tilt angle, θ, that is less than 90°. The bracket tilt angle may be less than or equal to 70°.

Figure 54:
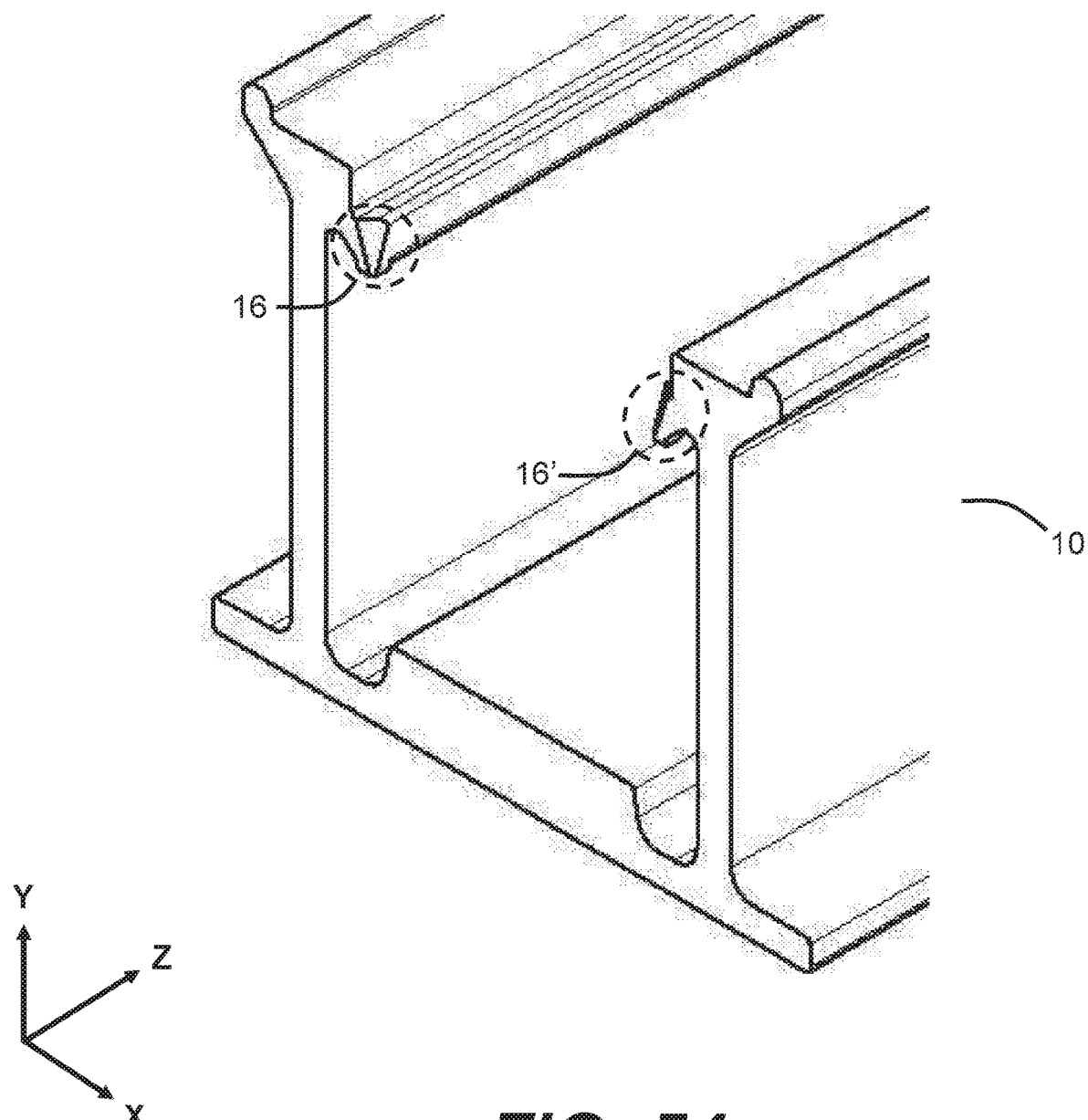
FIG. 54 shows an isometric view of a portion of a channel, according to an embodiment.

FIG. 54 shows an isometric view of a portion channel 10, according to an embodiment. As shown in FIG. 54, the distal ends of flanges 16 and 16' may be peened and/or turned down (as shown) to prevent the channel nut (not shown) from falling of the distal ends of the channel 10.

Figure 55:
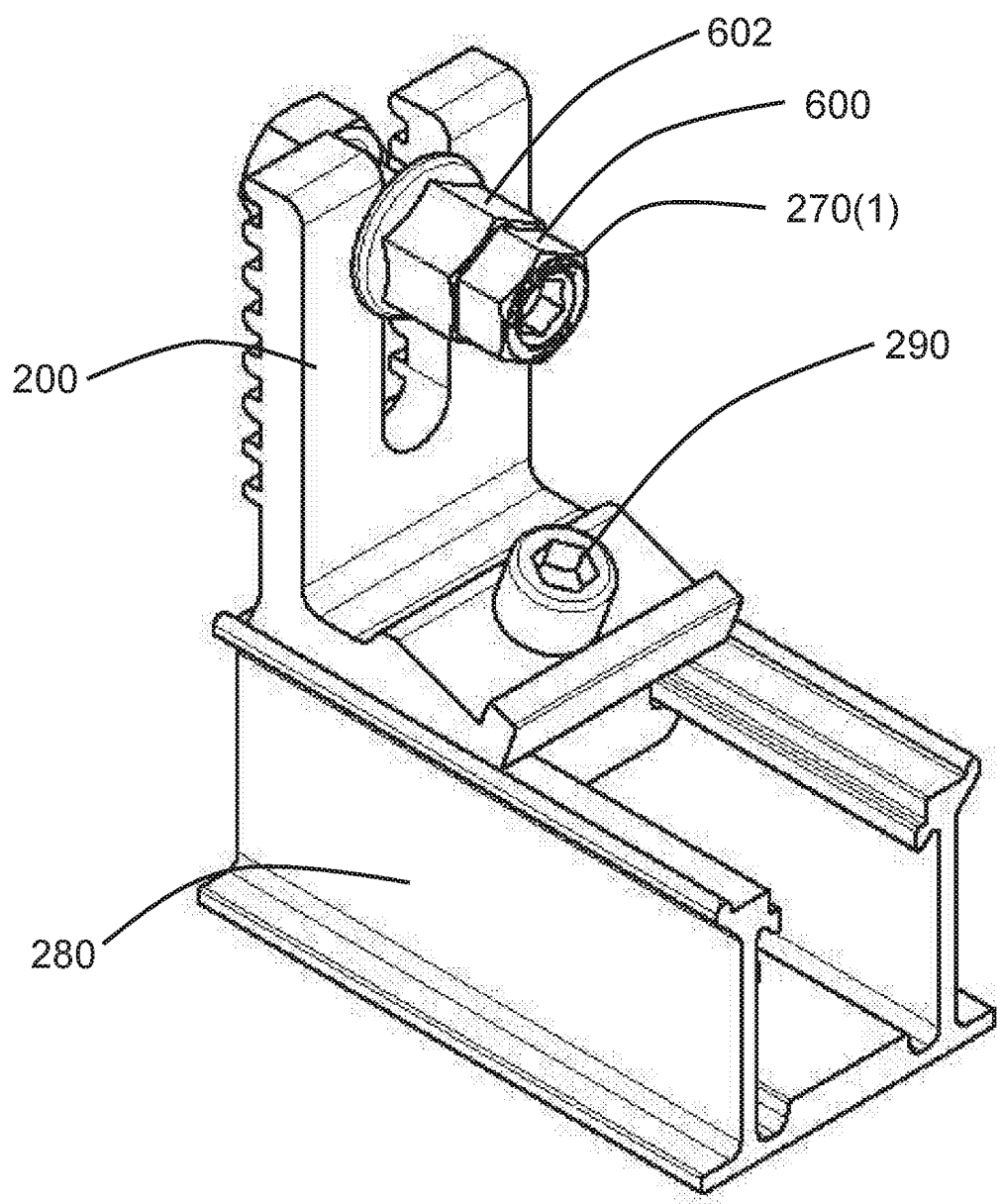
FIG. 55 shows an isometric view of an alternative uni-nut, according to an embodiment.

FIG. 55 shows an isometric view of an angled clamping bolt 290 and an L-foot bracket 200 clamped to a channel 280, according to an embodiment. FIG. 55 also shows an alternative uni-nut 270(1). Instead of having a smooth outer surface, the uni-nut 270(1) shown in FIG. 55 includes a first hexagonal portion 600 and a second hexagonal portion 602. In such an embodiment, the first hexagonal portion 600 has a smaller width than the second hexagonal portion 602.

CONCLUSION

Although several embodiments have been described in language specific to structural features and/or methodological acts, it is to be understood that the claims are not necessarily limited to the specific features or acts described. Rather, the specific features and acts are disclosed as illustrative forms of implementing the claimed subject matter. Furthermore, the use of the term "may" herein is used to indicate the possibility of certain features being used in one or more various embodiments, but not necessarily in all embodiments.

What is claimed is:
1. A channel comprising:
a base portion; and
a pair of sidewalls integrally extending from opposing sides of the base portion, an upper portion of each sidewall of the pair of sidewalls including:
an inward-facing downturned internal flange,
an outward-facing upturned external flange, and
a horizontal support ledge that extends directly between the inward-facing downturned internal flange and the outward-facing upturned external flange such that the outward-facing upturned external flange rises above a height of the horizontal support ledge.

2. The channel of claim 1, wherein the channel is U-shaped, and the pair of sidewalls are substantially perpendicular, respectively, to the base portion.

3. The channel of claim 1, wherein the pair of sidewalls are non-perpendicular, respectively, to the base portion.

4. The channel of claim 1, wherein each downturned internal flange includes an upper shoulder configured to engage with an upper wing of a channel nut.

5. The channel of claim 1, wherein each downturned internal flange includes a downturned lip.

6. The channel of claim 1, wherein each downturned internal flange includes an angled ramp.

7. The channel of claim 1, wherein each upturned external flange includes a protruding raised edge that centers and aligns a L-foot bracket when the L-foot bracket is mounted on the channel.

8. The channel of claim 1, wherein a profile shape of each downturned internal flange, when viewed end-on, is defined as a Z-shaped curve having a set of continuously-connected line-segments from a first point to a second point, wherein the set of continuously-connected line-segments includes a downwardly-facing semi-circular segment, which is connected to an angled ramp segment, which is connected to a rounded tip segment, which is connected to a lower vertical portion segment, which is connected to a horizontal shoulder segment, which is connected to an upper vertical segment, which connects with a horizontal ledge segment.

9. The channel of claim 8, wherein transitions between the continuously-connected line-segments are rounded or chamfered.

10. The channel of claim 1, wherein each downturned internal flange includes a thin neck and a bulbous end tab.

11. A channel nut shaped to correspond with a structural channel, the channel nut comprising:

a substantially rectangular body having:
a pair of opposing sides,
a vertically-oriented threaded aperture,
a reentrant groove disposed in each one of the pair of opposing sides, which extends an entire longitudinal length of the channel nut, and
an upper wing that partially overhangs each reentrant groove such that the upper wing prevents the channel nut from falling off of the structural channel during installation.

12. The channel nut of claim 11, wherein a profile shape of each reentrant groove, when viewed end-on, is defined as a Z-shaped curve having a set of continuously-connected line-segments from a first point to a second point, wherein the set of continuously-connected line-segments includes a vertical segment, which is connected to a rounded tip segment, which is connected to an angled ramp segment, which is connected to a lower vertical segment, which is connected to a horizontal segment, which is connected to an upper vertical segment, which is connected to a top horizontal surface of the channel nut.

13. The channel nut of claim 11, wherein the reentrant grooves have a substantially rounded shape.

14. The channel of claim 11, further comprises a raised boss disposed along a length of the channel, with a vertical aperture disposed in the boss for holding a lag screw.

15. The channel of claim 14, further comprising a watertight elastomeric grommet inserted in the vertical aperture of the raised boss to provide waterproofing.

16. The channel of claim 11, wherein each sidewall of the channel is smooth.

17. A structural channel and channel nut subassembly, comprising:

a structural channel including a base portion and an integral pair of sidewalls, wherein each upper portion of a sidewall includes an inward-facing downturned internal flange and an outward-facing upturned external flange; and a channel nut having a substantially rectangular body with a vertically-oriented threaded aperture and a pair of opposing reentrant grooves that extend an entire length of a pair of opposing sides of the channel nut in a direction substantially parallel to a longitudinal length of the structural channel, wherein a shape of each downturned internal flange corresponds with a shape of each reentrant groove, the gap being sized so that the channel nut freely slides along the longitudinal length of the structural channel until it is clamped at a final position, and wherein each reentrant groove slidingly interlocks with each downturned internal flange of the structural channel.

18. The structural channel and channel nut subassembly of claim 17, wherein the channel is U-shaped with an open central portion, and the sidewalls are substantially perpendicular to the base portion.

19. The structural channel and channel nut subassembly of claim 17, further comprising a pair of horizontal, upper wings that partially overhang the reentrant grooves of the channel nut and prevent the channel nut from falling off of the channel during installation.

20. The structural channel and channel nut subassembly of claim 19, wherein each downturned internal flange includes an upper shoulder for engaging with each upper wing of the channel nut.

* * * * *